US011933076B2

(12) United States Patent
Allen et al.

(10) Patent No.: US 11,933,076 B2
(45) Date of Patent: Mar. 19, 2024

(54) ELECTRO-MECHANICAL LOCK CORE

(71) Applicant: dormakaba USA Inc., Indianapolis, IN (US)

(72) Inventors: Brendon Allen, Indianapolis, IN (US); Street Anthony Barnett, III, Whitestown, IN (US); Matthew J. Velderman, Baltimore, MD (US); Andrew E. Seman, Jr., Pylesville, MD (US); Ryan H. Peloquin, Ellicott City, MD (US); Gary Hill, Towson, MD (US); Paul Becke, Stewartstown, MD (US); Christopher W. Lemieux, Mount Airy, MD (US); Anthony Romano, Crofton, MD (US); Matthew Stanton, Wheaton, MD (US); Daniel J. White, Baltimore, MD (US)

(73) Assignee: dormakaba USA Inc., Indianapolis, IN (US)

( * ) Notice: Subject to any disclaimer, the term of this patent is extended or adjusted under 35 U.S.C. 154(b) by 1328 days.

(21) Appl. No.: 16/336,340

(22) PCT Filed: Oct. 18, 2017

(86) PCT No.: PCT/US2017/057123
§ 371 (c)(1),
(2) Date: Mar. 25, 2019

(87) PCT Pub. No.: WO2018/075605
PCT Pub. Date: Apr. 26, 2018

(65) Prior Publication Data

US 2019/0218826 A1 Jul. 18, 2019

Related U.S. Application Data

(60) Provisional application No. 62/410,186, filed on Oct. 19, 2016.

(51) Int. Cl.
*E05B 47/06* (2006.01)
*E05B 1/00* (2006.01)
(Continued)

(52) U.S. Cl.
CPC ........ *E05B 47/0615* (2013.01); *E05B 1/0092* (2013.01); *E05B 27/0007* (2013.01);
(Continued)

(58) Field of Classification Search
CPC ............... E05B 47/0615; E05B 1/0092; E05B 27/0007; E05B 47/0009; E05B 47/0012;
(Continued)

(56) References Cited

U.S. PATENT DOCUMENTS 3,298,211 A 1/1967 Russell et al.
3,347,072 A 10/1967 Rose
(Continued)

FOREIGN PATENT DOCUMENTS

CN 1056921 A 12/1991
CN 1181121 A 5/1998
(Continued)

OTHER PUBLICATIONS

International Search Report and Written Opinion, ISA/US, PCT/US19/27220, dated Jun. 10, 2019, 13 pgs.
(Continued)

*Primary Examiner* — Mark A Williams
(74) *Attorney, Agent, or Firm* — Faegre Drinker Biddle & Reath LLP

(57) ABSTRACT

An interchangeable electro-mechanical lock core for use with a lock device having a locked state and an unlocked state is disclosed. The interchangeable electromechanical lock core may include a moveable plug having a first position relative to a lock core body which corresponds to the lock device being in the locked state and a second
(Continued)

position relative to a lock core body which corresponds to the lock device being in the unlocked state.

15 Claims, 47 Drawing Sheets

(51) Int. Cl.

| | |
|---|---|
| ***E05B 27/00*** | (2006.01) |
| ***E05B 47/00*** | (2006.01) |
| ***G07C 9/00*** | (2020.01) |
| *E05B 9/04* | (2006.01) |

(52) U.S. Cl.

CPC ...... *E05B 47/0009* (2013.01); *E05B 47/0012* (2013.01); *E05B 47/0619* (2013.01); *E05B 47/0642* (2013.01); *G07C 9/00174* (2013.01); *G07C 9/00571* (2013.01); *E05B 2009/046* (2013.01); *E05B 2047/0053* (2013.01); *E05B 2047/0054* (2013.01); *E05B 2047/0058* (2013.01); *E05B 2047/0091* (2013.01); *E05B 2047/0095* (2013.01); *G07C 2009/00642* (2013.01); *G07C 2009/00769* (2013.01)

(58) Field of Classification Search

CPC ............. E05B 47/0619; E05B 47/0642; E05B 2009/046; E05B 2047/0053; E05B 2047/0054; E05B 2047/0058; E05B 2047/0091; E05B 2047/0095; G07C 9/00174; G07C 9/00571; G07C 2009/00642; G07C 2009/00769

See application file for complete search history.

(56) References Cited

U.S. PATENT DOCUMENTS

| | | | | |
|---|---|---|---|---|
| 3,824,817 | A | 7/1974 | Orr | |
| 3,905,213 | A | 9/1975 | Roberts | |
| 3,990,283 | A | 11/1976 | Nelson | |
| 4,386,510 | A | 6/1983 | Best et al. | |
| 4,484,462 | A | 11/1984 | Berkowitz | |
| RE31,910 | E | 6/1985 | Oliver | |
| 4,526,256 | A | 7/1985 | Urdal | |
| 4,745,785 | A | 5/1988 | Uebersax | |
| 4,747,281 | A | 5/1988 | Monahan | |
| 4,789,859 | A | 12/1988 | Clarkson et al. | |
| 4,850,210 | A | 7/1989 | Adler et al. | |
| 4,876,783 | A | 10/1989 | Campion et al. | |
| 4,972,694 | A | 11/1990 | Aulbers et al. | |
| 4,995,249 | A | 2/1991 | Preissler et al. | |
| 4,998,422 | A | 3/1991 | Borgmann et al. | |
| 4,998,423 | A | 3/1991 | Hsu | |
| 5,010,753 | A | 4/1991 | Boris, Jr. | |
| 5,044,180 | A | 9/1991 | Lebrecht | |
| 5,121,618 | A | 6/1992 | Scott | |
| 5,209,087 | A | 5/1993 | Cox | |
| 5,235,832 | A | 8/1993 | Lux et al. | |
| 5,367,295 | A | 11/1994 | Gokcebay et al. | |
| 5,507,162 | A | 4/1996 | Chhatwal | |
| 5,552,777 | A | 9/1996 | Gokcebay et al. | |
| 5,654,696 | A | 8/1997 | Barrett et al. | |
| 5,682,779 | A | 11/1997 | Dolev | |
| 5,701,773 | A | 12/1997 | Markisello | |
| 5,749,253 | A | 5/1998 | Glick et al. | |
| 5,752,399 | A | 5/1998 | Shen | |
| 5,752,400 | A | 5/1998 | Kim | |
| 5,813,260 | A | 9/1998 | Widen | |
| 5,816,085 | A | 10/1998 | Winardi et al. | |
| 5,839,305 | A | 11/1998 | Aston | |
| 5,839,307 | A | 11/1998 | Field et al. | |
| 5,921,123 | A | 7/1999 | Schwarzkopf et al. | |
| 5,931,030 | A | 8/1999 | Chen | |
| 5,933,086 | A | 8/1999 | Tischendorf et al. | |
| 5,974,912 | A | 11/1999 | Cheng et al. | |
| 6,000,609 | A | 12/1999 | Gokcebay et al. | |
| 6,014,877 | A | 1/2000 | Shen | |
| 6,035,673 | A | 3/2000 | Harrison | |
| 6,125,673 | A | 10/2000 | Luker | |
| 6,158,259 | A | 12/2000 | Schmitz et al. | |
| 6,227,020 | B1 | 5/2001 | Lerchner | |
| 6,264,256 | B1 | 7/2001 | Hankel et al. | |
| 6,292,893 | B1 | 9/2001 | Micali | |
| 6,317,313 | B1 | 11/2001 | Mosgrove et al. | |
| 6,334,347 | B1 | 1/2002 | Iscla | |
| 6,337,618 | B1 | 1/2002 | Craig et al. | |
| 6,338,261 | B1 | 1/2002 | Liu | |
| 6,363,762 | B1 | 4/2002 | Kueng | |
| 6,370,928 | B1 | 4/2002 | Chies et al. | |
| 6,374,653 | B1 | 4/2002 | Gokcebay et al. | |
| 6,382,006 | B1 | 5/2002 | Field et al. | |
| 6,384,711 | B1 | 5/2002 | Cregger et al. | |
| 6,412,321 | B1 * | 7/2002 | Aramburu ........... | E05B 47/0012 70/283.1 |
| 6,442,986 | B1 * | 9/2002 | Russell ............... | E05B 47/0634 70/283.1 |
| 6,463,773 | B1 | 10/2002 | Dimig | |
| 6,474,122 | B2 | 11/2002 | Davis | |
| 6,523,377 | B1 | 2/2003 | Vonlanthen | |
| 6,544,627 | B1 | 4/2003 | Vijayen et al. | |
| 6,552,650 | B1 | 4/2003 | Gokcebay et al. | |
| 6,554,326 | B1 | 4/2003 | Goldman | |
| 6,564,601 | B2 | 5/2003 | Hyatt, Jr. | |
| 6,581,426 | B2 | 6/2003 | Bates et al. | |
| 6,604,394 | B2 | 8/2003 | Davis | |
| 6,615,625 | B2 | 9/2003 | Davis | |
| 6,668,606 | B1 | 12/2003 | Russell et al. | |
| 6,705,140 | B1 | 3/2004 | Dimig et al. | |
| 6,708,539 | B1 | 3/2004 | Widen | |
| 6,718,806 | B2 | 4/2004 | Davis | |
| 6,764,013 | B2 | 7/2004 | Ben-Aissa | |
| 6,766,673 | B2 | 7/2004 | Gast et al. | |
| 6,786,070 | B1 | 9/2004 | Dimig et al. | |
| 6,807,834 | B2 | 10/2004 | Tsai | |
| 6,822,552 | B2 | 11/2004 | Liden et al. | |
| 6,826,935 | B2 | 12/2004 | Gokcebay et al. | |
| 6,840,072 | B2 | 1/2005 | Russell et al. | |
| 6,848,286 | B2 | 2/2005 | Dimig | |
| 6,865,916 | B2 | 3/2005 | Goldman | |
| 6,880,376 | B1 | 4/2005 | Ko | |
| 6,927,670 | B1 | 8/2005 | Gokcebay et al. | |
| 6,967,562 | B2 | 11/2005 | Menard et al. | |
| 6,973,576 | B2 | 12/2005 | Giobbi | |
| 6,975,202 | B1 | 12/2005 | Rodriguez et al. | |
| 7,012,503 | B2 | 3/2006 | Nielsen | |
| 7,021,092 | B2 | 4/2006 | Loughlin et al. | |
| 7,036,344 | B2 | 5/2006 | Gast et al. | |
| 7,042,334 | B2 | 5/2006 | Mosgrove et al. | |
| 7,061,367 | B2 | 6/2006 | Mosgrove et al. | |
| 7,099,474 | B1 | 8/2006 | Liden et al. | |
| 7,111,165 | B2 | 9/2006 | Liden et al. | |
| 7,114,357 | B2 | 10/2006 | Armstrong et al. | |
| 7,123,127 | B2 | 10/2006 | Mosgrove et al. | |
| 7,205,882 | B2 | 4/2007 | Libin | |
| 7,222,508 | B2 | 5/2007 | Dickhans et al. | |
| 7,229,013 | B2 | 6/2007 | Ben-Aissa | |
| 7,251,474 | B2 | 7/2007 | Engstrom et al. | |
| 7,278,025 | B2 | 10/2007 | Saito et al. | |
| 7,296,447 | B2 | 11/2007 | Priest et al. | |
| 7,305,560 | B2 | 12/2007 | Giobbi | |
| 7,334,443 | B2 | 2/2008 | Meekma et al. | |
| 7,337,315 | B2 | 2/2008 | Micali | |
| 7,353,396 | B2 | 4/2008 | Micali et al. | |
| 7,363,788 | B2 | 4/2008 | Dimig et al. | |
| 7,380,279 | B2 | 5/2008 | Prokupets et al. | |
| 7,424,812 | B2 | 9/2008 | Loughlin et al. | |
| 7,434,426 | B2 | 10/2008 | Loughlin et al. | |
| 7,437,755 | B2 | 10/2008 | Farino et al. | |
| 7,446,644 | B2 | 11/2008 | Schaffzin et al. | |
| 7,471,199 | B2 | 12/2008 | Zimmerman et al. | |
| 7,472,280 | B2 | 12/2008 | Giobbi | |
| 7,591,160 | B2 | 9/2009 | Keller | |
| 7,600,129 | B2 | 10/2009 | Libin et al. | |

(56) References Cited

U.S. PATENT DOCUMENTS 7,624,280 B2 11/2009 Oskari
7,624,606 B1 12/2009 Huang et al.
7,628,048 B2 12/2009 Huang et al.
7,640,773 B2 1/2010 Bellamy et al.
7,660,994 B2 2/2010 Libin et al.
7,673,481 B2 3/2010 Amir
7,690,231 B1 4/2010 Field et al.
7,694,542 B2 4/2010 Loughlin et al.
7,706,778 B2 4/2010 Lowe
7,712,342 B2 5/2010 Loughlin et al.
7,716,486 B2 5/2010 Libin et al.
7,802,293 B2 9/2010 Boyer et al.
7,822,989 B2 10/2010 Libin et al.
7,845,201 B2 12/2010 Meyerle et al.
7,845,202 B2 12/2010 Padilla et al.
7,870,769 B2 * 1/2011 Andersson ............ E05B 47/063 70/278.3
7,870,770 B2 1/2011 Blanch
7,874,190 B2 1/2011 Krisch et al.
7,905,125 B2 3/2011 Herdman
7,934,406 B2 5/2011 Loughlin et al.
7,958,759 B2 6/2011 Herdman
7,966,854 B2 6/2011 Imedio Ocana
7,980,106 B2 7/2011 Huang et al.
7,992,346 B2 8/2011 Finke
8,011,217 B2 9/2011 Marschalek et al.
8,015,597 B2 9/2011 Libin et al.
8,028,553 B2 10/2011 Lange
8,035,478 B2 10/2011 Lee
8,047,027 B2 11/2011 Loughlin et al.
8,070,061 B2 12/2011 Habraken
8,074,271 B2 12/2011 Davis et al.
8,074,479 B2 12/2011 Harley
8,079,240 B2 12/2011 Brown et al.
8,122,746 B2 2/2012 Hyatt, Jr.
8,144,941 B2 3/2012 Adams et al.
8,151,611 B2 4/2012 Herdman
8,161,783 B2 4/2012 Huang et al.
8,166,532 B2 4/2012 Chowdhury et al.
8,222,993 B2 7/2012 Bliding et al.
8,256,254 B2 9/2012 Bellamy
8,261,319 B2 9/2012 Libin et al.
8,272,241 B2 9/2012 Brown et al.
8,276,414 B2 10/2012 Luo
8,325,039 B2 12/2012 Picard et al.
8,331,544 B2 12/2012 Kraus et al.
8,336,349 B2 12/2012 Thimmappa et al.
8,352,730 B2 1/2013 Giobbi
8,368,507 B2 2/2013 Conreux et al.
8,370,911 B1 2/2013 Mallard
8,375,753 B2 2/2013 Goldman
8,419,083 B2 4/2013 Burmesch
8,447,969 B2 5/2013 Robinton et al.
8,448,484 B2 5/2013 Huang et al.
8,453,481 B2 6/2013 Meekma
8,456,277 B2 6/2013 Gillert et al.
8,459,071 B2 6/2013 Andersson
8,466,773 B2 6/2013 Willgert
8,468,861 B2 6/2013 Pukari et al.
8,482,378 B2 7/2013 Sadighi et al.
8,482,379 B2 7/2013 Conreux et al.
8,490,443 B2 7/2013 Gokcebay
8,490,444 B2 7/2013 Saari
8,495,898 B2 7/2013 Gokcebay
8,511,552 B2 8/2013 Habraken
8,516,865 B2 8/2013 Ferreira Sanchez
8,525,686 B2 9/2013 Burdenko
8,528,373 B2 9/2013 Hyatt et al.
8,539,802 B2 9/2013 Meyerle
8,543,684 B2 9/2013 Hulusi et al.
8,544,303 B2 10/2013 Andersson
8,552,875 B2 10/2013 Burdenko
8,581,690 B2 11/2013 Lappalainen et al.
8,593,249 B2 11/2013 Bliding et al.
8,604,903 B2 12/2013 Bowen et al.
8,616,031 B2 12/2013 Ullrich et al.
8,620,268 B2 12/2013 Metivier
8,628,019 B2 1/2014 Audebert et al.
8,635,462 B2 1/2014 Ullmann
8,640,513 B2 2/2014 Goren et al.
8,640,514 B2 2/2014 Goren et al.
8,643,469 B2 2/2014 Haberli
8,683,833 B2 4/2014 Marschalek et al.
8,689,013 B2 4/2014 Habraken
8,712,365 B2 4/2014 Metivier
8,720,238 B1 5/2014 Davis
8,730,004 B2 5/2014 Elfstrom et al.
8,736,418 B2 5/2014 Bozionek et al.
8,776,557 B2 7/2014 Wang
8,776,561 B1 7/2014 Jones
8,780,201 B1 7/2014 Scalisi et al.
8,787,902 B2 7/2014 Kim
8,793,784 B2 7/2014 Metivier et al.
8,794,042 B2 8/2014 Herdman
8,800,402 B2 8/2014 Weum
8,805,434 B2 8/2014 Vasudevan
8,823,795 B1 9/2014 Scalisi et al.
8,836,470 B2 9/2014 Pineau et al.
8,840,020 B2 9/2014 Litz et al.
8,842,180 B1 9/2014 Kasmir et al.
8,854,177 B2 10/2014 Pineau et al.
8,872,915 B1 10/2014 Scalisi et al.
8,881,252 B2 11/2014 Van et al.
8,893,420 B2 11/2014 Milde et al.
8,907,763 B2 12/2014 Pineau et al.
8,912,879 B2 12/2014 Fyke et al.
8,919,024 B2 12/2014 Milde, Jr.
8,922,333 B1 12/2014 Kirkjan
8,928,457 B2 1/2015 Jin et al.
8,931,195 B2 1/2015 Milde, Jr.
8,933,778 B2 1/2015 Birkel et al.
8,937,659 B1 1/2015 Scalisi et al.
8,941,465 B2 1/2015 Pineau et al.
8,941,736 B1 1/2015 Scalisi
8,947,530 B1 2/2015 Scalisi
8,953,040 B1 2/2015 Scalisi et al.
8,970,344 B2 3/2015 Payson et al.
8,973,417 B2 3/2015 Bench et al.
8,990,889 B2 3/2015 Van et al.
D727,769 S 4/2015 Scalisi
9,002,536 B2 4/2015 Hatton
9,010,163 B2 4/2015 Romero
9,010,650 B2 4/2015 Audebert et al.
9,013,575 B2 4/2015 Scalisi
9,019,067 B2 4/2015 Bryla et al.
9,020,854 B2 4/2015 Giobbi
D729,678 S 5/2015 Scalisi
9,024,759 B2 5/2015 Uyeda et al.
9,027,372 B2 5/2015 Hickman
9,049,352 B2 6/2015 Scalisi et al.
9,051,759 B2 6/2015 Herdman
9,053,622 B2 6/2015 Scalisi
9,055,202 B1 6/2015 Scalisi et al.
9,057,210 B2 6/2015 Dumas et al.
9,058,738 B1 6/2015 Scalisi
9,060,103 B2 6/2015 Scalisi
9,060,104 B2 6/2015 Scalisi
9,065,987 B2 6/2015 Kasmir et al.
9,077,716 B2 7/2015 Myers et al.
9,085,917 B2 7/2015 Kriete et al.
9,087,246 B1 7/2015 Chin et al.
9,094,584 B2 7/2015 Scalisi et al.
9,098,825 B2 8/2015 Bashkin
9,098,953 B2 8/2015 Kincaid et al.
9,113,051 B1 8/2015 Scalisi
9,113,052 B1 8/2015 Scalisi et al.
9,118,819 B1 8/2015 Scalisi et al.
9,122,856 B2 9/2015 Litz et al.
9,129,457 B2 9/2015 Sumcad et al.
9,133,647 B2 9/2015 Oh et al.
9,140,509 B2 9/2015 Sullivan et al.
9,141,090 B2 9/2015 Kalous et al.
9,148,416 B2 9/2015 Tse
9,148,417 B2 9/2015 Fieweger

(56) References Cited

U.S. PATENT DOCUMENTS 9,158,288 B2 10/2015 Libin et al.
9,160,987 B1 10/2015 Kasmir et al.
9,165,444 B2 10/2015 Scalisi
9,172,920 B1 10/2015 Kasmir et al.
9,172,921 B1 10/2015 Scalisi et al.
9,172,922 B1 10/2015 Kasmir et al.
9,179,107 B1 11/2015 Scalisi et al.
9,179,108 B1 11/2015 Scalisi et al.
9,179,109 B1 11/2015 Kasmir et al.
9,183,683 B2 11/2015 Osman et al.
9,196,104 B2 11/2015 Dumas et al.
9,196,133 B2 11/2015 Scalisi et al.
9,197,867 B1 11/2015 Scalisi et al.
9,206,620 B2 12/2015 Karsil et al.
9,208,628 B2 12/2015 Gokcebay
9,217,616 B2 12/2015 Sullivan et al.
9,218,696 B2 12/2015 Dumas et al.
9,222,282 B2 12/2015 Russo et al.
9,222,284 B2 12/2015 Gokcebay
D747,384 S 1/2016 Scalisi
D747,385 S 1/2016 Scalisi
D747,640 S 1/2016 Scalisi
9,230,424 B1 1/2016 Scalisi et al.
9,237,318 B2 1/2016 Kasmir et al.
9,247,219 B2 1/2016 Kasmir et al.
9,251,360 B2 2/2016 Meyer et al.
9,253,176 B2 2/2016 Ford et al.
9,253,455 B1 2/2016 Harrison et al.
9,258,281 B2 2/2016 Metivier et al.
9,273,492 B2 3/2016 Gokcebay
9,292,985 B2 3/2016 Ahearn et al.
9,303,935 B2 4/2016 Milde, Jr.
9,305,412 B2 4/2016 Winkelman
9,307,403 B2 4/2016 Neafsey et al.
9,310,147 B2 4/2016 Milde, Jr.
9,312,926 B2 4/2016 Neafsey et al.
9,316,025 B2 4/2016 Lien
9,316,454 B2 4/2016 Milde, Jr.
9,317,985 B2 4/2016 Tehranchi et al.
9,317,986 B2 4/2016 Tehranchi et al.
9,322,194 B2 4/2016 Cheng et al.
9,322,201 B1 4/2016 Cheng et al.
9,326,094 B2 4/2016 Johnson et al.
D755,037 S 5/2016 Czerwinski et al.
9,328,533 B2 5/2016 Wu
9,328,535 B2 5/2016 Baker et al.
9,330,514 B2 5/2016 Kuenzi et al.
9,332,377 B2 5/2016 Agardh et al.
9,336,637 B2 5/2016 Neil et al.
9,342,936 B2 5/2016 Scalisi
9,349,113 B2 5/2016 Bashkin
9,351,100 B2 5/2016 Tarnhed et al.
9,353,551 B2 5/2016 Martinez et al.
9,359,794 B2 6/2016 Cheng
9,363,803 B2 6/2016 Seo et al.
9,369,454 B2 6/2016 Porzio et al.
9,369,455 B2 6/2016 Huang et al.
9,374,349 B1 6/2016 Corlett et al.
9,378,598 B2 6/2016 Dumas et al.
9,378,599 B2 6/2016 Lee
9,382,739 B1 7/2016 Johnson et al.
9,390,572 B2 7/2016 Almomani
9,395,133 B2 7/2016 Milde et al.
9,406,178 B2 8/2016 Pukari
9,426,653 B2 8/2016 Becker et al.
9,437,062 B2 9/2016 Ahearn et al.
9,437,063 B2 9/2016 Schoenfelder et al.
9,443,362 B2 9/2016 Singh
9,443,365 B2 9/2016 Ahearn et al.
9,447,609 B2 9/2016 Johnson et al.
9,449,443 B2 9/2016 Libin et al.
9,449,448 B2 9/2016 Andersen
9,454,889 B2 9/2016 Kerning
9,462,470 B2 10/2016 Ehrensvard
9,464,462 B1 10/2016 Liu
9,467,859 B2 10/2016 Moss et al.
9,470,017 B1 10/2016 Cheng et al.
9,470,018 B1 10/2016 Cheng et al.
9,472,034 B2 10/2016 Ahearn et al.
9,476,226 B2 10/2016 Wheeler et al.
9,478,084 B1 10/2016 Robinson
9,489,511 B2 11/2016 Rodzevski et al.
9,489,787 B1 11/2016 Ives-Halperin et al.
9,500,006 B2 11/2016 Dayanikli et al.
9,501,880 B2 11/2016 Handville et al.
9,501,883 B2 11/2016 Handville et al.
9,508,206 B2 11/2016 Ahearn et al.
9,508,239 B1 11/2016 Harrison et al.
9,509,719 B2 11/2016 Neely
9,514,327 B2 12/2016 Ford
9,524,594 B2 12/2016 Ouyang et al.
9,524,601 B1 12/2016 Dumas
9,528,294 B2 12/2016 Johnson et al.
9,528,296 B1 12/2016 Cheng et al.
9,530,262 B2 12/2016 Johnson
9,530,264 B2 12/2016 Caterino et al.
9,530,295 B2 12/2016 Johnson
9,531,721 B2 12/2016 Neafsey et al.
9,534,420 B1 1/2017 Cheng et al.
9,536,359 B1 1/2017 Gokcebay
9,536,363 B2 1/2017 Ahearn et al.
9,540,848 B1 1/2017 Wu
9,542,785 B2 1/2017 Meganck et al.
9,546,504 B2 1/2017 Overgaard
9,548,973 B2 1/2017 Hulusi et al.
9,553,860 B2 1/2017 Meyer
9,562,370 B2 2/2017 Ohl et al.
9,567,773 B2 2/2017 Dore et al.
9,574,372 B2 2/2017 Johnson et al.
9,580,931 B2 2/2017 Myers et al.
9,587,415 B2 3/2017 Walls et al.
9,589,397 B1 3/2017 Christopher et al.
9,589,403 B2 3/2017 Lingan et al.
9,589,406 B2 3/2017 Borg et al.
9,591,682 B2 3/2017 Astrand et al.
9,593,522 B1 3/2017 Murar et al.
9,595,148 B2 3/2017 Borg et al.
9,613,476 B2 4/2017 Johnson
9,613,483 B2 4/2017 Giobbi
9,617,757 B2 4/2017 Lowder
9,619,954 B2 4/2017 Allibhoy et al.
9,624,695 B1 4/2017 Cheng et al.
9,626,859 B2 4/2017 Ribas et al.
9,631,400 B2 4/2017 Liu et al.
9,640,001 B1 5/2017 Vazquez et al.
9,640,004 B2 5/2017 Lowder
9,644,398 B1 5/2017 Cheng et al.
9,644,399 B2 5/2017 Johnson et al.
9,644,400 B1 5/2017 Cheng et al.
9,647,996 B2 5/2017 Johnson et al.
9,652,913 B2 5/2017 Drako et al.
9,652,917 B2 5/2017 Johnson et al.
9,654,450 B2 5/2017 Ford et al.
9,659,422 B2 5/2017 Lovelock et al.
9,659,424 B2 5/2017 Huber et al.
9,663,972 B2 5/2017 Ullrich et al.
9,666,000 B1 5/2017 Schoenfelder et al.
9,672,345 B2 6/2017 Davis et al.
9,672,674 B2 6/2017 Meganck et al.
9,679,429 B2 6/2017 Duncan et al.
9,681,426 B2 6/2017 Seo et al.
9,683,391 B2 6/2017 Johnson et al.
9,683,392 B1 6/2017 Cheng et al.
9,685,015 B2 6/2017 Johnson
9,685,017 B2 6/2017 Johnson
9,685,018 B2 6/2017 Johnson
9,690,272 B2 6/2017 Chin et al.
9,690,348 B2 6/2017 Chin et al.
9,690,959 B2 6/2017 Chin et al.
9,691,198 B2 6/2017 Cheng et al.
9,691,205 B2 6/2017 Robinson
9,691,207 B2 6/2017 Almomani
9,695,616 B2 7/2017 Johnson et al.
9,697,656 B2 7/2017 Trani

(56) References Cited

U.S. PATENT DOCUMENTS

| | | | |
|---|---|---|---|
| 9,697,657 B2 | 7/2017 | Anderson et al. | |
| 9,697,664 B2 | 7/2017 | Ribas et al. | |
| 9,704,314 B2 | 7/2017 | Johnson et al. | |
| 9,704,316 B2 | 7/2017 | Kirkjan | |
| 9,704,320 B2 | 7/2017 | Johnson et al. | |
| 9,705,265 B2 | 7/2017 | Lowder | |
| 9,706,365 B2 | 7/2017 | Johnson et al. | |
| 9,710,987 B2 | 7/2017 | Scoggins et al. | |
| 9,713,002 B2 | 7/2017 | Roy et al. | |
| 9,721,413 B2 | 8/2017 | Dumas et al. | |
| 9,722,756 B2 | 8/2017 | Seo et al. | |
| 9,725,927 B1 | 8/2017 | Cheng | |
| 9,726,448 B1 | 8/2017 | Milde et al. | |
| 9,727,328 B2 | 8/2017 | Johnson | |
| 9,728,022 B2 | 8/2017 | Gengler et al. | |
| 9,728,023 B2 | 8/2017 | Johnson | |
| 9,736,284 B2 | 8/2017 | Scalisi et al. | |
| 9,739,555 B2 | 8/2017 | Milde et al. | |
| 9,741,186 B1 | 8/2017 | Lemke | |
| 9,743,049 B2 | 8/2017 | Scalisi et al. | |
| 9,747,735 B1 | 8/2017 | Drako et al. | |
| 9,747,737 B2 | 8/2017 | Kuenzi | |
| 9,747,739 B2 | 8/2017 | Gengler et al. | |
| 9,754,433 B2 | 9/2017 | Lagimodiere et al. | |
| 9,760,705 B2 | 9/2017 | Davis et al. | |
| 9,761,073 B2 | 9/2017 | Cheng et al. | |
| 9,761,074 B2 | 9/2017 | Cheng et al. | |
| 9,763,086 B2 | 9/2017 | Benoit et al. | |
| 9,767,267 B2 | 9/2017 | Davis et al. | |
| 9,767,630 B1 | 9/2017 | Kazerani et al. | |
| 9,767,632 B2 | 9/2017 | Johnson | |
| 9,769,161 B2 | 9/2017 | Davis et al. | |
| 9,769,435 B2 | 9/2017 | Scalisi et al. | |
| 9,773,364 B2 | 9/2017 | Kerning et al. | |
| 9,779,569 B2 | 10/2017 | Yun | |
| 9,781,599 B2 | 10/2017 | Myers et al. | |
| 9,786,133 B2 | 10/2017 | Harrison et al. | |
| 9,792,747 B2 | 10/2017 | Baumgarte et al. | |
| 9,797,166 B2 | 10/2017 | Dore et al. | |
| 9,799,183 B2 | 10/2017 | Harrison et al. | |
| 9,803,942 B2 | 10/2017 | Milde, Jr. | |
| 9,805,534 B2 | 10/2017 | Ho et al. | |
| 9,811,960 B2 | 11/2017 | Voss | |
| 9,818,247 B2 | 11/2017 | Johnson | |
| 9,826,561 B2 | 11/2017 | Bolin et al. | |
| 9,836,906 B2 | 12/2017 | Carstens et al. | |
| 9,841,743 B2 | 12/2017 | Davis | |
| 9,842,446 B2 | 12/2017 | Vecchiotti et al. | |
| 9,842,447 B2 | 12/2017 | Badger, II | |
| 9,847,020 B2 | 12/2017 | Davis | |
| 9,852,559 B2 | 12/2017 | Rettig et al. | |
| 9,852,562 B2 | 12/2017 | Belhadia et al. | |
| 9,852,567 B2 | 12/2017 | Hild et al. | |
| 9,860,928 B2 | 1/2018 | Astrand et al. | |
| 9,865,112 B2 | 1/2018 | Maiwand et al. | |
| 9,865,113 B2 | 1/2018 | Maiwand et al. | |
| 9,865,144 B2 | 1/2018 | Trani | |
| 9,870,460 B2 | 1/2018 | Eberwine et al. | |
| 9,870,665 B2 | 1/2018 | Maiwand et al. | |
| 9,879,932 B2 | 1/2018 | Milde et al. | |
| 9,883,370 B2 | 1/2018 | Kerning et al. | |
| 9,886,617 B2 | 2/2018 | Rowe et al. | |
| 9,886,806 B2 | 2/2018 | Bashkin | |
| 9,888,216 B2 | 2/2018 | Scalisi et al. | |
| 9,892,579 B2 | 2/2018 | Ku | |
| 9,898,880 B2 | 2/2018 | Nagisetty et al. | |
| 9,902,368 B2 | 2/2018 | Maiwand et al. | |
| 9,913,135 B2 | 3/2018 | Perold et al. | |
| 9,916,707 B2 | 3/2018 | Vincent et al. | |
| 9,916,746 B2 | 3/2018 | Johnson et al. | |
| 9,922,473 B1 | 3/2018 | Haworth et al. | |
| 9,922,481 B2 | 3/2018 | Johnson et al. | |
| 9,924,319 B2 | 3/2018 | Hoyer et al. | |
| 9,934,637 B2 | 4/2018 | Ribas et al. | |
| 9,940,491 B2 | 4/2018 | Lim et al. | |
| 9,940,768 B2 | 4/2018 | Carstens et al. | |
| 9,947,153 B2 | 4/2018 | Bergerhoff et al. | |
| 9,947,154 B2 | 4/2018 | Davis et al. | |
| 9,947,155 B2 | 4/2018 | Trani | |
| 9,947,158 B2 | 4/2018 | Baumgarte et al. | |
| 9,959,690 B2 | 5/2018 | Zielinski et al. | |
| 9,959,692 B2 | 5/2018 | Hild et al. | |
| 9,963,107 B2 | 5/2018 | Murar et al. | |
| 9,965,911 B2 | 5/2018 | Wishne | |
| 9,972,144 B2 | 5/2018 | Klein et al. | |
| 9,985,950 B2 | 5/2018 | Caterino et al. | |
| 9,997,036 B2 | 6/2018 | Scalisi | |
| 9,998,922 B2 | 6/2018 | Robinton et al. | |
| 9,999,984 B2 | 6/2018 | Wilhelm et al. | |
| 9,999,989 B2 | 6/2018 | Rago et al. | |
| 10,008,057 B2 | 6/2018 | Ives-Halperin et al. | |
| 10,008,061 B2 | 6/2018 | Klink et al. | |
| 10,009,145 B2 | 6/2018 | Seo et al. | |
| 10,012,010 B2 | 7/2018 | Baker et al. | |
| 10,013,825 B2 | 7/2018 | Belhadia et al. | |
| 10,015,653 B2 | 7/2018 | Lang et al. | |
| 10,017,963 B2 | 7/2018 | Johnson et al. | |
| 10,026,249 B2 | 7/2018 | Grandpre et al. | |
| 10,026,253 B2 | 7/2018 | Giobbi | |
| 10,027,170 B2 | 7/2018 | Holmstroem | |
| 10,033,702 B2 | 7/2018 | Ford et al. | |
| 10,033,972 B2 | 7/2018 | Almomani et al. | |
| 10,037,525 B2 | 7/2018 | Neafsey | |
| 10,044,519 B2 | 8/2018 | Kasmir et al. | |
| 10,050,948 B2 | 8/2018 | Lagerstedt et al. | |
| 10,062,232 B2 | 8/2018 | Allibhoy et al. | |
| 10,062,251 B2 | 8/2018 | Kasmir et al. | |
| 10,074,224 B2 | 9/2018 | Ho et al. | |
| 10,083,559 B2 | 9/2018 | Schoenfelder et al. | |
| 10,083,560 B2 | 9/2018 | Baumgarte et al. | |
| 10,115,256 B2 | 10/2018 | Davis | |
| 10,125,519 B1 | 11/2018 | Gengler et al. | |
| 10,181,231 B2 | 1/2019 | Kristensen et al. | |
| 10,186,099 B2 | 1/2019 | Ahearn et al. | |
| 10,192,383 B2 | 1/2019 | Aase | |
| 10,249,120 B2 | 4/2019 | Ahearn et al. | |
| 10,264,433 B2 | 4/2019 | Ahearn et al. | |
| 10,282,930 B2 | 5/2019 | Borg et al. | |
| 10,349,279 B2 | 7/2019 | Myers et al. | |
| 10,360,743 B2 | 7/2019 | Ahearn et al. | |
| 10,366,551 B2 | 7/2019 | Drako et al. | |
| 10,453,280 B2 | 10/2019 | Kontturi | |
| 10,472,859 B2 | 11/2019 | Ku | |
| 10,490,005 B2 | 11/2019 | Caterino et al. | |
| 10,492,066 B2 | 11/2019 | Tarmey et al. | |
| 10,540,835 B2 | 1/2020 | Kuenzi et al. | |
| 10,554,644 B2 | 2/2020 | Toepke et al. | |
| 10,580,240 B2 | 3/2020 | Caterino et al. | |
| 11,447,980 B2 | 9/2022 | Snodgrass | |
| 11,466,473 B2 | 10/2022 | Barnett, III et al. | |
| 2002/0144526 A1 | 10/2002 | Ming-Chih | |
| 2003/0217574 A1 | 11/2003 | Meis | |
| 2004/0007032 A1 | 1/2004 | Davis | |
| 2004/0055346 A1* | 3/2004 | Gillert | H01F 7/1646 70/276 |
| 2004/0069028 A1 | 4/2004 | Dimig et al. | |
| 2004/0107751 A1 | 6/2004 | Hyatt | |
| 2004/0154364 A1 | 8/2004 | Dimig et al. | |
| 2004/0255628 A1 | 12/2004 | Meyerle | |
| 2005/0050929 A1 | 3/2005 | Meyerle | |
| 2005/0127687 A1 | 6/2005 | Dimig | |
| 2006/0010945 A1 | 1/2006 | Herdman | |
| 2006/0059548 A1 | 3/2006 | Hildre et al. | |
| 2006/0170533 A1 | 8/2006 | Chioiu et al. | |
| 2007/0017265 A1 | 1/2007 | Andersson | |
| 2007/0084259 A1* | 4/2007 | Bellamy | E05B 47/0653 70/422 |
| 2007/0200665 A1 | 8/2007 | Studerus | |
| 2007/0229257 A1 | 10/2007 | Bliding et al. | |
| 2008/0072636 A1 | 3/2008 | Padilla et al. | |
| 2008/0072637 A1* | 3/2008 | Padilla | E05B 47/068 70/371 |
| 2008/0086844 A1 | 4/2008 | Meyerle | |
| 2008/0180211 A1 | 7/2008 | Lien | |

(56) References Cited

U.S. PATENT DOCUMENTS

2008/0229793 A1 9/2008 Lange
2009/0013736 A1 1/2009 Voosen
2009/0127328 A1 5/2009 Aissa
2009/0280862 A1 11/2009 Loughlin et al.
2009/0320538 A1 12/2009 Pellaton
2010/0011822 A1* 1/2010 Imedio Ocana .... E05B 47/0615 70/278.7
2010/0116007 A1 5/2010 Thimmappa et al.
2010/0194526 A1 8/2010 Loughlin et al.
2010/0194527 A1 8/2010 Loughlin et al.
2010/0199733 A1 8/2010 Herdman
2011/0232341 A1 9/2011 Herdman
2011/0291798 A1 12/2011 Schibuk
2012/0169461 A1 7/2012 Dubois, Jr.
2012/0213362 A1 8/2012 Bliding et al.
2012/0313383 A1 12/2012 Lundberg et al.
2013/0008213 A1 1/2013 Brown et al.
2013/0014552 A1 1/2013 Bench et al.
2013/0015671 A1 1/2013 Calleberg
2013/0061055 A1 3/2013 Schibuk
2013/0063246 A1 3/2013 Kim
2013/0139561 A1 6/2013 Parto et al.
2013/0212661 A1 8/2013 Neafsey et al.
2013/0257589 A1 10/2013 Mohiuddin et al.
2013/0312468 A1 11/2013 Read et al.
2013/0335193 A1 12/2013 Hanson et al.
2014/0002236 A1 1/2014 Pineau et al.
2014/0051407 A1 2/2014 Ahearn et al.
2014/0077929 A1 3/2014 Dumas et al.
2014/0145823 A1 5/2014 Aase
2014/0150502 A1 6/2014 Duncan
2014/0157842 A1 6/2014 Almomani et al.
2014/0165673 A1 6/2014 Tyner et al.
2014/0223976 A1 8/2014 Chiou et al.
2014/0260452 A1 9/2014 Chen
2014/0292481 A1 10/2014 Dumas et al.
2014/0298869 A1 10/2014 Wang
2014/0313010 A1 10/2014 Huang et al.
2014/0340196 A1 11/2014 Myers et al.
2014/0365773 A1 12/2014 Gerhardt et al.
2014/0365781 A1 12/2014 Dmitrienko et al.
2015/0101370 A1* 4/2015 Russo ..................... E05B 35/00 70/283.1
2015/0119019 A1 4/2015 Minichmayr
2015/0163206 A1 6/2015 McCarthy et al.
2015/0184423 A1* 7/2015 Chen ....................... E05B 67/24 70/344
2015/0184425 A1 7/2015 Ellis et al.
2015/0206367 A1 7/2015 Goldman et al.
2015/0233142 A1 8/2015 Schweitzer et al.
2015/0235492 A1 8/2015 Hong et al.
2015/0240531 A1 8/2015 Blust et al.
2015/0259950 A1 9/2015 Schweitzer et al.
2015/0279132 A1 10/2015 Perotti
2015/0287256 A1 10/2015 Davis
2015/0292240 A1 10/2015 Ribas et al.
2015/0292246 A1 10/2015 Schweitzer et al.
2015/0294517 A1 10/2015 Herrala
2015/0300048 A1 10/2015 Yen et al.
2015/0339870 A1 11/2015 Cojocaru et al.
2015/0350913 A1 12/2015 Eberwine et al.
2015/0356797 A1 12/2015 McBride et al.
2015/0356801 A1 12/2015 Nitu et al.
2016/0014103 A1 1/2016 Masters et al.
2016/0019733 A1 1/2016 Robinton et al.
2016/0035165 A1 2/2016 Dumas et al.
2016/0040452 A1 2/2016 Ku
2016/0042581 A1 2/2016 Ku
2016/0042582 A1 2/2016 Hyde et al.
2016/0047142 A1 2/2016 Gengler et al.
2016/0048673 A1 2/2016 Marchiori et al.
2016/0049027 A1 2/2016 Soldner et al.
2016/0086400 A1 3/2016 Dumas et al.
2016/0145900 A1 5/2016 Kaiser
2016/0189454 A1 6/2016 Johnson et al.
2016/0241559 A1 8/2016 Trani et al.
2016/0241999 A1 8/2016 Chin et al.
2016/0249159 A1 8/2016 Berg et al.
2016/0258189 A1 9/2016 Frolov
2016/0258202 A1 9/2016 Scalisi
2016/0261824 A1 9/2016 Scalisi
2016/0275733 A1 9/2016 Carstens et al.
2016/0275735 A1 9/2016 Carstens et al.
2016/0275739 A1 9/2016 Scalisi
2016/0275741 A1 9/2016 Carstens et al.
2016/0277383 A1 9/2016 Guyomarc'h et al.
2016/0277388 A1 9/2016 Lowe et al.
2016/0284147 A1 9/2016 Trani
2016/0284170 A1 9/2016 Kasmir et al.
2016/0284183 A1 9/2016 Trani
2016/0300417 A1 10/2016 Hatton
2016/0300476 A1 10/2016 Kasmir et al.
2016/0307380 A1 10/2016 Ho et al.
2016/0308859 A1 10/2016 Barry et al.
2016/0319569 A1 11/2016 Johnson et al.
2016/0319571 A1 11/2016 Johnson
2016/0330413 A1 11/2016 Scalisi et al.
2016/0341537 A1 11/2016 Ku
2016/0343188 A1 11/2016 Johnson
2016/0344091 A1 11/2016 Trani
2016/0358433 A1 12/2016 Johnson
2016/0358437 A1 12/2016 Johnson et al.
2017/0002587 A1 1/2017 Wheeler
2017/0009491 A1 1/2017 Nguyen et al.
2017/0016249 A1 1/2017 Johnson et al.
2017/0022733 A1 1/2017 Lowder
2017/0022735 A1 1/2017 Lowder
2017/0024693 A1 1/2017 Wiechers
2017/0030109 A1 2/2017 Duncan et al.
2017/0034485 A1 2/2017 Scalisi
2017/0048495 A1 2/2017 Scalisi
2017/0051533 A1 2/2017 Kester et al.
2017/0076520 A1 3/2017 Ho et al.
2017/0084132 A1 3/2017 Scalisi
2017/0085843 A1 3/2017 Scalisi et al.
2017/0085844 A1 3/2017 Scalisi et al.
2017/0098335 A1 4/2017 Payack, Jr.
2017/0109954 A1 4/2017 Drako et al.
2017/0132861 A1 5/2017 Ho et al.
2017/0145714 A1 5/2017 Ohl et al.
2017/0152677 A1* 6/2017 Klammer ............ E05B 47/0044
2017/0180539 A1 6/2017 Payack, Jr.
2017/0187995 A1 6/2017 Scalisi et al.
2017/0193724 A1 7/2017 Johnson et al.
2017/0211294 A1 7/2017 Reese et al.
2017/0213404 A1 7/2017 Sivalingam et al.
2017/0221291 A1 8/2017 Gokcebay
2017/0226772 A1 8/2017 Lowder
2017/0228603 A1 8/2017 Johnson
2017/0228953 A1 8/2017 Lupovici
2017/0236345 A1 8/2017 Watters
2017/0236346 A1 8/2017 Murar et al.
2017/0236350 A1 8/2017 Lin
2017/0236354 A1 8/2017 Baker et al.
2017/0241164 A1 8/2017 Brown et al.
2017/0243420 A1 8/2017 Lien
2017/0243455 A1 8/2017 Johnson et al.
2017/0251366 A1 8/2017 Perna et al.
2017/0263065 A1 9/2017 Johnson
2017/0284128 A1 10/2017 Lim et al.
2017/0302424 A1 10/2017 Seo et al.
2017/0311161 A1 10/2017 Kuenzi
2017/0321453 A1 11/2017 Zheng et al.
2017/0328661 A1 11/2017 Milde, Jr.
2017/0330226 A1 11/2017 Kuenzi et al.
2017/0337758 A1 11/2017 Ahearn et al.
2017/0345236 A1 11/2017 Kuenzi et al.
2017/0352207 A1 12/2017 Siklosi
2017/0365119 A1 12/2017 Yun
2018/0007041 A1 1/2018 Davis et al.
2018/0045479 A1 2/2018 Milde, Jr.
2018/0051484 A1 2/2018 Picard et al.
2018/0068503 A1 3/2018 Prasad et al.
2018/0069722 A1 3/2018 Scalisi et al.

(56) References Cited

U.S. PATENT DOCUMENTS

| | | | |
|---|---|---|---|
| 2018/0073274 | A1 | 3/2018 | Johnson et al. |
| 2018/0081335 | A1 | 3/2018 | Davis |
| 2018/0082577 | A1 | 3/2018 | Davis |
| 2018/0089915 | A1 | 3/2018 | Lundberg |
| 2018/0091500 | A1 | 3/2018 | Baty et al. |
| 2018/0091641 | A1 | 3/2018 | Trani |
| 2018/0094456 | A1 | 4/2018 | Lowder |
| 2018/0096593 | A1 | 4/2018 | Davis |
| 2018/0103030 | A1 | 4/2018 | Einberg et al. |
| 2018/0114384 | A1 | 4/2018 | Graziano |
| 2018/0115897 | A1 | 4/2018 | Einberg et al. |
| 2018/0122219 | A1 | 5/2018 | Caterino et al. |
| 2018/0130273 | A1 | 5/2018 | Eid |
| 2018/0135336 | A1 | 5/2018 | Johnson et al. |
| 2018/0135337 | A1 | 5/2018 | Johnson et al. |
| 2018/0146336 | A1 | 5/2018 | Hoyer et al. |
| 2018/0151007 | A1 | 5/2018 | Einberg et al. |
| 2018/0151013 | A1 | 5/2018 | Carstens et al. |
| 2018/0179785 | A1 | 6/2018 | Liddell et al. |
| 2018/0179786 | A1 | 6/2018 | Johnson |
| 2018/0191889 | A1 | 7/2018 | Gerhardt et al. |
| 2018/0204399 | A1 | 7/2018 | Newman |
| 2018/0211457 | A1 | 7/2018 | Haworth et al. |
| 2018/0211462 | A1 | 7/2018 | Wendling et al. |
| 2018/0225899 | A1 | 8/2018 | Baumgarte et al. |
| 2018/0253917 | A1 | 9/2018 | Kazerani et al. |
| 2018/0261029 | A1 | 9/2018 | Johnson et al. |
| 2018/0268675 | A1 | 9/2018 | Johnson et al. |
| 2018/0270214 | A1 | 9/2018 | Caterino et al. |
| 2018/0332033 | A1 | 11/2018 | Lakhani et al. |
| 2018/0357845 | A1 | 12/2018 | Berg et al. |
| 2019/0026731 | A1 | 1/2019 | Neafsey |
| 2019/0035185 | A1 | 1/2019 | Kuenzi |
| 2019/0035188 | A1 | 1/2019 | Kuenzi et al. |
| 2019/0141504 | A1 | 5/2019 | Ahearn et al. |
| 2019/0169874 | A1* | 6/2019 | Gengler .................. E05B 9/084 |
| 2019/0172281 | A1 | 6/2019 | Einberg et al. |
| 2019/0279451 | A1 | 9/2019 | Wishne |
| 2019/0325678 | A1 | 10/2019 | Ahearn et al. |
| 2019/0335334 | A1 | 10/2019 | Myers et al. |
| 2019/0340854 | A1 | 11/2019 | Ahearn et al. |
| 2019/0347883 | A1 | 11/2019 | Klink et al. |
| 2019/0362578 | A1 | 11/2019 | Baker et al. |
| 2020/0024868 | A1 | 1/2020 | Snodgrass |
| 2020/0040607 | A1 | 2/2020 | Snodgrass et al. |
| 2020/0151986 | A1 | 5/2020 | Kuenzi et al. |
| 2020/0199911 | A1* | 6/2020 | Allen .................. E05B 47/0012 |
| 2020/0318392 | A1* | 10/2020 | Barnett, III ......... E05B 47/0012 |
| 2021/0246689 | A1 | 8/2021 | Allen et al. |
| 2022/0251879 | A1 | 8/2022 | Allen et al. |

FOREIGN PATENT DOCUMENTS

| | | | |
|---|---|---|---|
| CN | 1702274 | A | 11/2005 |
| CN | 2858885 | Y | 1/2007 |
| CN | 1930351 | A | 3/2007 |
| CN | 101065552 | A | 10/2007 |
| CN | 101500861 | A | 8/2009 |
| CN | 104763242 | A | 7/2015 |
| CN | 105971401 | A | 9/2016 |
| DE | 29703559 | U1 | 4/1997 |
| DE | 19612156 | C2 | 7/1998 |
| DE | 29911356 | U1 | 10/1999 |
| DE | 19854454 | C2 | 9/2000 |
| DE | 102007005214 | B3 | 6/2008 |
| DE | 202008007068 | U1 | 10/2009 |
| DE | 102018202563 | A1 | 8/2019 |
| EP | 0588209 | A1 | 3/1994 |
| EP | 0999328 | A1 | 5/2000 |
| EP | 1065335 | A1 | 1/2001 |
| EP | 1079051 | A1 | 2/2001 |
| EP | 1174572 | A2 | 1/2002 |
| EP | 1653415 | A1 | 5/2006 |
| EP | 1903168 | A2 | 3/2008 |
| EP | 2275628 | A2 | 1/2011 |
| EP | 2348490 | A1 | 7/2011 |
| EP | 2620919 | A1 | 7/2013 |
| EP | 2725823 | A1 | 4/2014 |
| EP | 2998485 | A1 | 3/2016 |
| EP | 3009992 | A1 | 4/2016 |
| EP | 3147868 | A1 | 3/2017 |
| EP | 3156980 | A1 | 4/2017 |
| EP | 3188136 | A1 | 7/2017 |
| EP | 1908898 | B1 | 12/2017 |
| EP | 3293995 | A1 | 3/2018 |
| EP | 3327679 | A1 | 5/2018 |
| EP | 3358534 | A1 | 8/2018 |
| GB | 2178476 | A | 2/1987 |
| GB | 2262770 | B | 3/1995 |
| WO | 2004/020767 | A1 | 3/2004 |
| WO | 2004/034336 | A1 | 4/2004 |
| WO | 2007/142405 | A1 | 12/2007 |
| WO | 2012/009607 | A1 | 1/2012 |
| WO | 2012/073265 | A1 | 6/2012 |
| WO | 2013/019281 | A1 | 2/2013 |
| WO | 2014/140922 | A2 | 9/2014 |
| WO | 2014/150172 | A2 | 9/2014 |
| WO | 2014/151692 | A2 | 9/2014 |
| WO | 2015/013275 | A1 | 1/2015 |
| WO | 2015/031812 | A1 | 3/2015 |
| WO | 2015/054646 | A2 | 4/2015 |
| WO | 2015/054667 | A1 | 4/2015 |
| WO | 2015/138726 | A1 | 9/2015 |
| WO | 2015/138740 | A1 | 9/2015 |
| WO | 2015/138747 | A1 | 9/2015 |
| WO | 2016/001489 | A1 | 1/2016 |
| WO | 2016/023558 | A1 | 2/2016 |
| WO | 2016/075545 | A1 | 5/2016 |
| WO | 2016/130777 | A1 | 8/2016 |
| WO | 2016/131416 | A1 | 8/2016 |
| WO | 2016/150951 | A1 | 9/2016 |
| WO | 2016/172119 | A1 | 10/2016 |
| WO | 2016/185013 | A1 | 11/2016 |
| WO | 2016/196025 | A1 | 12/2016 |
| WO | 2016/202796 | A1 | 12/2016 |
| WO | 2017/066849 | A1 | 4/2017 |
| WO | 2017/082823 | A1 | 5/2017 |
| WO | 2017/091826 | A1 | 6/2017 |
| WO | 2017/136110 | A1 | 8/2017 |
| WO | 2017/175020 | A1 | 10/2017 |
| WO | 2017/180381 | A1 | 10/2017 |
| WO | 2017/180388 | A1 | 10/2017 |
| WO | 2017/180454 | A1 | 10/2017 |
| WO | 2017/180563 | A1 | 10/2017 |
| WO | 2017/201029 | A1 | 11/2017 |
| WO | 2017/207476 | A1 | 12/2017 |
| WO | 2018/041904 | A1 | 3/2018 |
| WO | 2018/075605 | A1 | 4/2018 |
| WO | 2018/081697 | A1 | 5/2018 |
| WO | 2018/091660 | A1 | 5/2018 |
| WO | 2018/104383 | A1 | 6/2018 |
| WO | 2018/104384 | A1 | 6/2018 |
| WO | 2018/128754 | A1 | 7/2018 |
| WO | 2018/128755 | A1 | 7/2018 |
| WO | 2018/136740 | A2 | 7/2018 |
| WO | 2018/136744 | A1 | 7/2018 |
| WO | 2019/051337 | A1 | 3/2019 |
| WO | 2019/200257 | A1 | 10/2019 |

OTHER PUBLICATIONS

International Preliminary Report on Patentability received for PCT Patent Application No. PCT/US2017/057123, dated May 2, 2019, 27 pages.

Computer Generated Translation for DE 102007005214 B3, Generated on Aug. 29, 2023, https://worldwide.espacenet.com/ (Year: 2023).

Computer Generated Translation for DE 202008007068 U1, Generated on Aug. 29, 2023, https://worldwide.espacenet.com/ (Year: 2023).

International Search Report, ISA/US, PCT/US2017/057123 dated Dec. 10, 2017.

(56) References Cited

OTHER PUBLICATIONS

Written Opinion, ISA/US, PCT/US2017/057123 dated Dec. 10, 2017.
International Preliminary Report on Patentability received for PCT Patent Application No. PCT/US2019/027220, dated Oct. 22, 2020, 9 pages.

* cited by examiner

ELECTRO-MECHANICAL LOCK CORE

RELATED APPLICATIONS

This application claims the benefit of U.S. Provisional Patent Application Ser. No. 62/410,186, filed Oct. 19, 2016, titled ELECTRO-MECHANICAL CORE APPARATUS, SYSTEM, AND METHODS OF OPERATING AN ELECTRO-MECHANICAL CORE APPARATUS, the entire disclosure of which is expressly incorporated by reference herein.

FIELD

The present disclosure relates to lock cores and in particular to interchangeable lock cores having an electro-mechanical locking system.

BACKGROUND

Conventional locksets include a lock cylinder, a lock core that fits within the lock cylinder, and a token that cooperates with the lock core. The lock cylinder can take many forms. For example, the lock cylinder may be a padlock or part of a mortise lockset or cylindrical lockset. No matter what form the lock cylinder takes, the lock cylinder includes an opening that receives the lock core. Traditionally, the lock cores have included mechanical features that cooperated with a mechanical key to determine if the user of the key is granted or denied access through the lockset. Exemplary systems are provided in U.S. Pat. Nos. 4,424,693, 4,444,034, and 4,386,510.

Electronic access control systems interrogate a token having stored codes therein and compare the token codes with valid access codes before providing access to an area. See, for example, U.S. Pat. No. 5,351,042. If the token being interrogated has a valid access code, the electronic access control system interacts with portions of a lockset to permit the user of the token to gain access to the area protected by the lockset.

Access control systems may include mechanical and electrical access components to require that a token include both a valid "mechanical code", for example, an appropriately configured bitted blade to properly position mechanical tumblers, and the valid electronic access code before the user of the token is granted access. See, for example, U.S. Pat. Nos. 5,826,450, 5,768,925, and 5,685,182. Many of these electro-mechanical access control systems use power sources and access code validation systems which are not situated in the lock core.

Small format interchangeable core (SFIC) locks and large format interchangeable core (LFIC) locks are known. For many of SFIC and LFIC cores, the core is actuated by a key which when correctly bitted aligns the shear line and allows it to rotate. The rotation transfers to the throw members which then interface with whatever locking device the core happens to be installed in. A separate key is used to align a different shear line called the control which couples a core keeper for rotation with the control key. The control key turns about 15 degrees to retract the core keeper within an envelope of the interchangeable core which allows the interchangeable core to be installed and removed, hence interchangeable. The interchangeable concept allows mechanical cylinders to be removed from lock housings and re-installed into different housings. This can be done quickly and eliminates the need to have the mechanical cylinders rekeyed or re-pinned. Interchangeable cores are installed in many different products: cylindrical and mortise locks, exit devices, electro-mechanical locks and key switches, padlocks, and more.

Exemplary interchangeable cores are shown in U.S. Pat. No. 8,973,417. The interchangeable core disclosed in the '417 patent is shown to have a FIG. 8 design and configured to interact with an external key which mates with a key hole on the interchangeable core.

The technology of interchangeable lock cores has been traditionally controlled by mechanical mechanisms such as keys, pins, tumblers, and the like. When a key, or sometimes a master key, is lost or otherwise compromised it is sometimes necessary to replace each lock to which the compromised key had access. This particular process involves utilizing either a locksmith or other maintenance personnel to rekey or replace the interchangeable core with another core, and then requires the creation and redistribution of new keys. The compromise of a mechanical key in traditional security systems creates a considerable security risk and inconvenience.

However, the installed base of mechanical locks, including interchangeable mechanical locks, is entrenched and many customers will likely not replace their mechanical locks with electro-mechanical locks unless such replacement is relatively easy and inexpensive. This means that customers may only be persuaded to upgrade to electro-mechanical locks if the new lock is cost-effective. Also, the security offered by the electro-mechanical lock should be appropriate to justify the upgrade. Additionally, customers now look to incorporate technology into everyday household objects. Thus, there remains a need for an inexpensive, electro-mechanical core incorporating several advanced technologies.

SUMMARY

In an exemplary embodiment, an interchangeable electro-mechanical lock core is provided that has blocking member controlled by a number of elements.

In an exemplary embodiment of the present disclosure, an interchangeable lock core for use with a lock device having a locked state and an unlocked state is provided. The interchangeable core comprising a lock core body having an interior, a moveable plug, and a clutch. The lock core body including an upper portion having a first cylindrical portion with a first maximum lateral extent, a lower portion having a second cylindrical portion with a second maximum lateral extent, and a waist portion having a third maximum lateral extent, the third maximum lateral extent being less than the first maximum lateral extent and being less than the second maximum lateral extent, the lock core body having a first end and a second end opposite the first end. The moveable plug positioned within the lower portion of the lock core body proximate the first end of the lock core body. The moveable plug having a first position relative to the lock core body which corresponds to the lock device being in the locked state and a second position relative to the lock core body which corresponds to the lock device being in the unlocked state. The moveable plug being rotatable between the first position and the second position about a moveable plug axis. The clutch positioned in the lower portion of the lock core body between the moveable plug and the second end of the lock core body. The clutch being rotatable about the moveable plug axis and displaceable along the moveable plug axis. The interchangeable lock core further comprising a biasing member positioned to bias the clutch towards the second end of the lock core body along the moveable plug axis; an operator actuatable assembly supported by the lock core body, the operator actuatable assembly including an operator actuatable input device extending from the second end of the lock core body, the operator actuatable assembly being operatively coupled to the clutch; an electronic controller positioned in the upper portion of the lock core body; an electrical energy storage device positioned in the upper portion of the lock core body; and a blocker positioned in the interior of the lock core body. The blocker having a blocking position which maintains the clutch in a spaced apart relationship relative to the moveable plug along the moveable plug axis and a release position which permits a displacement of the clutch along the moveable plug axis to be operatively coupled to the moveable plug, the electronic controller positioning the blocker in one of the blocking position and the release position.

In one example thereof, the blocker is moveable along a blocker axis which is angled relative to the moveable plug axis. In a variation thereof, the blocker axis is perpendicular to the moveable plug axis.

In another example thereof, the blocker is at least partially positioned in the waist portion of the lock core body as the blocker moves from the blocking position to the release position.

In a further example thereof, the interchangeable lock core further comprises a motor positioned in the upper portion of the lock core body, and a threaded shaft driven by the motor about a blocker axis. The blocker being engaged with the threaded shaft, wherein the threaded shaft is rotated in a first direction about the blocker axis to move the blocker to the blocking position and the threaded shaft is rotated in a second direction about the blocker axis, opposite the first direction, to move the blocker to the release position.

In yet another example thereof, the blocker engages the clutch to restrict the displacement of the clutch along the moveable plug axis when the blocker is in the blocking position.

In yet a further example thereof, the blocker engages the clutch to restrict the displacement of the clutch along the moveable plug axis when the blocker is in the blocking position while permitting rotation of the clutch about the moveable plug axis through 360 degrees.

In still another example thereof, the clutch includes a shoulder and the blocker is positioned between the shoulder of the clutch and the moveable plug when the blocker is in the blocking position. In a variation thereof, the blocker is positioned above the shoulder of the clutch when the blocker is in the release position to permit the shoulder of the clutch to pass underneath the blocker when the clutch is moved along the moveable plug axis towards the moveable plug. In another variation thereof, the clutch includes a circumferential groove which receives the blocker when the blocker is in the blocking position, the shoulder of the clutch being a wall of the circumferential groove of the clutch.

In still a further example thereof, the interchangeable lock core further comprises a lock device interface accessible proximate the first end of the lock core body. The lock device interface adapted to be coupled to the lock device to actuate the lock device to one of the locked state of the lock device and the unlocked state of the lock device. In a variation thereof, the lock device interface is a portion of the moveable plug. In another variation thereof, the lock device interface is coupled to the moveable plug.

In yet still another example thereof, the clutch includes a first plurality of engagement features and the moveable plug includes a second plurality of engagement features. The first plurality of engagement features being spaced apart from the second plurality of engagement features along the moveable plug axis when the blocker is in the blocking position and the first plurality of engagement features being engaged with the second plurality of engagement features when the blocker is in the release position and the clutch has been displaced along the moveable plug axis towards the moveable plug due to an external force exerted on the operator actuatable assembly.

In yet still a further example thereof, the interchangeable lock core further comprises a core keeper moveably coupled to the lock core body, the core keeper being positionable in a retain position wherein the core keeper extends beyond an envelope of the lock core body to hold the lock core body in an opening of the lock device and a remove position wherein the core keeper is within the envelope of the lock core body to permit removal of the lock core body from the opening of the lock device. In a variation thereof, the core keeper is supported by a control sleeve, the control sleeve receiving the moveable plug. In a further variation thereof, the interchangeable lock core further comprises a control element supported by the moveable plug, the control element being moveable from a first position wherein the control element couples the moveable plug to the control sleeve and a second position wherein the control element permits the moveable plug to rotate independent of the control sleeve. In still a further variation thereof, the control element is received in an opening of the control sleeve when the control element is in the first position and the control element is spaced apart from the opening in the control sleeve when the control element is in the second position. In yet still a further variation thereof, the control element is actuatable from the second position to the first position through a central channel of the moveable plug.

In still yet another example thereof, the electronic controller includes an access granted logic which controls when to move the electronically controlled blocker from the blocking position to the release position.

In another exemplary embodiment of the present disclosure, a method of actuating a lock device with an interchangeable lock core having a longitudinal axis is provided. The method comprising the steps of: (a) receiving a first physical input through an operator actuatable assembly of the interchangeable lock core; (b) receiving electronic credentials of an operator device proximate the interchangeable lock core; (c) determining that the received electronic credentials provide access to actuate the interchangeable lock core to actuate the lock device; (d) moving a blocker of the interchangeable lock core from a blocking position to a release position to permit a clutch of the interchangeable core to be displaceable within an interior of the interchangeable lock core along the longitudinal axis of the interchangeable core, the clutch being operatively coupled to the operator actuatable assembly; (e) receiving a second physical input through the operator actuatable assembly, the second physical input being a displacement of an operator actuatable input device of the operator actuatable assembly along the longitudinal axis of interchangeable core towards a moveable plug of the interchangeable lock core; (f) engaging the moveable plug of the interchangeable lock core with the clutch due to the received second physical input and the blocker being in the release position; (g) receiving a third physical input through the operator actuatable assembly, the third physical input being a rotation of the operator actuatable input device of the operator actuatable assembly about the longitudinal axis; and (h) rotating the moveable plug of the interchangeable lock core due to the received third physical input and the clutch being engaged with the moveable plug of the interchangeable lock core.

In an example thereof, the second physical input further includes a rotation of the operator actuatable input device about the longitudinal axis of the interchangeable core. In a variation thereof, the displacement of the operator actuatable input device along the longitudinal axis of the interchangeable core precedes the rotation of the operator actuatable input device about the longitudinal axis of the interchangeable core.

In a further exemplary embodiment of the present disclosure, an interchangeable lock core for use with a lock device having a locked state and an unlocked state is provided. The interchangeable core comprising: a lock core body having an interior; a moveable plug positioned within a first portion of the interior of the lock core body, the moveable plug having a first position relative to the lock core body which corresponds to the lock device being in the locked state and a second position relative to the lock core body which corresponds to the lock device being in the unlocked state, the moveable plug being rotatable between the first position and the second position about a moveable plug axis; a clutch rotatable about the moveable plug axis and moveable along the moveable plug axis; and an electronically controlled blocker positioned in the interior of the lock core body, the electronically controlled blocker having a blocking position which maintains the clutch in a spaced apart relationship relative to the moveable plug along the moveable plug axis and a release position which permits a displacement of the clutch along the moveable plug axis to be operatively coupled to the moveable plug.

In an example thereof, the clutch is positioned in the interior of the lock core body.

In another example thereof, the interchangeable lock core further comprises an operator actuatable assembly supported by the lock core body and coupled to the clutch. The clutch being displaceable along the moveable plug axis in response to an external force exerted on an operator actuatable input device of the operator actuatable assembly. The operator actuatable input device extending from an end of the lock core body.

In yet another example thereof, the interchangeable lock core further comprises a biasing member. The biasing member positioned to bias the clutch to be operatively decoupled from the moveable plug. In a variation thereof, the biasing member is positioned between the clutch and the moveable plug and biases the clutch along the moveable plug axis away from the moveable plug.

In still another example thereof, the clutch is freely rotatable about the moveable plug axis when the electronically controlled blocker is positioned in the blocking position. In a variation thereof, the clutch is freely rotatable about the moveable plug axis when the electronically controlled blocker is positioned in the release position.

In still a further example, with the electronically controlled blocker positioned in the release position, the clutch is displaceable along the moveable plug axis to be operatively coupled to the moveable plug resulting in a rotation of the clutch about the moveable plug axis causing a corresponding rotation in the moveable plug about the moveable plug axis. In a variation thereof, the clutch supports a first plurality of engagement features and the moveable plug supports a second plurality of engagement features, the first plurality of engagement features and the second plurality of engagement features cooperating to operatively couple the clutch to the moveable plug.

In yet another example, the electronically controlled blocker is moveable along a blocker axis which is angled relative to moveable plug axis. In a variation thereof, the blocker axis is perpendicular to moveable plug axis. In another variation thereof, the interchangeable lock core further comprises a motor having a motor shaft rotatable about the blocker axis, the motor being operatively coupled to the electronically controlled blocker to move the electronically controlled blocker from the blocking position to the release position.

In yet still another example, the interchangeable lock core further comprises a motor positioned in the interior of the lock core body in a non-intersecting relationship with the moveable plug axis, the motor being operatively coupled to the electronically controlled blocker to move the electronically controlled blocker from the blocking position to the release position.

In yet still a further example, the interchangeable lock core further comprises an electronic controller operatively coupled to the electronically controlled blocker, the electronic controller including an access granted logic which controls when to move the electronically controlled blocker from the blocking position to the release position.

In yet a further exemplary embodiment, an interchangeable lock core for use with a lock device having a locked state and an unlocked state is provided. The interchangeable core comprising a lock core body having an interior; a moveable plug positioned within a first portion of the interior of the lock core body, the moveable plug having a first position relative to the lock core body which corresponds to the lock device being in the locked state and a second position relative to the lock core body which corresponds to the lock device being in the unlocked state, the moveable plug being rotatable between the first position and the second position about a moveable plug axis; and an electronically controlled blocker positioned in the interior of the lock core body and outside of an envelope of the moveable plug, the electronically controlled blocker having a blocking position which restricts an engagement with the moveable plug to rotate the moveable plug from the first position of the moveable plug to the second position of the moveable plug and a release position which permits the engagement with the moveable plug to rotate the moveable plug from the first position of the moveable plug to the second position of the moveable plug.

In an example thereof, the lock core body includes a first end and a second end opposite the first end, the electronically controlled blocker positioned between the moveable plug and the second end of the lock core body. In a variation thereof, the electronically controlled blocker is translatable along a direction angled relative to the moveable plug axis to move between the blocking position and the release position. In a further variation thereof, the electronically controlled blocker is translatable along a direction perpendicular to the moveable plug axis to move between the blocking position and the release position. In yet a further variation thereof, the interchangeable lock core further comprises an intermediate component between the electronically controlled blocker and the moveable plug, the engagement with the moveable plug to rotate the moveable plug from the first position of the moveable plug to the second position of the moveable plug is between the intermediate component and the moveable plug. In a further variation thereof, the intermediate component is a clutch moveable along the moveable plug axis from a first position of the clutch to a second position of the clutch when the electronically controlled blocker is in the release position, the second position of the clutch results in the engagement between the clutch and the moveable plug. In still a further variation thereof, the clutch supports a first plurality of engagement features and the moveable plug supports a second plurality of engagement features, the first plurality of engagement features and the second plurality of engagement features cooperating to cause the engagement between the clutch and the moveable plug.

In another example thereof, the interchangeable lock core further comprises a motor positioned in the interior of the lock core body and outside of the envelope of the moveable plug, the motor being operatively coupled to the electronically controlled blocker to move the electronically controlled blocker from the blocking position to the release position.

In yet a further example, the interchangeable lock core further comprises an electronic controller operatively coupled to the electronically controlled blocker, the electronic controller including an access granted logic which controls when to move the electronically controlled blocker from the blocking position to the release position.

In still a further exemplary embodiment of the present disclosure, an interchangeable lock core for use with a lock device having a locked state and an unlocked state is provided. The interchangeable core comprising a lock core body having an interior, the lock core body including an upper portion having a first cylindrical portion with a first maximum lateral extent, a lower portion having a second cylindrical portion with a second maximum lateral extent, and a waist portion having a third maximum lateral extent, the third maximum lateral extent being less than the first maximum lateral extent and being less than the second maximum lateral extent, the lock core body having a first end and a second end opposite the first end; a moveable plug positioned within the lower portion of the lock core body proximate the first end of the lock core body, the moveable plug having a first position relative to the lock core body which corresponds to the lock device being in the locked state and a second position relative to the lock core body which corresponds to the lock device being in the unlocked state, the moveable plug being rotatable between the first position and the second position about a moveable plug axis; and an electronically controlled blocker positioned in the interior of the body and axially between the second end of the lock core body and the moveable plug, the electronically controlled blocker having a blocking position which restricts an engagement with the moveable plug to rotate the moveable plug from the first position of the moveable plug to the second position of the moveable plug and a release position which permits the engagement with the moveable plug to rotate the moveable plug from the first position of the moveable plug to the second position of the moveable plug, wherein the electronically controlled blocker is moveable along a blocker axis, the blocker axis being angled relative to the moveable plug axis.

In an example thereof, the interchangeable lock core further comprises an electronic controller operatively coupled to the electronically controlled blocker. The electronic controller including an access granted logic which controls when to move the electronically controlled blocker from the blocking position to the release position.

In a further still exemplary embodiment of the present disclosure, an interchangeable lock core for use with a lock device having a locked state and an unlocked state is provided. The interchangeable core comprising a lock core body having an interior; a moveable plug positioned within a first portion of the interior of the lock core body, the moveable plug having a first position relative to the lock core body which corresponds to the lock device being in the locked state and a second position relative to the lock core body which corresponds to the lock device being in the unlocked state, the moveable plug being rotatable between the first position and the second position about a moveable plug axis; an electronically controlled blocker positioned in the interior of the lock core body, the electronically controlled blocker having a blocking position which restricts an engagement with the moveable plug to rotate the moveable plug from the first position of the moveable plug to the second position of the moveable plug and a release position which permits the engagement with the moveable plug to rotate the moveable plug from the first position of the moveable plug to the second position of the moveable plug; and an electronic controller positioned in the interior of the lock core body, the electronic controller receives at least one wireless input signal, the electronic controller moving the electronically controlled blocker to the release position in response to the received at least one wireless input signal indicating an authorized operator.

In an example thereof, the interchangeable lock core further comprises an operator actuatable assembly including an operator actuatable input device having an exterior, wherein the operator actuatable input device is rotatable about the moveable plug axis and the exterior of the operator actuatable input device prevents access to the moveable plug along the moveable plug axis. In a variation thereof, the operator actuatable input device is translatable along the moveable plug axis. In another variation thereof, wherein when the electronically controlled blocker is in the release position, the moveable plug is rotatable from the first position of the moveable plug to the second position of the moveable plug by translating the operator actuatable input device along the moveable plug axis towards the moveable plug to engage the moveable plug and subsequently rotating the operator actuatable input device about the moveable plug axis to rotate the moveable plug.

In still another exemplary embodiment of the present disclosure, an interchangeable lock core for use with a lock device having a locked state and an unlocked state is provided. The interchangeable core comprising: a lock core body having an interior; a moveable plug positioned within a first portion of the interior of the body, the moveable plug having a first position relative to the lock core body which corresponds to the lock device being in the locked state and a second position relative to the lock core body which corresponds to the lock device being in the unlocked state, the moveable plug being rotatable between the first position and the second position about a moveable plug axis; an operator actuatable assembly supported by the lock core body, the operator actuatable assembly having a first end proximate the moveable plug; and an electronically controlled blocker positioned in the interior of the lock core body, the electronically controlled blocker having a blocking position which restricts an engagement with the moveable plug to rotate the moveable plug from the first position of the moveable plug to the second position of the moveable plug and a release position which permits the engagement with the moveable plug to rotate the moveable plug from the first position of the moveable plug to the second position of the moveable plug, wherein the first end of the operator actuatable assembly is moveable relative to the moveable plug in a first number of degrees of freedom when the electronically controlled blocker is in the blocking position and a second number of degrees of freedom when the electronically controlled blocker is in the release position, the second number of degrees of freedom being greater than the first number of degrees of freedom and both the first number of degrees of freedom and the second number of degrees of freedom being greater than zero.

In an example thereof, the first end of the operator actuatable assembly is rotatable about the moveable plug axis and wherein the first number of degrees of freedom includes a rotation of the first end of the operator actuatable assembly about the moveable plug axis and the second number of degrees of freedom includes the rotation of the first end of the operator actuatable assembly about the moveable plug axis and a translation of the operator actuatable assembly along the moveable plug axis.

In another example thereof, the operator actuatable assembly includes an operator actuatable input device actuatable from an exterior of the lock core body, the operator actuatable input device being moveable in the second number of degrees of freedom when the blocker is in the blocking position while the first end of the operator actuatable assembly is restricted to the first number of degrees of freedom.

In yet another example thereof, the interchangeable lock core further comprises a clutch coupled to the first end of the operator actuatable assembly, wherein with the electronically controlled blocker positioned in the release position the clutch is displaceable along the moveable plug axis to be operatively coupled to the moveable plug. In a variation thereof, the clutch supports a first plurality of engagement features and the moveable plug supports a second plurality of engagement features, the first plurality of engagement features and the second plurality of engagement features cooperating to operatively couple the clutch to the moveable plug. In another variation thereof, the electronically controlled blocker is moveable along a blocker axis which is angled relative to moveable plug axis. In yet a further variation thereof, the interchangeable lock core further comprises a motor having a motor shaft rotatable about the blocker axis, the motor being operatively coupled to the electronically controlled blocker to move the electronically controlled blocker from the blocking position to the release position. In still yet a further variation thereof, the interchangeable lock core further comprises a motor positioned in the interior of the lock core body in a non-intersecting relationship with the moveable plug axis, the motor being operatively coupled to the electronically controlled blocker to move the electronically controlled blocker from the blocking position to the release position.

In a further example thereof, the interchangeable lock core further comprises an electronic controller operatively coupled to the electronically controlled blocker, the electronic controller including an access granted logic which controls when to move the electronically controlled blocker from the blocking position to the release position.

In yet a further still exemplary embodiment of the present disclosure, an interchangeable lock core for use with a lock device having a locked state and an unlocked state is provided. The interchangeable core comprising: a lock core body having an interior; a moveable plug positioned within a first portion of the interior of the lock core body proximate a first end of the lock core body, the moveable plug having a first position relative to the lock core body which corresponds to the lock device being in the locked state and a second position relative to the lock core body which corresponds to the lock device being in the unlocked state, the moveable plug being rotatable between the first position and the second position about a moveable plug axis; an operator actuatable assembly supported by the lock core body and having an operator actuatable input device extending from a second end of the lock core body; and an electronically controlled blocker positioned in the interior of the lock core body, the electronically controlled blocker having a blocking position which restricts an engagement with the moveable plug to rotate the moveable plug from the first position of the moveable plug to the second position of the moveable plug and a release position which permits the engagement with the moveable plug to rotate the moveable plug from the first position of the moveable plug to the second position of the moveable plug, wherein the operator actuatable assembly rotates about the moveable plug axis and the operator actuatable assembly is axially separated from the moveable plug along the moveable plug axis when the blocker is in the blocking position, the operator actuatable assembly being rotatable about the moveable plug axis when the blocker is in the blocking position and when the blocker is in the release position.

In an example thereof, the operator actuatable assembly is rotatable about the moveable plug axis when the blocker is in the blocking position through a 360 degree rotation.

In another example thereof, the interchangeable lock core further comprises a clutch, wherein a displacement of the operator actuatable assembly along the moveable plug axis towards the first end of the lock core body brings the clutch into engagement with the moveable plug, the displacement of the operator actuatable assembly along the moveable plug axis towards the second end of the lock core body being blocked when the blocker is in the blocking position and permitted when the blocker is in the release position.

In yet a another still exemplary embodiment of the present disclosure, an interchangeable lock core for use with a lock device having a locked state and an unlocked state, the interchangeable core comprising: a lock core body having an interior, the lock core body including an upper portion having a first maximum lateral extent, a lower portion having a second maximum lateral extent, and a waist portion having a third maximum lateral extent, the third maximum lateral extent being less than the first maximum lateral extent and being less than the second maximum lateral extent; a moveable plug positioned within a first portion of the interior of the lock core body proximate a first end of the lock core body, the moveable plug having a first position relative to the lock core body which corresponds to the lock device being in the locked state and a second position relative to the lock core body which corresponds to the lock device being in the unlocked state, the moveable plug being moveable between the first position and the second position; an electronically controlled blocker positioned in the interior of the lock core body, the electronically controlled blocker being moveable between a blocking position and a release position, at least a portion of the electronically controlled blocker being positioned in the waist portion of the lock core body as the electronically controlled blocker moves between the blocking position and the release position; and an operator actuatable assembly including an operator actuatable input device extending beyond a second end of the lock core body, wherein (1) when the electronically controlled blocker is in the blocking position the operator actuatable input device of the operator actuatable assembly is rotatable 360 degrees about a first axis relative to the lock core body and the operator actuatable assembly is operatively decoupled from the moveable plug and (2) when the electronically controlled blocker is in the release position the operator actuatable input device of the operator actuatable assembly is rotatable about the first axis and the moveable plug is engageable by the operator actuatable assembly to move the moveable plug from the first position to the second position.

In an example thereof, a movement of the moveable plug from the first position of the moveable plug to the second position of the moveable plug includes a rotation of the moveable plug. In a variation thereof, the rotation of the moveable plug is above the first axis.

In another example thereof, the interchangeable lock core further comprises a motor positioned in the interior of the lock core body, the motor being operatively coupled to the electronically controlled blocker to move the electronically controlled blocker from the blocking position to the release position. In a variation thereof, the motor is positioned outside of an envelope of the moveable plug.

In yet another example, the interchangeable lock core further comprises an electronic controller operatively coupled to the electronically controlled blocker, the electronic controller including an access granted logic which controls when to move the electronically controlled blocker from the blocking position to the release position.

In still yet a further still exemplary embodiment of the present disclosure, an interchangeable lock core for use with a lock device having a locked state and an unlocked state, the interchangeable core comprising: a lock core body having an interior; a moveable plug positioned within the interior of the lock core body proximate a first end of the lock core body, the moveable plug having a first position relative to the lock core body which corresponds to the lock device being in the locked state and a second position relative to the lock core body which corresponds to the lock device being in the unlocked state, the moveable plug being rotatable between the first position and the second position about a moveable plug axis; a clutch positioned in the lock core body between the moveable plug and a second end of the lock core body, the second end being opposite the first end, the clutch being rotatable about the moveable plug axis and displaceable along the moveable plug axis; a first biasing member positioned to bias the clutch in a first direction along the moveable plug axis away from the moveable plug; an operator actuatable input device operatively coupled to the clutch and being moveable along the moveable plug axis through a first distance relative to the clutch; a second biasing member positioned to bias the operator actuatable input device in the first direction along the moveable plug axis, the second biasing member exerting a higher force on the operator actuatable input device than the first biasing member exerts on the clutch; and a blocker positioned in the interior of the lock core body, the blocker having a first blocking position which maintains the clutch in a spaced apart relationship relative to the moveable plug along the moveable plug axis and a release position which permits a displacement of the clutch along the moveable plug axis in a second direction, opposite the first direction, to be operatively coupled to the moveable plug, wherein in the presence of an external force on the operator actuatable input device along the second direction (a) when the blocker is in the release position the first biasing member is overcome to operatively couple the operator actuatable input device to the moveable plug through the clutch due to a movement of both the operator actuatable input device and the clutch in the second direction and (b) when the blocker is in the blocking position the second biasing member is overcome and the operator actuatable input device is moved in the second direction relative to the clutch and contacts a stop surface to prevent further movement of the operator actuatable input device in the second direction.

In an example thereof, the stop surface is supported by the lock core body. In a variation thereof, the stop surface is the second end of the lock core body.

In another example, the first biasing member is a first spring positioned between the clutch and the moveable plug and the second biasing member is a second spring positioned between the clutch and the operator actuatable input device.

In still yet another still exemplary embodiment of the present disclosure, an interchangeable lock core for use with a lock device having a locked state and an unlocked state and an operator device is provided. The interchangeable core comprising: a lock core body having an interior, the lock core body including an upper portion having a first cylindrical portion with a first maximum lateral extent, a lower portion having a second cylindrical portion with a second maximum lateral extent, and a waist portion having a third maximum lateral extent, the third maximum lateral extent being less than the first maximum lateral extent and being less than the second maximum lateral extent, the lock core body having a first end and a second end opposite the first end; a moveable plug positioned within the lower portion of the lock core body proximate the first end of the lock core body, the moveable plug having a first position relative to the lock core body which corresponds to the lock device being in the locked state and a second position relative to the lock core body which corresponds to the lock device being in the unlocked state, the moveable plug being rotatable between the first position and the second position about a moveable plug axis; an operator actuatable input device operatively coupled to the moveable plug and being moveable along the moveable plug axis and about the moveable plug axis; a sensor supported by the lock core body, the sensor positioned to detect a movement of the operator actuatable input device relative to the moveable plug axis; an electronic controller positioned in the interior of the lock core body, the electronic controller in response to the sensor detecting the movement of the operator actuatable input device relative to the moveable plug axis monitors for a wireless signal from the operator device with an electronic credentials; and a blocker positioned in the interior of the lock core body, the blocker having a blocking position which restricts an engagement with the moveable plug to rotate the moveable plug from the first position of the moveable plug to the second position of the moveable plug and a release position which permits the engagement with the moveable plug to rotate the moveable plug from the first position of the moveable plug to the second position of the moveable plug, the electronic controller positioning the blocker in one of the blocking position and the release position.

In an example thereof, the electronic credentials is a single electronic credential. In another example thereof, the electronic credentials is a plurality of electronic credentials.

In a further example, the sensor detects a translation of the operator actuatable input device along the moveable plug axis. In a variation thereof, the sensor includes an actuator accessible from the second end of the lock core body, the operator actuatable input device contacts the actuator when the operator actuatable input device is translated along the moveable plug axis towards the first end of the lock core body. In a further variation thereof, the actuator is a button extending from the second end of the lock core body.

In still another example, the operator actuatable input device supports a magnet and the sensor monitors a magnetic field proximate the second end of the lock core body, a characteristic of the magnetic field changing as the operator actuatable input device is translated along the moveable plug axis. In a variation thereof, the magnet is a ring magnet.

In yet still another example, the sensor detects a rotation of the operator actuatable input device about the moveable plug axis. In a variation thereof, the operator actuatable input device supports a magnet and the sensor monitors a magnetic field proximate the second end of the lock core body, a characteristic of the magnetic field changing as the operator actuatable input device is rotated about the moveable plug axis.

In still another exemplary embodiment of the present disclosure, an interchangeable lock core for use with a lock device having a locked state and an unlocked state and an operator device is provided. The interchangeable core comprising: a lock core body having an interior, the lock core body including an upper portion having a first cylindrical portion with a first maximum lateral extent, a lower portion having a second cylindrical portion with a second maximum lateral extent, and a waist portion having a third lateral extent, the third lateral extent being less than the first maximum lateral extent and being less than the second maximum lateral extent, the lock core body having a first end and a second end opposite the first end; a moveable plug positioned within the lower portion of the lock core body proximate the first end of the lock core body, the moveable plug having a first position relative to the lock core body which corresponds to the lock device being in the locked state and a second position relative to the lock core body which corresponds to the lock device being in the unlocked state, the moveable plug being rotatable between the first position and the second position about a moveable plug axis; an operator actuatable input device operatively coupled to the moveable plug and being moveable along the moveable plug axis and about the moveable plug axis; a sensor supported by the lock core body, the sensor providing an indication of the operator device proximate the lock core body; an electronic controller positioned in the lock core body, the electronic controller in response to the sensor detecting the operator device proximate the lock core body monitors for a wireless signal from the operator device with an electronic credentials; and a blocker positioned in the interior of the lock core body, the blocker having a blocking position which restricts an engagement with the moveable plug to rotate the moveable plug from the first position of the moveable plug to the second position of the moveable plug and a release position which permits the engagement with the moveable plug to rotate the moveable plug from the first position of the moveable plug to the second position of the moveable plug, the electronic controller positioning the blocker in one of the blocking position and the release position, the electronically controlled blocker is at least partially positioned in the waist portion of the lock core body as the blocker moves from the blocking position to the release position.

In an example thereof, the sensor is one of a capacitive sensor, an inductive sensor, and an ultrasonic sensor.

In another example thereof, the interchangeable lock core further comprises an intermediate component between the electronically controlled blocker and the moveable plug, the engagement with the moveable plug to rotate the moveable plug from the first position of the moveable plug to the second position of the moveable plug is between the intermediate component and the moveable plug. In a variation thereof, the intermediate component is a clutch moveable along the moveable plug axis from a first position of the clutch to a second position of the clutch when the electronically controlled blocker is in the release position, the second position of the clutch results in the engagement between the clutch and the moveable plug. In another variation thereof, the clutch supports a first plurality of engagement features and the moveable plug supports a second plurality of engagement features, the first plurality of engagement features and the second plurality of engagement features cooperating to cause the engagement between the clutch and the moveable plug.

In a further example thereof, the interchangeable lock core further comprises a motor positioned in the interior of the lock core body and outside of an envelope of the moveable plug, the motor being operatively coupled to the electronically controlled blocker to move the electronically controlled blocker from the blocking position to the release position. In a variation thereof, the electronically controlled blocker is translated along a blocker axis as the electronically controlled blocker moves from the blocking position to the release position.

In yet a further exemplary embodiment of the present disclosure, an interchangeable lock core for use with a lock device having a locked state and an unlocked state, the lock device including a privacy input which may be actuated to indicate the lock device should remain in the locked state is provided. The interchangeable lock core comprising: a lock core body having an interior; a moveable plug positioned within a first portion of the interior of the lock core body, the moveable plug having a first position relative to the lock core body which corresponds to the lock device being in the locked state and a second position relative to the lock core body which corresponds to the lock device being in the unlocked state, the moveable plug being rotatable between the first position and the second position about a moveable plug axis; an electronically controlled blocker positioned in the interior of the lock core body, the electronically controlled blocker having a blocking position which restricts an engagement with the moveable plug to rotate the moveable plug from the first position of the moveable plug to the second position of the moveable plug and a release position which permits the engagement with the moveable plug to rotate the moveable plug from the first position of the moveable plug to the second position of the moveable plug; and an electronic controller positioned in the interior of the lock core body which receives at least one wireless input signal, the electronic controller moving the electronically controlled blocker in the release position in response to both (a) a first wireless signal of the received at least one wireless input signal indicating an authorized operator and (b) an indication that the privacy input has not been actuated to an activated privacy state.

In an example thereof, the indication that the privacy input has not been actuated to the activated privacy state is received by the electronic controller as a second wireless input signal. In a variation thereof, both the first wireless input signal and the second wireless input signal are BLUETOOTH advertising packets.

In another example, the indication that the privacy input has not been actuated to the activated privacy state is an absence of a second wireless input signal received by the electronic controller.

In another yet exemplary embodiment of the present disclosure, a lock system for use with a door having an exterior side and an interior side and a strike mounted to a door frame is provided. The lock system having an opening on the exterior side of the door. The lock system comprising a first operator actuatable input device actuatable from the exterior side of the door; a second operator actuatable input device actuatable from the interior side of the door; a lock device positioned between the first operator actuatable input device and the second operator actuatable input device, the lock device including a latch, the latch having an extended position wherein the latch is positioned in the strike and a retracted position wherein the latch is retracted from the strike; a privacy input actuatable from the interior side of the door, the privacy input may be actuated to an activated privacy state to indicate the lock device should remain in a locked state; and an interchangeable lock core positioned in the opening of the lock system on the exterior side of the door. The interchangeable lock core including a lock core body having an interior; a moveable plug positioned within the interior of the lock core body, the moveable plug having a first position relative to the lock core body which corresponds to the lock device being in the locked state wherein the latch is maintained in the extended position and a second position relative to the lock core body which corresponds to the lock device being in an unlocked state wherein the latch may be moved to the retracted position, the moveable plug being rotatable between the first position and the second position about a moveable plug axis; an electronically controlled blocker positioned in the interior of the lock core body, the electronically controlled blocker having a blocking position which restricts an engagement with the moveable plug to rotate the moveable plug from the first position of the moveable plug to the second position of the moveable plug and a release position which permits the engagement with the moveable plug to rotate the moveable plug from the first position of the moveable plug to the second position of the moveable plug; and an electronic controller which receives at least one wireless input signal, the electronic controller moving the electronically controlled blocker to the release position in response to both (a) a first wireless signal of the received at least one wireless input signal indicating an authorized operator and (b) an indication that the privacy input has not been actuated to an activated privacy state.

In an example thereof, the indication that the privacy input has not been actuated to the activated privacy state is received by the electronic controller as a second wireless input signal. In a variation thereof, both the first wireless input signal and the second wireless input signal are BLUETOOTH advertising packets.

In another example thereof, the indication that the privacy input has not been actuated to the activated privacy state is an absence of a second wireless input signal received by the electronic controller.

In a further example thereof, the lock system further comprises a visual indicator viewable from the interior side of the door, the visual indicator provides a status of the privacy input.

In a further still example thereof, the privacy input is supported by the second operator actuatable input device actuatable from the interior side of the door.

In a yet further example thereof, the lock system further comprises a first antenna operatively coupled to the electronic controller and positioned to monitor the exterior side of the door; a second antenna operatively coupled to the electronic controller and positioned to monitor the interior side of the door, wherein the electronic controller discards the at least one wireless input signal if received by the second antenna.

In yet another example thereof, an actuation of the second operator actuatable device cancels the activated privacy state of the privacy input. In a variation thereof, the actuation of the second operator actuatable device is a rotation of the second operator actuatable device.

In a further example thereof, the lock system further comprises a movement sensor, the movement sensor monitoring the second operator actuatable device. In a variation thereof, the movement sensor is one of a vibration sensor, a tilt sensor, and an accelerometer.

In still a further exemplary embodiment of the present disclosure an interchangeable lock core for use with a lock device having a locked state and an unlocked state is provided. The lock device including an opening sized to receive the interchangeable lock core. The interchangeable lock core comprising: a lock core body having an interior, the lock core body including an upper portion having a first maximum lateral extent, a lower portion having a second maximum lateral extent, and a waist portion having a third maximum lateral extent, the third maximum lateral extent being less than the first maximum lateral extent and being less than the second maximum lateral extent, the lower portion, the upper portion, and the waist portion forming an envelope of the lock core body; a moveable plug positioned within a first portion of the interior of the lock core body proximate a first end of the lock core body, the moveable plug having a first position relative to the lock core body which corresponds to the lock device being in a locked state and a second position relative to the lock core body which corresponds to the lock device being in the unlocked state, the moveable plug being rotatable between the first position and the second position about a moveable plug axis; a core keeper moveably coupled to the lock core body, the core keeper being positionable in a retain position wherein the core keeper extends beyond the envelope of the lock core body to hold the lock core body in the opening of the lock device and a remove position wherein the core keeper is within the envelope of the lock core body to permit removal of the lock core body from the opening of the lock device; an electronically controlled blocker positioned in the interior of the lock core body, the electronically controlled blocker being moveable between a blocking position and a release position; and an operator actuatable assembly including an operator actuatable input device extending beyond a second end of the lock core body, wherein the operator actuatable input device blocks access to the interior of the lock core body, the moveable plug is movable from the first position to the second position with the operator actuatable input device being assembled to the lock core body, and the operator actuatable input device must be removed from a remainder of the interchangeable lock core prior to moving the core keeper from the retain position to the release position.

In an example thereof, the interchangeable core further comprises a control sleeve rotatable about the moveable plug axis, the control sleeve supporting the core keeper. In a variation thereof, the moveable plug is received within an interior of the control sleeve. In another variation thereof, the control sleeve is positioned in the interior of the lock core body. In a further variation thereof, the lower portion of the lock core body includes an opening and the control sleeve is positioned in the opening of the lower portion of the lock core body. In still a further variation thereof, the interchangeable core further comprises at least a first coupler received in at least a first opening of the moveable plug, the first coupler being moveable in a direction angled relative to the moveable plug axis to couple the control sleeve to the moveable plug such that a rotation of the moveable plug about the moveable plug axis causes a rotation of the control sleeve about the moveable axis. In still a further variation thereof, the moveable plug includes a central keyway along the moveable plug axis, the first coupler extending into the central keyway, wherein with the operator actuatable input device removed from the remainder of the interchangeable lock core, the keyway is accessible from the second end of the lock core body.

In yet another exemplary embodiment of the present disclosure, a method of actuating a lock device with an interchangeable lock core having a longitudinal axis is provided. The method comprising the steps of (a) receiving a first physical input through an exterior of an operator actuatable input device of an operator actuatable assembly of the interchangeable lock core; (b) generating a first broadcast message with an electronic controller positioned within the interchangeable lock core in response to receiving the first physical input; (c) broadcasting the first broadcast message; (d) receiving a second broadcast message from an operator device positioned proximate the interchangeable lock core, the second broadcast message including an electronic credentials of the operator device proximate the interchangeable lock core; (e) determining that the received electronic credentials provide access to actuate the interchangeable lock core to actuate the lock device; (f) moving a blocker of the interchangeable lock core from a blocking position to a release position to permit a rotation of a moveable plug of the interchangeable core; and (g) receiving at least a second physical input through the operator actuatable assembly to rotate the moveable plug of the interchangeable lock core, the second physical input including a translation of the operator actuatable input device along the longitudinal axis of the interchangeable core.

In an example thereof, the second physical input is through the exterior of the operator actuatable input device of the operator actuatable assembly. In a variation thereof, the second physical input further includes a rotation of the operator actuatable input device about the longitudinal axis of the interchangeable core. In a further variation thereof, the translation of the operator actuatable input device along the longitudinal axis of the interchangeable core precedes the rotation of the operator actuatable input device about the longitudinal axis of the interchangeable core.

In another example thereof, the first broadcast message includes an interchangeable core identifier of the interchangeable core and a challenge number and the second broadcast message includes an operator device identifier and an encrypted challenge response generated with a first key accessible by the operator device. In a variation thereof, the step of determining that the received electronic credentials provide access to actuate the interchangeable lock core to actuate the lock device includes the steps of: selecting a second key accessible by the interchangeable lock core, the second key being associated with the operator device identifier; encrypting the challenge number with the second key; and determining that the encrypted challenge number matches the received encrypted challenge response.

In still another example thereof, the first broadcast message is a BLUETOOTH advertising packet. In yet another example thereof, the second broadcast message is a BLUETOOTH advertising packet.

In a further still example, the first broadcast message includes a current state of the interchangeable core and the second broadcast message includes a requested state of the interchangeable core. In a variation thereof, the method further comprises the steps of updating the current state of the interchangeable core to the requested state. In a further yet example, the challenge number is a random number.

In another yet still exemplary embodiment of the present disclosure, an interchangeable lock core for use with a lock device having a locked state and an unlocked state and an operator device positioned proximate the interchangeable core is provided. The interchangeable core comprising: a lock core body having an interior and a longitudinal axis; a moveable plug positioned within the interior of the lock core body along the longitudinal axis of the lock core body and proximate a first end of the lock core body, the moveable plug having a first position relative to the lock core body which corresponds to the lock device being in the locked state and a second position relative to the lock core body which corresponds to the lock device being in the unlocked state; an electronically controlled blocker positioned in the interior of the lock core body, the electronically controlled blocker having a blocking position which restricts an engagement with the moveable plug to rotate the moveable plug from the first position of the moveable plug to the second position of the moveable plug and a release position which permits the engagement with the moveable plug to rotate the moveable plug from the first position of the moveable plug to the second position of the moveable plug; an operator actuatable assembly including an operator actuatable input device having an exterior, the operator actuatable input device extending from a second end of the lock core body; and an electronic controller configured to (1) broadcast a first broadcast message in response to a first physical input through the exterior of the operator actuatable input device, (2) receive a second broadcast message including an electronic credentials of the operator device proximate the interchangeable lock core in response to the first broadcast message, (3) determine that the received electronic credentials provide access to move the moveable plug from the first position of the moveable plug to the second position of the moveable plug, and (4) in response to the determination that the received electronic credentials provide access to move the moveable plug from the first position of the moveable plug to the second position of the moveable plug, move the blocker from the blocking position to the release position to permit the operator actuatable input device to translate along the longitudinal axis of the lock core body to actuate the moveable plug.

In an example thereof, the electronically controlled blocker is positioned outside of an envelope of the moveable plug.

In another example thereof, the first broadcast message includes an interchangeable core identifier of the interchangeable core and a challenge number and the second broadcast message includes an operator device identifier and an encrypted challenge response generated with a first key accessible by the operator device. In a variation thereof, the electronic controller determines that the received electronic credentials provide access to move the moveable plug from the first position of the moveable plug to the second position of the moveable plug by encrypting the challenge number with a second key accessible by the electronic controller and associated with the operator device identifier and determining that the encrypted challenge number matches the received encrypted challenge response.

In a further example thereof, the first broadcast message is a BLUETOOTH advertisement message. In yet a further example thereof, the second broadcast message is a BLUETOOTH advertisement message.

In still a further example thereof, the first broadcast message includes a current state of the interchangeable core and the second broadcast message includes a requested state of the interchangeable core.

In a further yet exemplary embodiment of the present disclosure, a method of actuating a lock device with an interchangeable lock core having a longitudinal axis is provided. The method comprising the steps of: (a) receiving a first physical input through an exterior of an operator actuatable input device of an operator actuatable assembly of the interchangeable lock core; (b) scanning for a first wireless signal from an operator device proximate the interchangeable lock core; (c) generating a first broadcast message with an electronic controller positioned within the interchangeable lock core in response to receiving the first physical input and receiving the first wireless signal from the operator device proximate the interchangeable lock core; (d) broadcasting the first broadcast message; (e) receiving a second broadcast message from the operator device positioned proximate the interchangeable lock core, the second broadcast message including an electronic credentials of the operator device proximate the interchangeable lock core; (f) determining that the received electronic credentials provide access to actuate the interchangeable lock core to actuate the lock device; (g) moving a blocker of the interchangeable lock core from a blocking position to a release position to permit a rotation of a moveable plug of the interchangeable core; and (h) receiving at least a second physical input through the operator actuatable assembly to rotate the moveable plug of the interchangeable lock core, the second physical input including a translation of the operator actuatable input device along the longitudinal axis of the interchangeable core.

In a still further yet exemplary embodiment of the present disclosure, a method of actuating a lock device with an interchangeable lock core having a longitudinal axis is provided. The method comprising the steps of: (a) receiving a broadcast message from an operator device positioned proximate the interchangeable lock core, the broadcast message including an electronic credentials of the operator device proximate the interchangeable lock core; (b) determining that the received electronic credentials provide access to actuate the interchangeable lock core to actuate the lock device; (c) determining if this is an inaugural attempt to use the electronic credentials to actuate the lock device, and if so, launch instructional information on a display of the operator device; (d) subsequent to the instructional information on the display of the operator device being displayed, moving a blocker of the interchangeable lock core from a blocking position to a release position to permit an engagement of a moveable plug of the interchangeable core; and (e) receiving at least one physical input through an operator actuatable input device to rotate the moveable plug of the interchangeable lock core.

In an example thereof, the at least one physical input includes a translation of the operator actuatable input device along the longitudinal axis of the interchangeable core. In a variation thereof, the at least one physical input further includes a rotation of the operator actuatable input device about the longitudinal axis of the interchangeable core. In a further variation thereof, the translation of the operator actuatable input device along the longitudinal axis of the interchangeable core precedes the rotation of the operator actuatable input device about the longitudinal axis of the interchangeable core.

In another example thereof, the method further comprises the steps of: detecting an improper operation of the interchangeable core; and providing a notification on the display of the operator device of the improper operation.

In a further yet still exemplary embodiment of the present disclosure, a method of generating keys for a plurality of operator devices, the electronic keys providing access to a plurality of interchangeable electro-mechanical lock cores, is provided. The method comprising the steps of: (a) receiving a plurality of core electronic keys associated with the plurality of interchangeable electro-mechanical lock cores, each of the plurality of core electronic keys being based on a system master electronic key and at least one identifier associated with the respective interchangeable electro-mechanical lock core; and (b) for each of the plurality of operator devices, generating an operator device key for at least one of the plurality of interchangeable electro-mechanical lock cores, a first operator device key for a first operator device of the plurality of operator devices being based on the core electronic key for a first interchangeable electro-mechanical lock core of the plurality of interchangeable electro-mechanical lock cores, at least one identifier associated with the first operator device, and access rights assigned to the first operator device for the first interchangeable electro-mechanical lock core of the plurality of interchangeable electro-mechanical lock cores.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplification set out herein illustrate exemplary embodiments of the present disclosure and such exemplifications are not to be construed as limiting the scope of the present disclosure in any manner.

DETAILED DESCRIPTION OF THE DRAWINGS

Figure 1:
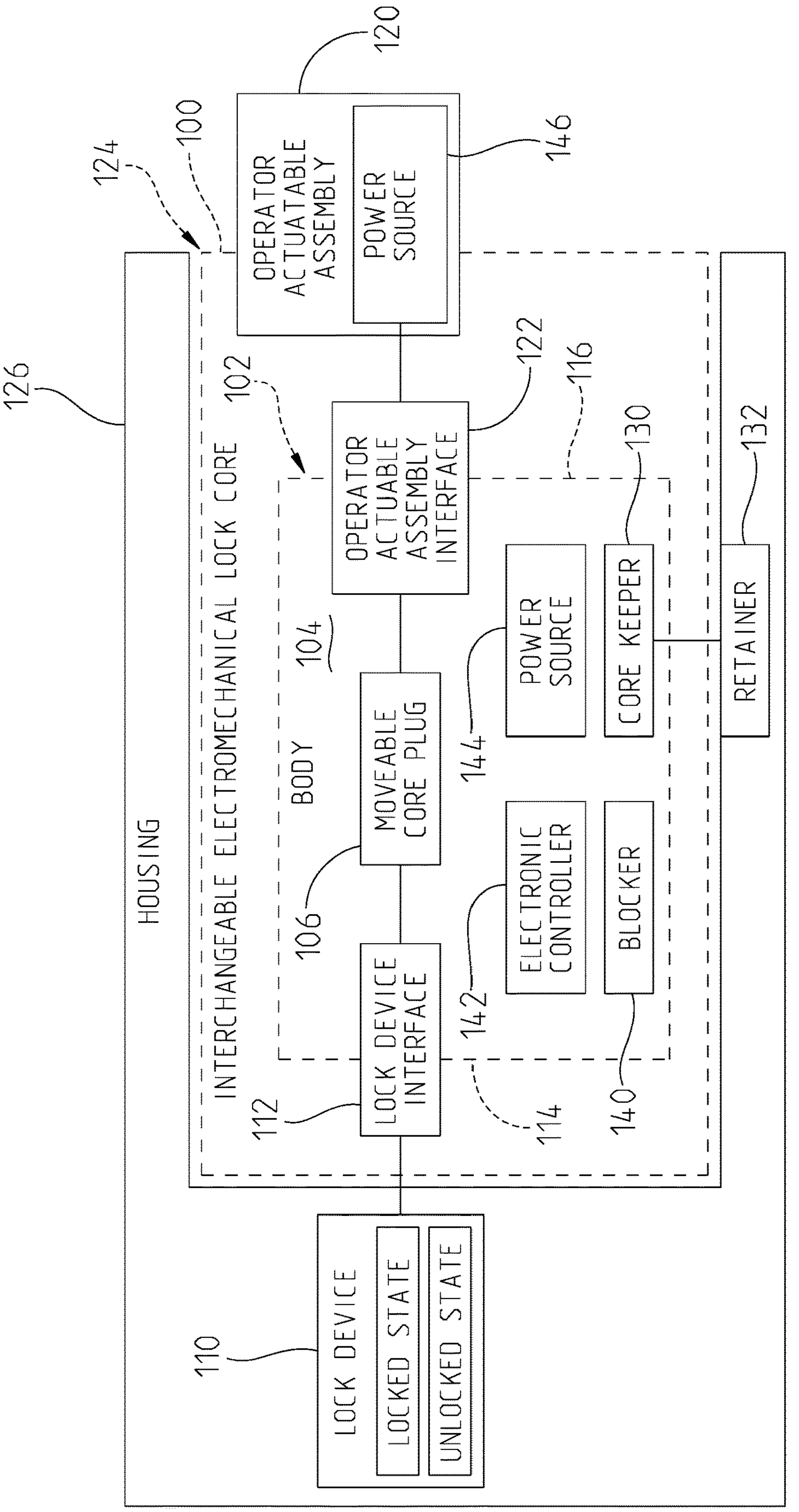
FIG. 1 illustrates a representative view of an exemplary interchangeable electro-mechanical lock core assembled in a housing.

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other).

In some instances throughout this disclosure and in the claims, numeric terminology, such as first, second, third, and fourth, is used in reference to various components or features. Such use is not intended to denote an ordering of the components or features. Rather, numeric terminology is used to assist the reader in identifying the component or features being referenced and should not be narrowly interpreted as providing a specific order of components or features.

Referring to FIG. 1, an interchangeable electro-mechanical lock core 100 is represented. Interchangeable electro-mechanical lock core 100 includes a lock core body 102 having an interior 104. Lock core body 102 may be a single unitary component, a multi-piece assembly and may include one or more openings in a first end 114, a second end 116, and/or along a side of lock core body 102.

The interior 104 of lock core body 102 includes a moveable core plug 106 which may be operatively coupled to a lock device 110 through a lock device interface 112 of lock core body 102. Lock device 110 has a locked configuration wherein access is denied to an area, an article, a mechanical actuator, an electrical actuator (e.g. a switch), or other device and an unlocked configuration wherein access is permitted to the area, the article, the mechanical actuator, the electrical actuator, or other device. For instance, a lock device may be part of a door lock system (see for example FIGS. 5 and 7) and have a locked configuration wherein a latchbolt of the door lock system cannot be actuated and an unlocked configuration wherein the latchbolt of the door lock system may be actuated. In another example, a lock device may be part of a padlock (see for example FIG. 6) and have a locked configuration wherein a shank of the padlock cannot be removed from a body of the padlock and an unlocked configuration wherein an end of the shank can be removed from the body. In a further example, the lock device may be part of a lighting system and have a locked configuration wherein an actuator of the lights of the lighting system cannot be changed from an off state to an on state and an unlocked configuration wherein the actuator of the lights of the lighting system can be changed from the off state to the on state Moveable core plug 106 may further be operatively coupled to an operator actuatable assembly 120 through an operator actuatable assembly interface 122. Moveable core plug 106 may be a single unitary component or a multi-piece assembly. Exemplary operator actuatable assemblies include operator actuatable input devices, such as knobs, levers, handles, and other suitable devices for actuation by a human operator.

Interchangeable electro-mechanical lock core 100 is received in an opening 124 of a housing 126. Exemplary housings include lock cylinders, such as for mortise locks or rim cylinders, handles, knobs, and padlock bodies.

Interchangeable electro-mechanical lock core 100 further includes a core keeper 130. Core keeper 130, also known as a control element or side bar in the art, interacts with a retainer 132 of housing 126. Exemplary retainers 132 include recesses in the wall of the housing 126 or other suitable features. In one example, core keeper 130 projects from an envelope of lock core body 102 (such as envelope 236 in FIG. 3A) into a recess in the wall of housing 126 to retain interchangeable electro-mechanical lock core 100 in housing 126 and core keeper 130 is retracted into the envelope of lock core body 102 (such as envelope 236 in FIG. 3A) to permit the removal of interchangeable electro-mechanical lock core 100 from housing 126.

Moveable core plug 106 has a first position relative to lock core body 102 which corresponds to lock device 110 being in a locked state and a second position relative to lock core body 102 which corresponds to lock device 110 being in an unlocked state. Moveable core plug 106 is moveable between the first position and the second position. In one embodiment, moveable core plug 106 is rotatable between the first position and the second position about a moveable plug axis.

Interchangeable electro-mechanical lock core 100 further includes a blocker 140. Blocker 140 is positioned in interior 104 of lock core body 102 and has a first blocking position which restricts a movement of moveable core plug 106 from the first position to the second position through an actuation of operator actuatable assembly 120 and a release position which permits a movement of moveable core plug 106 from the first position to the second position through an actuation of operator actuatable assembly 120. In one embodiment, blocker 140 prevents an engagement of moveable core plug 106 by operator actuatable assembly 120 or an intermediate component or assembly actuated by operator actuatable assembly 120 when blocker 140 is in the blocked position and permits an engagement of moveable core plug 106 by operator actuatable assembly 120 or an intermediate component or assembly when blocker 140 is in the release position. In one example, a clutch is provided between moveable core plug 106 and operator actuatable assembly 120. When blocker 140 is in the blocked position, the clutch is maintained in a spaced apart relationship relative to the moveable plug 106 and when blocker 140 is in the release position the clutch is moveable into engagement with moveable core plug 106. Exemplary embodiments 200 and 700 of interchangeable electro-mechanical lock core are disclosed herein and each includes a clutch 280, 780 which interacts with a corresponding blocker 260 and moveable plug 220, 720.

Interchangeable electro-mechanical lock core 100 further includes an electronic controller 142. Electronic controller 142 includes logic which controls the position of blocker 140 in either the blocking position or the release position. The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. This disclosure contemplates other embodiments in which electronic controller 142 is not microprocessor-based, but rather is configured to control operation of blocker 140 and/or other components of interchangeable electro-mechanical lock core 100 based on one or more sets of hardwired instructions. Further, electronic controller 142 may be contained within a single device or be a plurality of devices networked together or otherwise electrically connected to provide the functionality described herein.

A power source 144 is also included in interchangeable electro-mechanical lock core 100. Power source 144 is an electrical energy storage device which provides power to electronic controller 142 and other components of interchangeable electro-mechanical lock core 100. Exemplary electrical energy storage devices include capacitors, flywheels, batteries, and other devices which store energy that may be used to generate electrical energy. In one embodiment, power source 144 is positioned in interior 104 of lock core body 102. In another embodiment, power source 144 is replaced with a power source 146 supported by operator actuatable assembly 120, such as a battery provided in a knob or other operator actuatable input device of operator actuatable assembly 120. In one embodiment, interchangeable electro-mechanical lock core 100 includes both power source 144 and power source 146. For example, power source 144 may be a capacitor which is charged by power source 146 which may be a battery.

Figure 2:
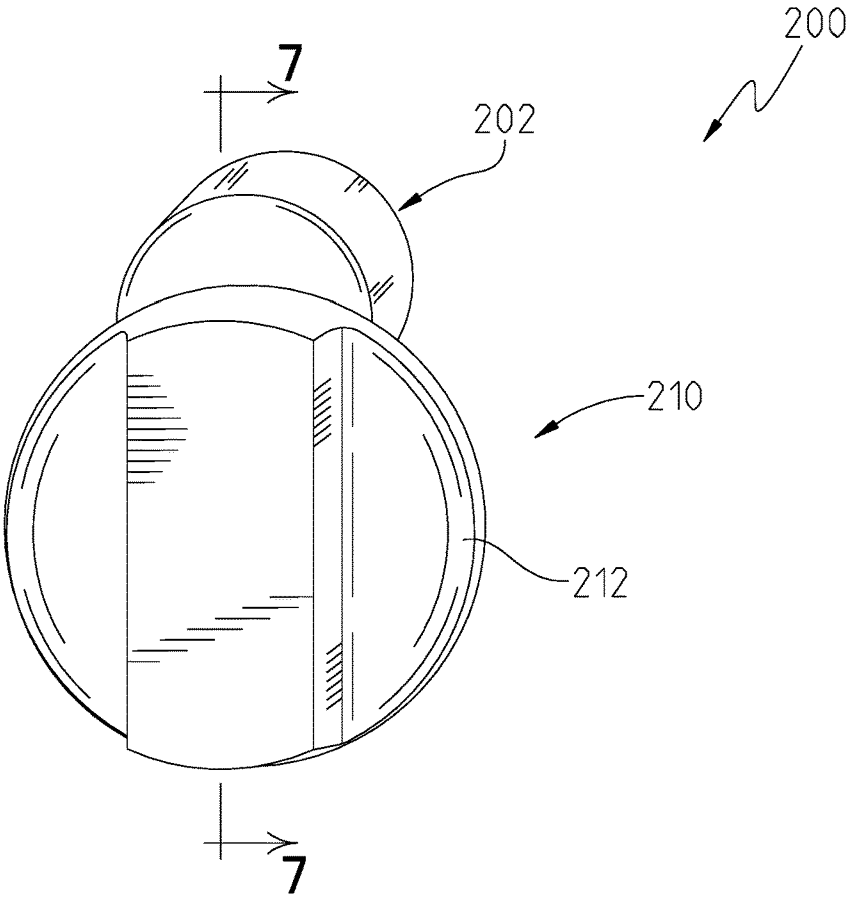
FIG. 2 illustrates a front view of an exemplary embodiment of the exemplary interchangeable electro-mechanical lock core of FIG. 1.
Figure 3:
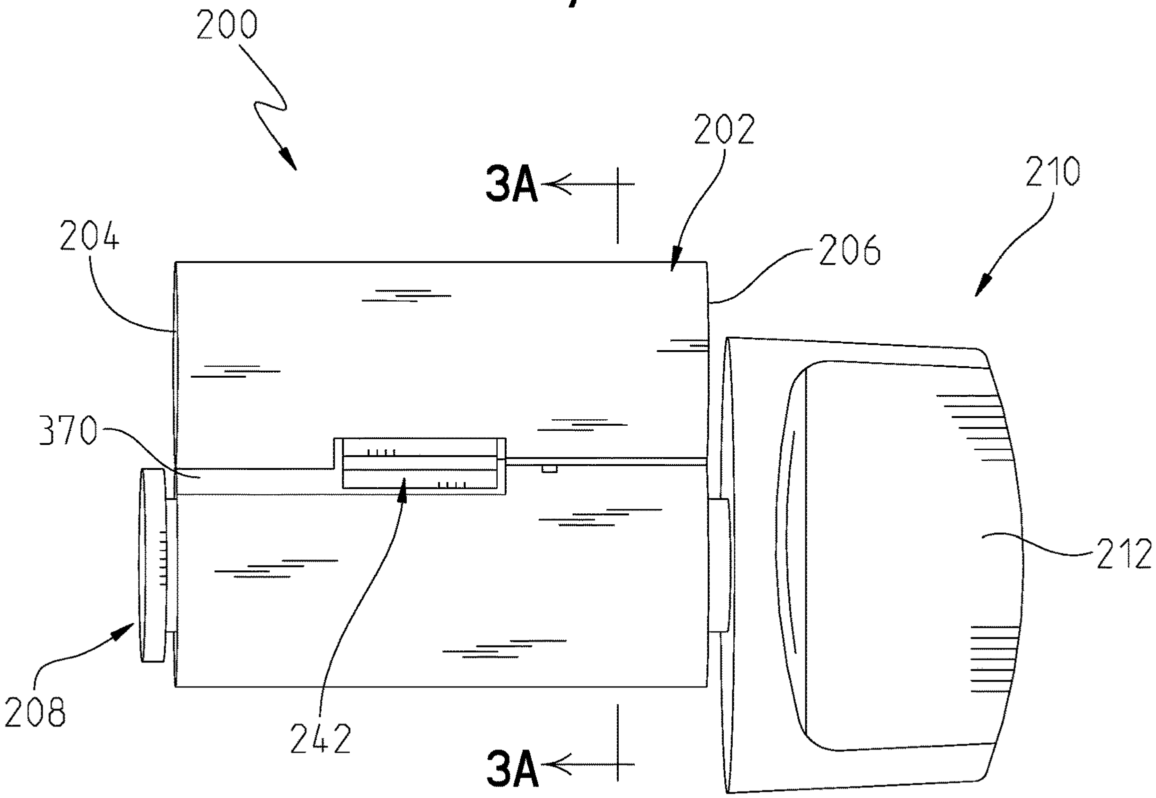
FIG. 3 illustrates a side view of the interchangeable electro-mechanical lock core of FIG. 2.

Referring to FIGS. 2 and 3, an exemplary interchangeable electro-mechanical lock core 200 according to the description of interchangeable electro-mechanical lock core 100 is shown. Interchangeable electro-mechanical lock core 200 includes a lock core body 202 having a first end 204 and a second end 206. A locking device interface 208 is illustrated as extending from the first end 204 of lock core body 202. As is known in the art, locking device interface may include one or more recesses and/or one or more protrusions which interface with cam members, tailpieces, or other types of throw members which in turn interact with a locking device 110 or are a locking device 110. Although locking device interface 208 is shown as extending from first end 204 of lock core body 202, locking device interface 208 may be positioned within an interior of lock core body 202 or both extend from and extend into lock core body 202.

An operator actuatable assembly 210 is shown supported by interchangeable electro-mechanical lock core 200. Operator actuatable assembly 210 is operatively coupled to a moveable core plug 220 (see FIG. 7) through an operator actuatable interface 222 (see FIG. 7). Operator actuatable assembly 210 includes an operator actuatable input device 212, illustratively a knob. Other exemplary operator actuatable input devices include levers, handles, and other actuatable devices having an exterior surface that may be gripped by an operator.

Figure 3A:
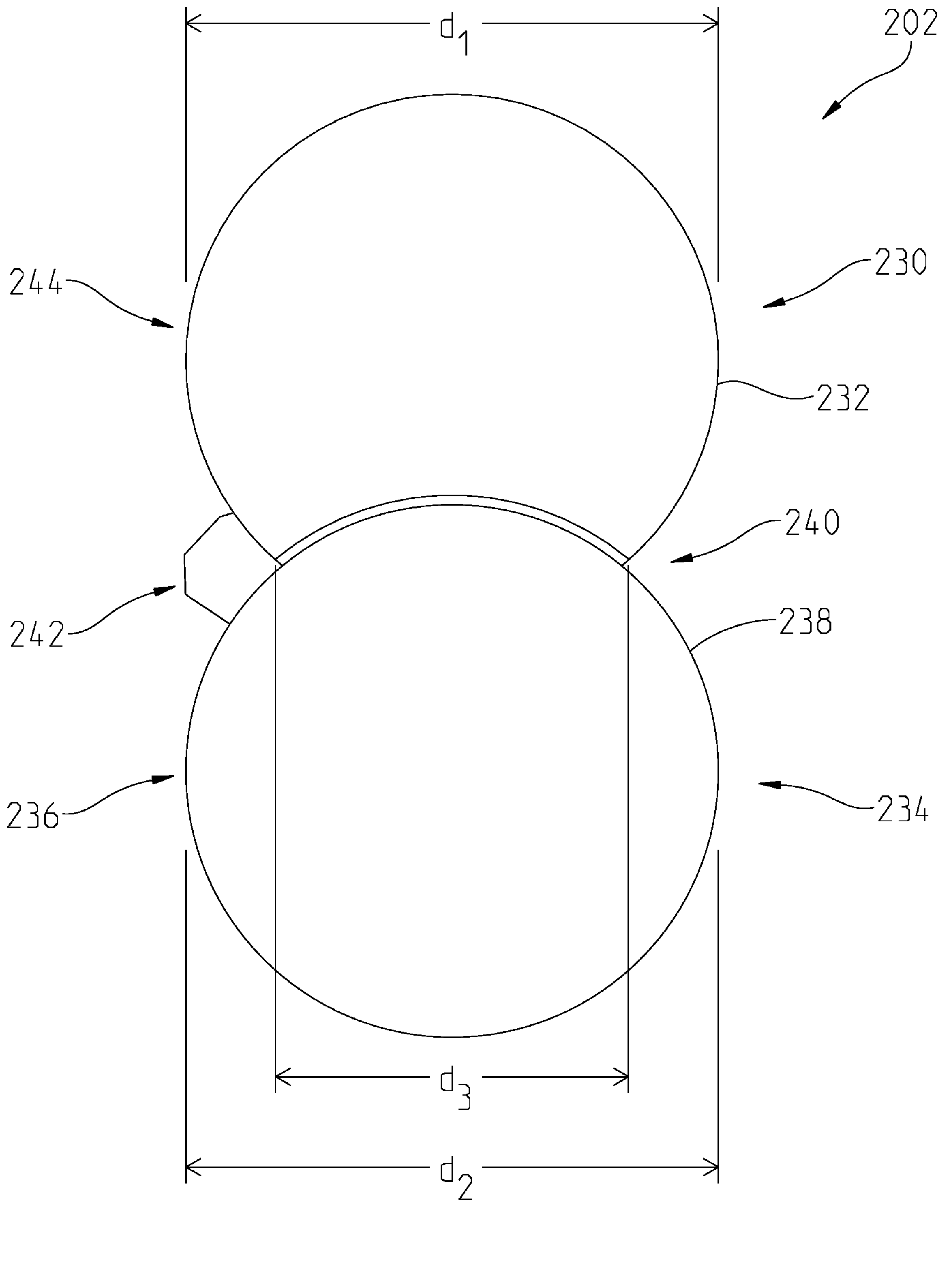
FIG. 3A illustrates a diagrammatic view of an envelope of a lock core body of the interchangeable electro-mechanical lock core of FIG. 2 along lines 3A-3A in FIG. 3.

Referring to FIG. 3A, lock core body 202 includes an upper portion 230 having a first cylindrical portion 232 with a first maximum lateral extent ($d_1$), a lower portion 234 having a second cylindrical portion 238 with a second maximum lateral extent ($d_2$), and a waist portion 240 having a third maximum lateral extent ($d_3$). The third maximum lateral extent ($d_3$) is less than the first maximum lateral extent ($d_1$) and less than the second maximum lateral extent ($d_2$). Exemplary interchangeable lock cores having a longitudinal shape satisfying the relationship of first maximum lateral extent ($d_1$), second maximum lateral extent ($d_2$), and third maximum lateral extent ($d_3$) include small format interchangeable cores (SFIC), large format interchangeable cores (LFIC), and other suitable interchangeable cores. In alternative embodiments, lock core body 202 may have longitudinal shapes that do not satisfy the relationship of first maximum lateral extent ($d_1$), second maximum lateral extent ($d_2$), and third maximum lateral extent ($d_3$).

Figure 4:
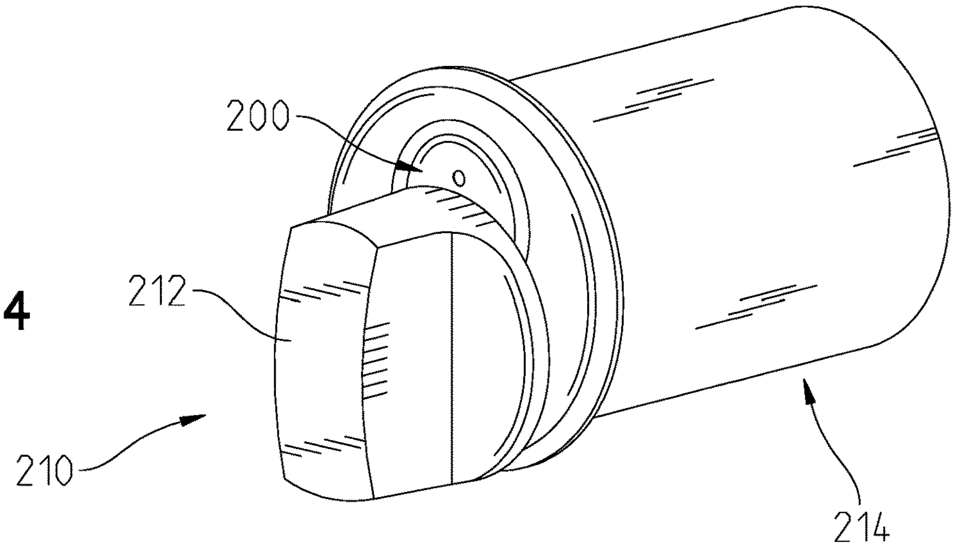
FIG. 4 illustrates a front, perspective view of the interchangeable electro-mechanical lock core of FIG. 2 assembled with a lock cylinder.
Figure 5:
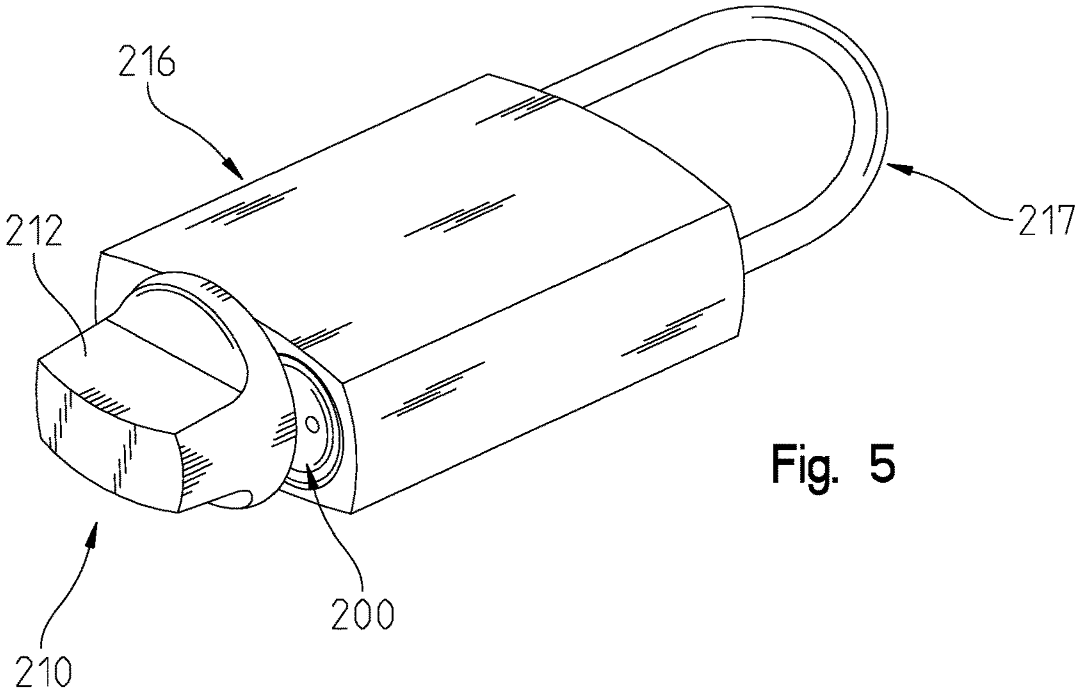
FIG. 5 illustrates a front, perspective view of the interchangeable electro-mechanical lock core of FIG. 2 assembled with a padlock.
Figure 6:
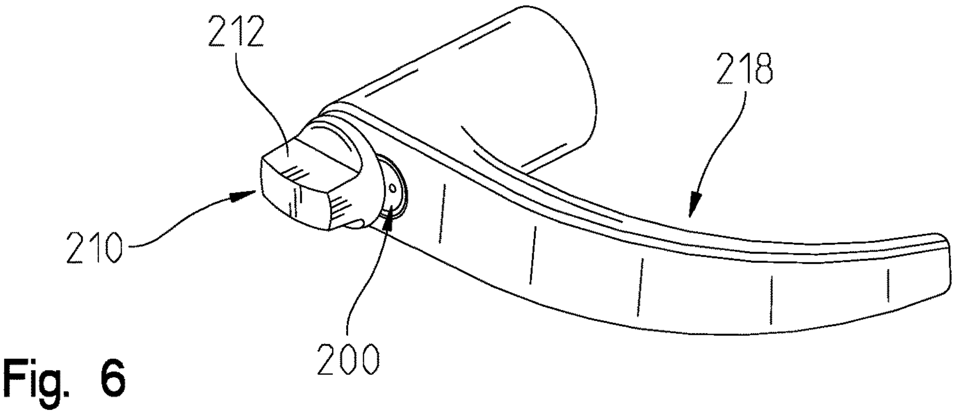
FIG. 6 illustrates a front, perspective view of the interchangeable electro-mechanical lock core of FIG. 2 assembled with a door handle.

Interchangeable electro-mechanical lock core 200 may be received in corresponding openings in a plurality of different types of housings. Referring to FIG. 4, interchangeable electro-mechanical lock core 200 is illustratively received in an opening in a lock cylinder 214. Lock cylinder 214 may be included in a mortise lock or other lock devices. Referring to FIG. 5, interchangeable electro-mechanical lock core 200 is illustrated received in an opening in a padlock 216. In the case of padlock 216, a shank 217 is received in padlock 216 and a lock device within padlock 216 locks or unlocks shank 217 to padlock 216. Referring to FIG. 6, interchangeable electro-mechanical lock core 200 is illustratively received in an opening in a door handle 218. An advantage, among others, of interchangeable electro-mechanical lock core 200 having an external profile or envelope 236, such as the external profile of an SFIC lock core or an LFIC lock core, is that interchangeable electro-mechanical lock core 200 may readily be used to replace existing SFIC lock cores or LFIC lock cores on the market, such as cores assembled to lock cylinder 214, padlock 216, door handle 218, and other devices which receive existing SFIC lock cores or LFIC lock cores.

Referring to FIGS. 7-10, a sectional view of interchangeable electro-mechanical lock core 200 is shown. As mentioned herein, lock core body 202 has a first end 204 and a second end 206. Lock core body 202 includes a base body component 224 and a cover 226. Cover 226 may be secured to base body component 224 with a fastener or other suitable arrangements. Base body component 224 has the longitudinal shape illustrated in FIG. 3A having an upper cylindrical portion 232, a lower cylindrical portion 238, and a waist portion 240.

Figure 7:
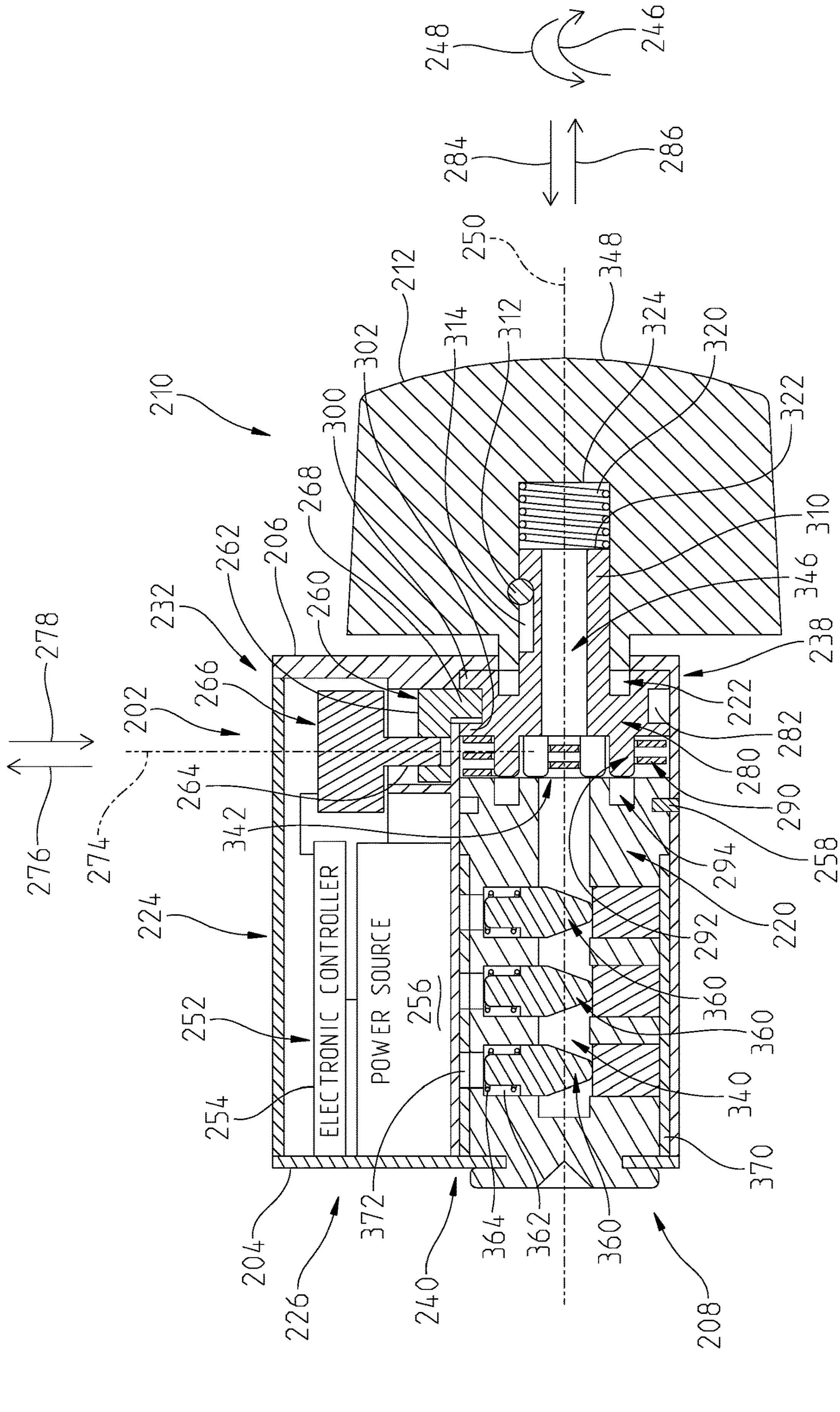
FIG. 7 illustrates a sectional view of the interchangeable electro-mechanical lock core of FIG. 2 along lines 7-7 of FIG. 2 with a blocker in a blocking position wherein the blocker is received in a circumferential groove of a clutch to maintain engagement features of the clutch spaced apart from engagement features of a moveable plug.

Referring to FIG. 7, moveable core plug 220 is positioned in second cylindrical portion 238 of lock core body 202 proximate to first end 204 of lock core body 202. As explained in more detail herein, moveable core plug 220 rotates about a moveable plug axis 250. In the illustrated embodiment, moveable plug axis 250 coincides with a longitudinal axis of second cylindrical portion 238 of lock core body 202. Moveable core plug 220 may be engaged to rotate about moveable plug axis 250 from a first position wherein lock device 110 is in a locked state (due to the position of lock device interface 208 which is controlled by moveable core plug 220) to a second position wherein lock device 110 is in an unlocked state (due to the position of lock device interface 208 which is controlled by moveable core plug 220). A clip 258 holds moveable core plug 220 along moveable plug axis 250.

Interchangeable electro-mechanical lock core 200 further includes a control assembly 252 positioned in first cylindrical portion 232 of lock core body 202. Control assembly 252 includes an electronic controller 254 and a power source 256. Power source 256 provides electrical power to electronic controller 254. As explained in more detail herein, control assembly 252 controls the operation of interchangeable electro-mechanical lock core 200 including when moveable core plug 220 may be engaged to rotate about moveable plug axis 250 from the first position wherein lock device 110 is in the locked state to the second position wherein lock device 110 is in the unlocked state and when a core keeper 242 of interchangeable electro-mechanical lock core 200 may be engaged to move core keeper 242 within the envelope 236 of lock core body 202. In one embodiment, power source 256 is a battery. In another embodiment, power source 256 includes a battery and a capacitor, as discussed in more detail herein in connection with FIG. 22. In a further embodiment, power source 256 is a capacitor and a separate battery is provided in operator actuatable input device 212 of operator actuatable assembly 210. In this scenario, power is routed from the battery in operator actuatable input device 212 of operator actuatable assembly 210 to a capacitor positioned in the interior of lock core body 202.

Interchangeable electro-mechanical lock core 200 further includes a blocker 260 operatively coupled to electronic controller 254. Blocker 260 includes a first portion 262 having a threaded opening which is engaged with a threaded shaft 264 of a motor 266 and a second portion 268 which extends downward from first portion 262. Motor 266 is controlled by electronic controller 254. As illustrated in FIG. 7, second portion 268 of blocker 260 extends through an opening 270 (see FIG. 9) in waist portion 240 of lock core body 202 and into the second cylindrical portion 238 of lock core body 202.

As explained in more detail herein, blocker 260 engages with a clutch 280 of interchangeable electro-mechanical lock core 200 which is positioned in second cylindrical portion 238 of lock core body 202. Clutch 280 includes a circumferential groove 282 which receives second portion 268 of blocker 260, as illustrated in FIG. 7. Clutch 280 is rotatable about moveable plug axis 250 and displaceable along moveable plug axis 250 in direction 284 and direction 286.

Figure 9:
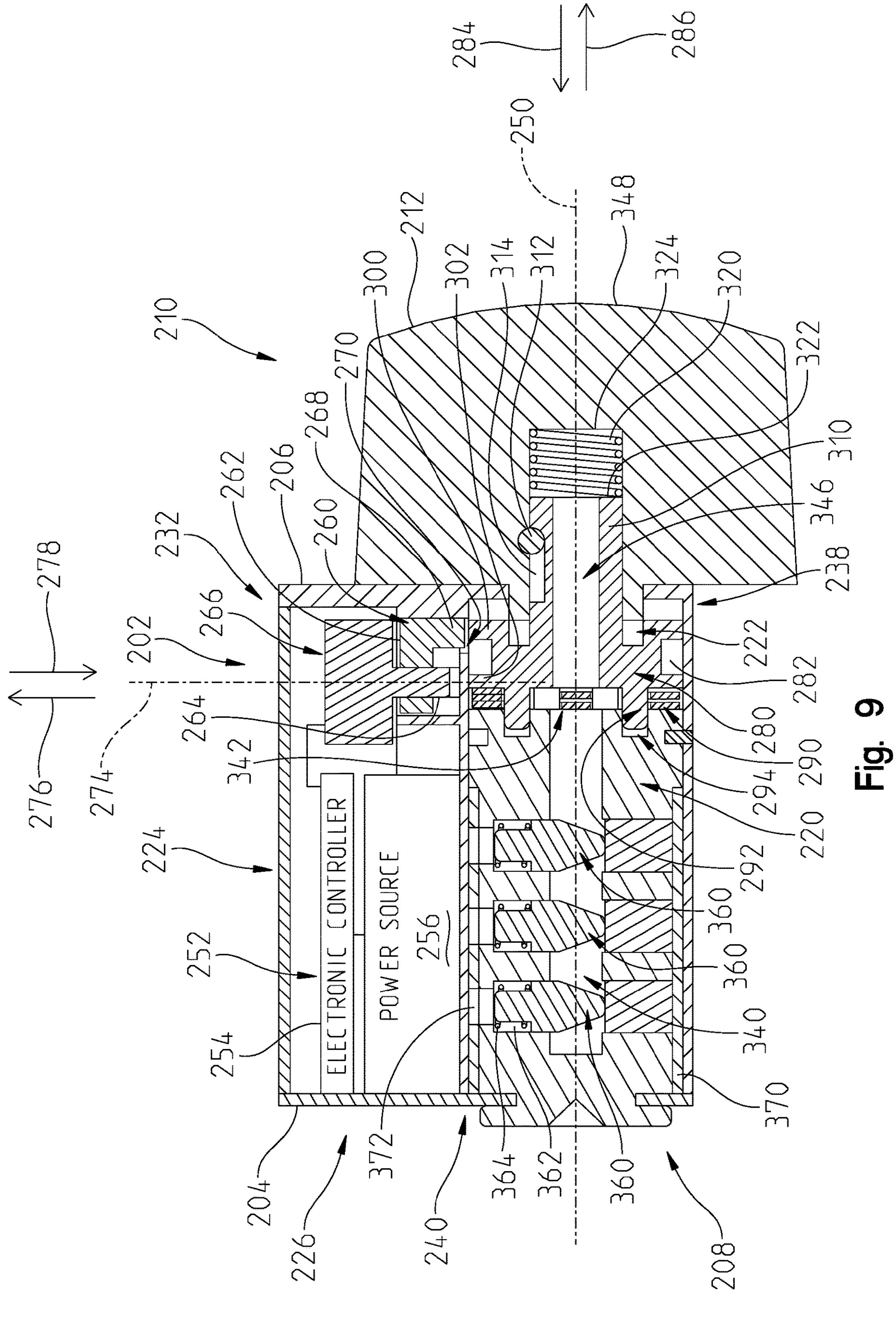
FIG. 9 illustrates the sectional view of FIG. 8 wherein the clutch has been moved along a moveable plug axis of the interchangeable electro-mechanical lock core to bring the engagement features of the clutch into engagement with the engagement features of the moveable plug.

A biasing member 290 biases clutch 280 in direction 286 to maintain clutch 280 in a spaced apart relationship relative to moveable core plug 220. As shown in FIG. 7, clutch 280 is biased to a position proximate second end 206 of lock core body 202 by biasing member 290. As explained herein, biasing member 290 may be compressed, as illustrated in FIG. 9 to permit engagement features 292 of clutch 280 to interact with engagement features 294 of moveable core plug 220. In one example, biasing member 150 is a wave spring.

In the illustrated embodiment, engagement features 292 and engagement features 294 are a plurality of interlocking protrusions carried by clutch 280 and recesses carried by moveable core plug 220, respectively. In other embodiments, engagement features 292 may be one or more protrusions received by one or more recess of engagement features 294 or vice versa. Additionally, engagement features 292 and engagement features 294 may be generally planar frictional surfaces which when held in contact couple clutch 280 and moveable core plug 220 to rotate together. By including a plurality of interlocking protrusions and recesses, as shown in the illustrated embodiment, clutch 280 may have multiple rotational positions relative to moveable core plug 220 about moveable plug axis 250 wherein engagement features 292 of clutch 280 may engage engagement features 294 of moveable core plug 220.

Referring to FIG. 7, threaded shaft 264 of motor 266 is rotatable about an axis 274 and is received in a threaded aperture in first portion 262 of blocker 260. Blocker 260 may be moved upward in direction 276 along axis 274 relative to clutch 280 or downward along axis 274 in direction 278 relative to clutch 280. The orientation of blocker 260 is maintained by the shape and size of lock core body 202 and of opening 270 in lock core body 202. As such, due to a rotation of threaded shaft 264 of motor 266 in a first direction about axis 274, blocker 260 is moved downwardly in direction 278 and due to a rotation of threaded shaft 264 of motor 266 in a second direction about axis 274, blocker 260 is moved upwardly in direction 276.

As mentioned herein, blocker 260 cooperates with clutch 280 to deny or grant access to moveable core plug 220. As shown in FIG. 7, second portion 268 of blocker 260 is received in circumferential groove 282 of clutch 280 which restricts axial movement of clutch 280 along moveable plug axis 250 in direction 284 and direction 286 relative to blocker 260. A first shoulder 300 of clutch 280 which corresponds with a wall of circumferential groove 282 cooperates with second portion 268 of blocker 260 to restrict movement of clutch 280 in direction 284 and a second shoulder 302 of clutch 280 which corresponds with a wall of circumferential groove 282 cooperates with second portion 268 of blocker 260 to restrict movement of clutch 280 in direction 286. The relationship shown in FIG. 7 is referred to as a blocked position of blocker 260 due to the restricted axial movement of clutch 280 relative to blocker 260 along moveable plug axis 250.

Figure 8:
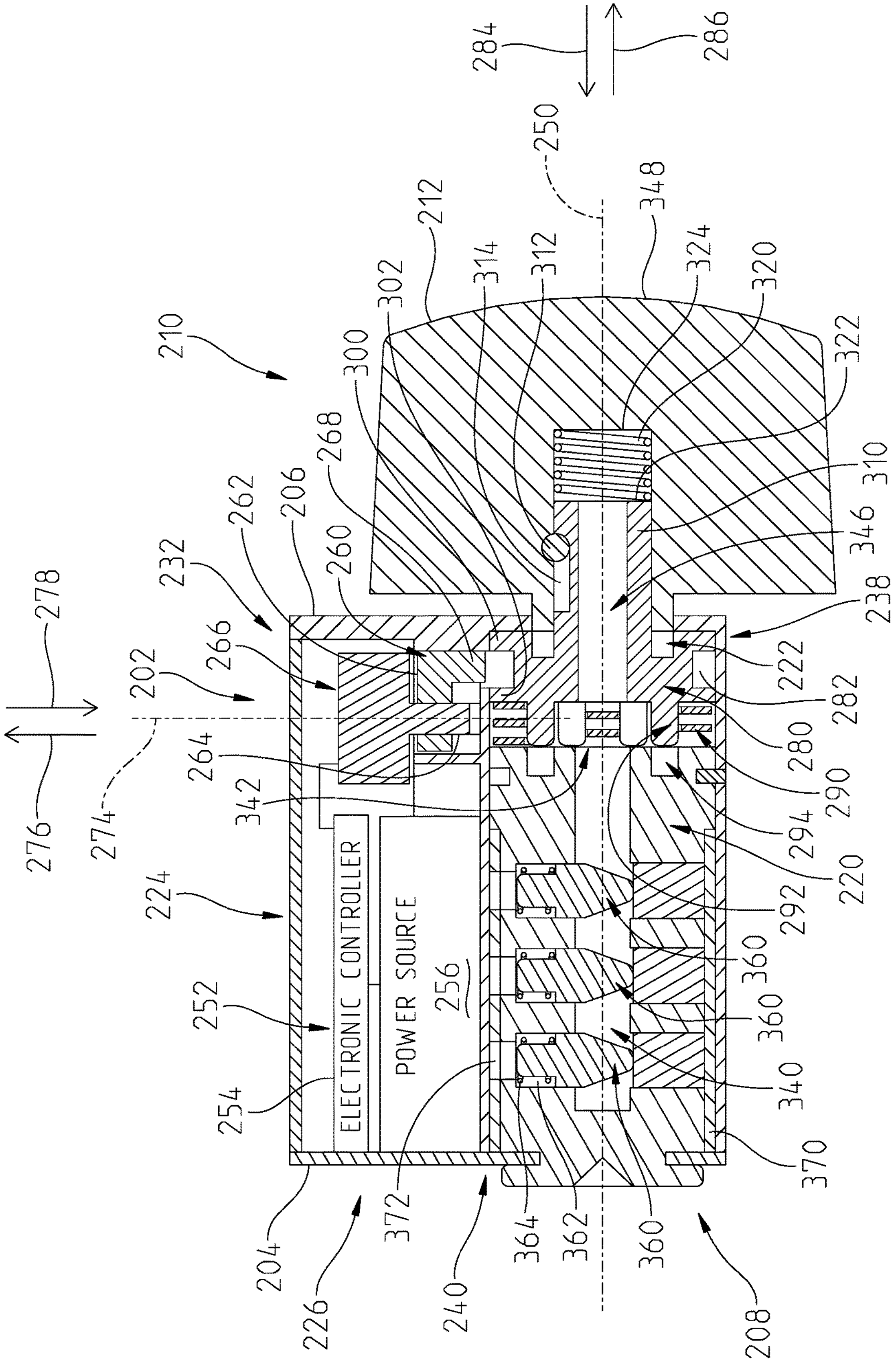
FIG. 8 illustrates the sectional view of FIG. 7 with the blocker in a release position thereby allowing the engagement features of the clutch to engage with the engagement features of the moveable plug.

Referring to FIG. 8, when second portion 268 of blocker 260 is removed from circumferential groove 282 of clutch 280, clutch 280 may move to a greater degree axially along moveable plug axis 250 relative to blocker 260. As shown in the illustrated embodiment of FIG. 8, second portion 268 of blocker 260 is moved upward in direction 276 such that second portion 268 of blocker 260 is positioned completely above clutch 280. The relationship shown in FIG. 8 is referred to as a release position of blocker 260 due to the less restricted axial movement of clutch 280 relative to blocker 260 along moveable plug axis 250. One advantage, among others, for having blocker 260 received in circumferential groove 282 of clutch 280 is that clutch 280 is able to freely rotate about moveable plug axis 250 in direction 246 or direction 248 while blocker 260 is in the blocked position (FIG. 7) and while blocker 260 is in the released position (FIG. 8). Additional details regarding the interactions of blocker 260 and clutch 280 and the operation of interchangeable electro-mechanical lock core 200 are provided herein.

Figure 10:
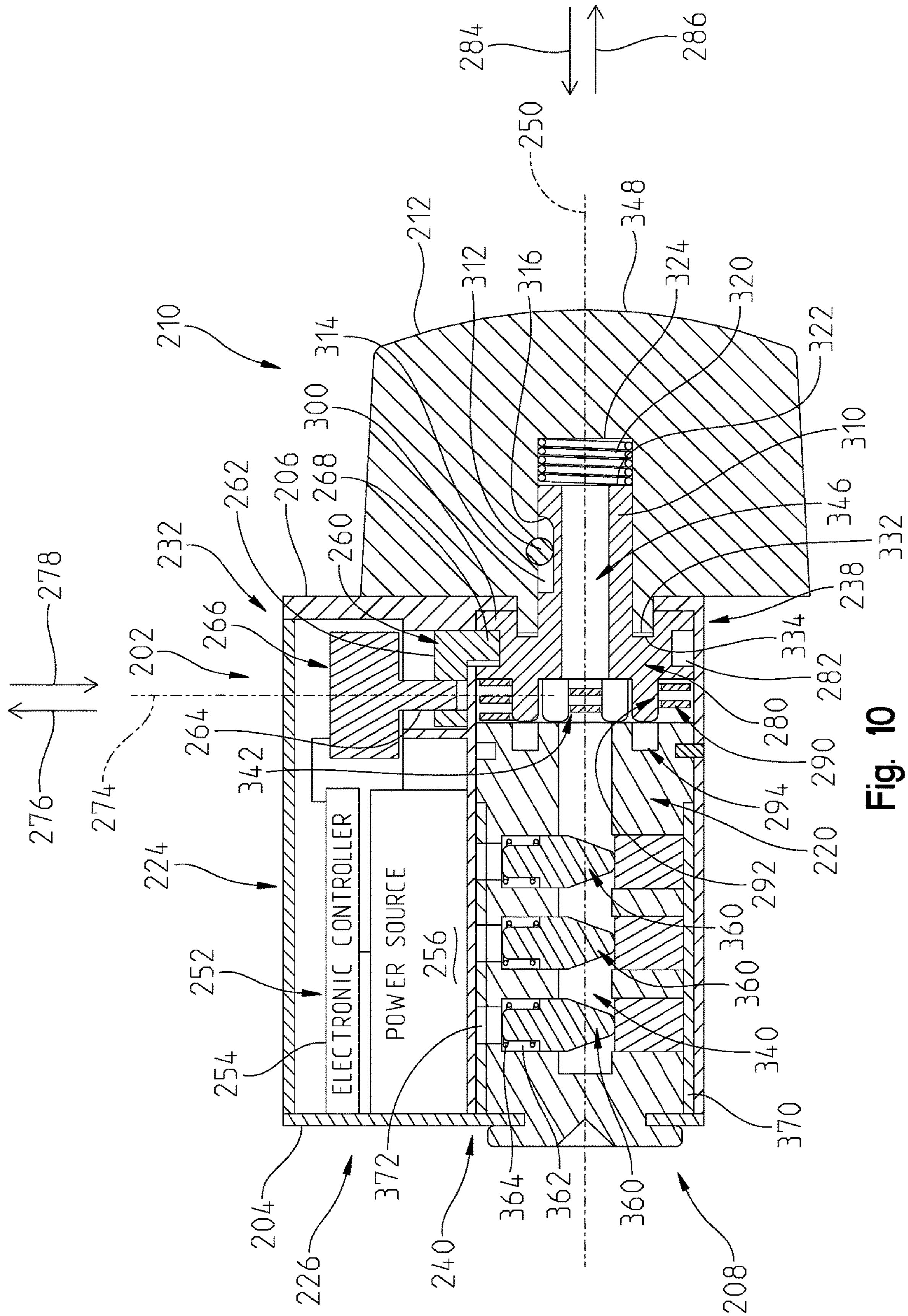
FIG. 10 illustrates the sectional view of FIG. 7 wherein the blocker is in the blocking position and an operator actuatable assembly has been moved axially towards the blocker due to an external force on an operator actuatable input device of the operator actuatable assembly.

Returning to FIG. 7, clutch 280 includes an extension 310 which extends beyond second end 206 of lock core body 202. Extension 310 operates as operator actuatable interface 222 and couples clutch 280 to operator actuatable assembly 210. As mentioned herein operator actuatable assembly 210 includes an operator actuatable input device 212, illustratively a knob. Operator actuatable input device 212 carries a coupler 312 which is received in a groove 314 of extension 310 of clutch 280. As shown in FIG. 10, groove 314 includes a stop surface 316 (see FIG. 10) which cooperates with coupler 312 to limit an axial movement of operator actuatable input device 212 in direction 286 relative to lock core body 202. By being elongated along moveable plug axis 250, groove 314 permits a relative movement of operator actuatable input device 212 relative to clutch 280. A biasing member 320 positioned between a surface 322 of extension 310 and a surface 324 of operator actuatable input device 212 biases operator actuatable input device 212 in direction 286 along moveable plug axis 250 relative to clutch 280. The removal of operator actuatable input device 212 from extension 310 is discussed in more detail herein in relation to FIG. 11.

Various operations of interchangeable electro-mechanical lock core 200 are explained with reference to FIGS. 7-10. As mentioned herein, FIG. 7 illustrates a sectional view of interchangeable electro-mechanical lock core 200 with blocker 260 in a blocking position wherein a lower portion 268 of blocker 260 is received in circumferential groove 282 of clutch 280. FIG. 7 is the rest position of interchangeable electro-mechanical lock core 200. In the rest position, operator actuatable assembly 210 and clutch 280 are freely rotatable about moveable plug axis 250 in direction 246 and direction 248 and blocker 260 prevents the axial movement of clutch 280 in direction 284 to maintain clutch 280 in a spaced apart relationship relative to moveable core plug 220. Thus, moveable core plug 220 cannot be rotated about moveable plug axis 250 to in turn rotate locking device interface 208 and thus actuate lock device 110.

Referring to FIG. 8, blocker 260 has been moved in direction 276 by control assembly 252 through the actuation of motor 266 to a release position of blocker 260. In the release position, second portion 268 of blocker 260 is positioned outside of circumferential groove 282 of clutch 280. This is an access position for interchangeable electro-mechanical lock core 200. With second portion 268 of blocker 260 removed from circumferential groove 282 of clutch 280, an operator may move operator actuatable assembly 210 and clutch 280 in direction 284 to bring engagement features 292 of clutch 280 into engagement with engagement features 294 of moveable core plug 220, as illustrated in FIG. 9. With engagement features 292 of clutch 280 engaged with engagement features 294 of moveable core plug 220, an operator may rotate moveable core plug 220 to effect a rotation of locking device interface 208 and, in turn, an actuation of the locking device 110 coupled to locking device interface 208.

As shown in FIG. 9, biasing member 290 is compressed due to an external force on operator actuatable input device 212 of operator actuatable assembly 210 in direction 284 when blocker 260 is in the release position, as opposed to, biasing member 320 between extension 310 and operator actuatable input device 212. This is due to biasing member 320 having a higher stiffness than biasing member 290. As shown in FIG. 10, when blocker 260 is in the blocking position, an external force on operator actuatable input device 212 of operator actuatable assembly 210, in direction 284, results in biasing member 320 being compressed until operator actuatable input device 212 bottoms out against second end 206 of lock core body 202. A gap 330 (see FIG. 7) between operator actuatable input device 212 and second end 206 of lock core body 202 is needed to permit the movement of clutch 280 in direction 284 when blocker 260 is in the release position as shown in FIG. 9. The inclusion of biasing member 320 reduces the force experienced by blocker 260 when blocker 260 is in the blocking position due to an external force on operator actuatable input device 212 in direction 284. The force experienced by blocker 260 is limited to the compression force of biasing member 320 since when operator actuatable input device 212 bottoms out against second end 206 of lock core body 202 a small gap between a surface 334 of clutch 280 and a surface 332 of operator actuatable input device 212 still exists.

An advantage, among others, for the inclusion of biasing member 320 and the geometry of operator actuatable input device 212 and clutch 280 is that the operator actuatable assembly 210 as opposed to clutch 280 and blocker 260 will absorb the excess force (which is passed on to lock core body 202 when operator actuatable assembly 210 contacts lock core body 202) thereby increasing the durability of interchangeable electro-mechanical lock core 200 from being damaged. Biasing member 320 also absorbs an initial large spike of the external force and assists in returning operator actuatable input device 212 to the position shown in FIG. 7.

Returning to FIG. 7, moveable core plug 220 includes a central channel 340 having an open front at a forward end 342 of moveable core plug 220. Clutch 280 includes a central channel 346 which extends completely through clutch 280. As illustrated in FIG. 7, an exterior surface 348 of operator actuatable input device 212 blocks access to central channel 346 of clutch 280 and in turn to central channel 340 of moveable core plug 220. When operator actuatable input device 212 is removed from the remainder of interchangeable electro-mechanical lock core 200, central channel 346 of clutch 280 and central channel 340 of moveable core plug 220 are accessible from a forward end 350 of extension 310 of clutch 280, as shown in FIG. 12.

Figure 12:
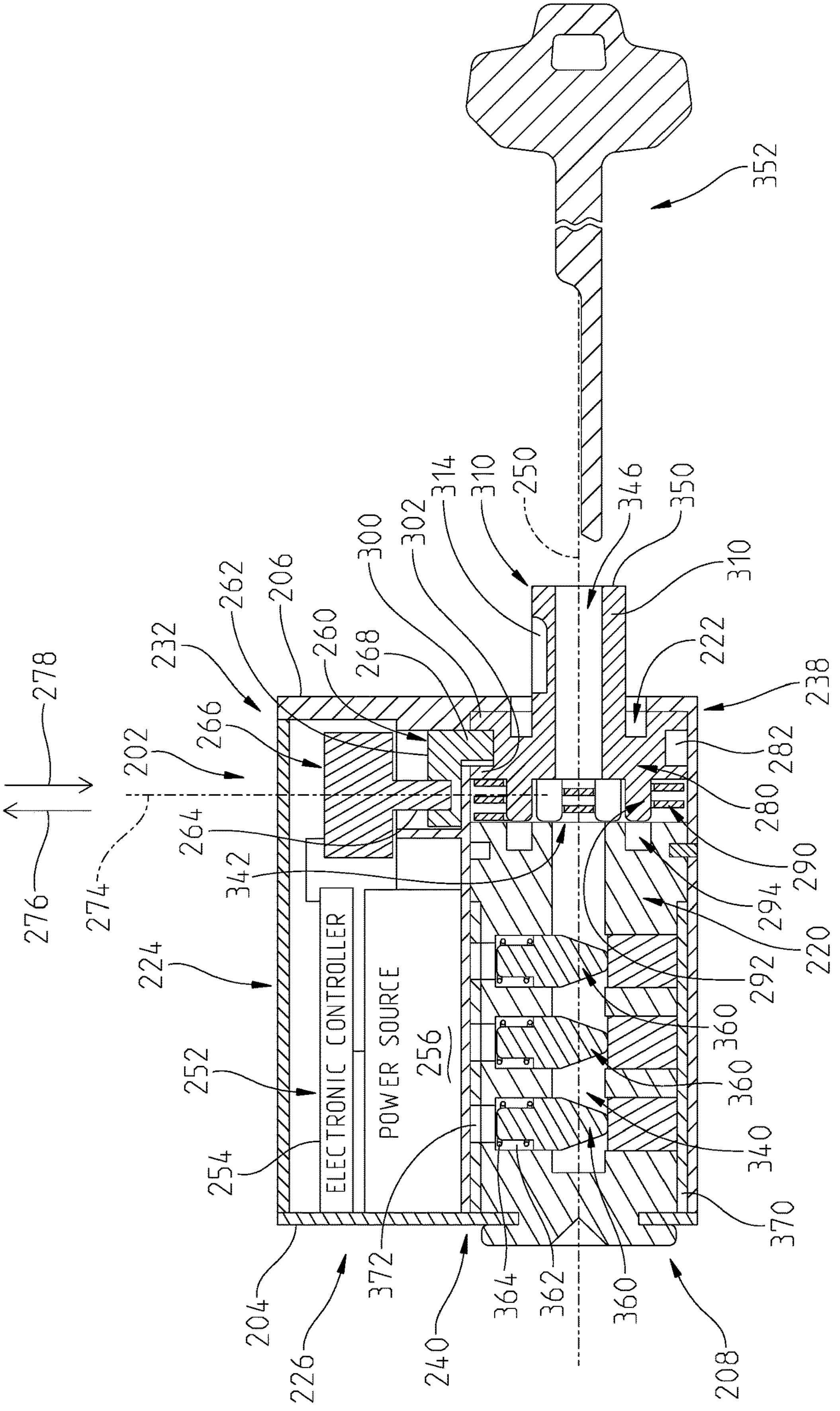
FIG. 12 illustrates the sectional view of FIG. 7 with the operator actuatable input device of the interchangeable electro-mechanical lock core removed.
Figure 13:
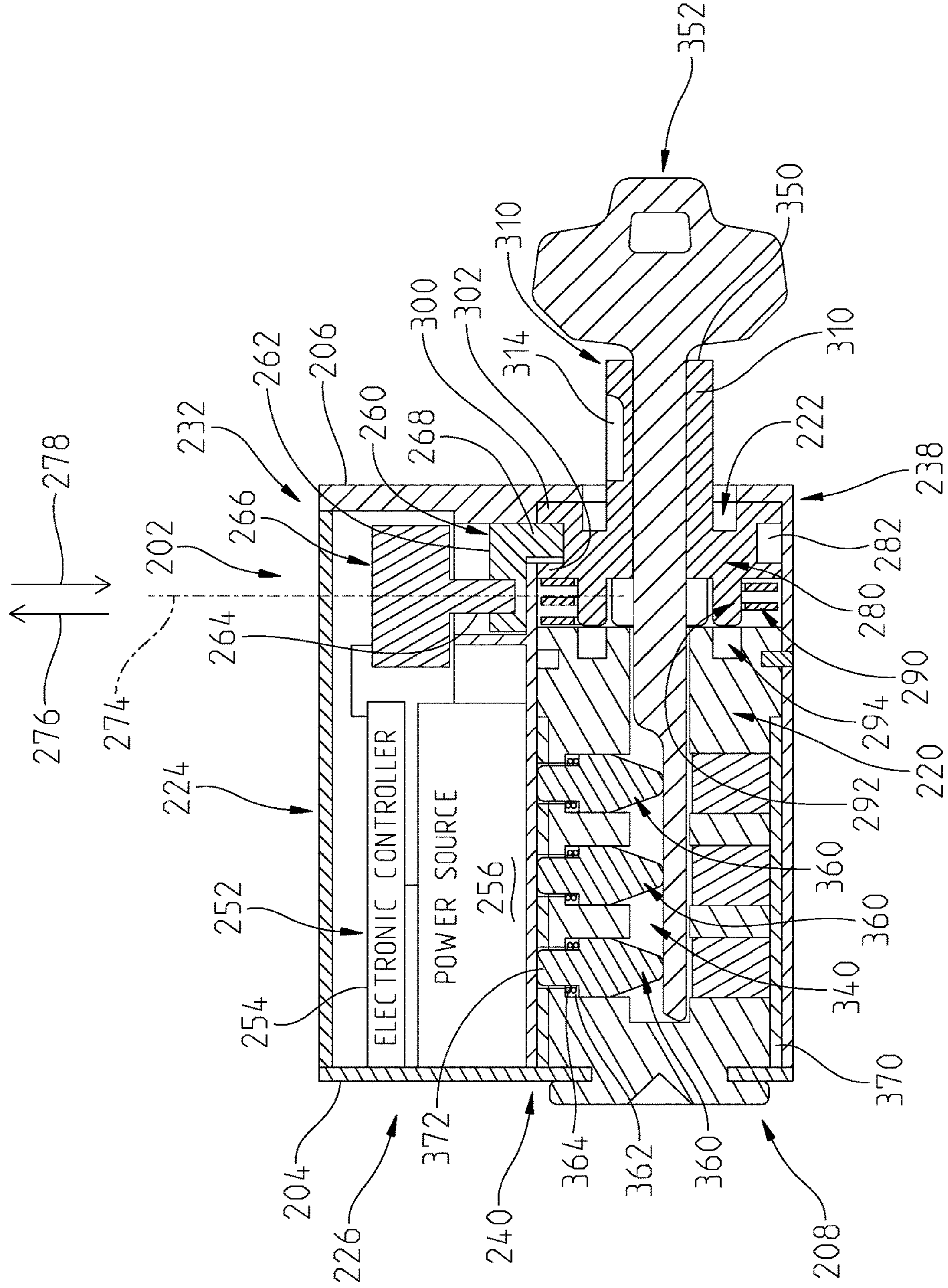
FIG. 13 illustrates the sectional view of FIG. 12 with a key received within a keyway of interchangeable electro-mechanical lock core to couple a control sleeve of the interchangeable electro-mechanical lock core to the moveable plug of the interchangeable electro-mechanical lock core.

Turning to FIG. 12, when operator actuatable input device 212 is removed from extension 310 of clutch 280, a key 352 may be inserted into a keyway of interchangeable electro-mechanical lock core 200, illustratively central channel 346 of clutch 280 and central channel 340 of moveable core plug 220. As shown in FIG. 13, when key 352 is inserted a plurality of pins 360 of moveable core plug 220 are moved in direction 276 against the bias of biasing members 362. The pins 360 are received in openings 372 of a control sleeve 370. With pins 360 received in openings 372 of control sleeve 370, key 352 may be rotated about moveable plug axis 250 which in turn rotates moveable core plug 220 and control sleeve 370 about moveable plug axis 250. In one embodiment, pins 360 have different heights and key 352 is bitted to raise each pin 360 an appropriate height to be received in the corresponding openings 372 of control sleeve 370.

Referring to FIG. 3, core keeper 242 is coupled to control sleeve 370. In one example, core keeper 242 is integrally formed with control sleeve 370. A rotation of key 352 about moveable plug axis 250 results in a rotation of control sleeve 370 which in turn results in core keeper 242 being moved to within the envelope 236 of lock core body 202. With core keeper 242 positioned within the envelope 236 of lock core body 202, interchangeable electro-mechanical lock core 200 may be removed from the lock in which it is positioned. In one embodiment, a biasing member, such as a torsion spring, is operatively coupled to control sleeve 370 and lock core body 202 to bias core keeper 242 to a position extending outside of envelope 236 of lock core body 202.

Figure 11:
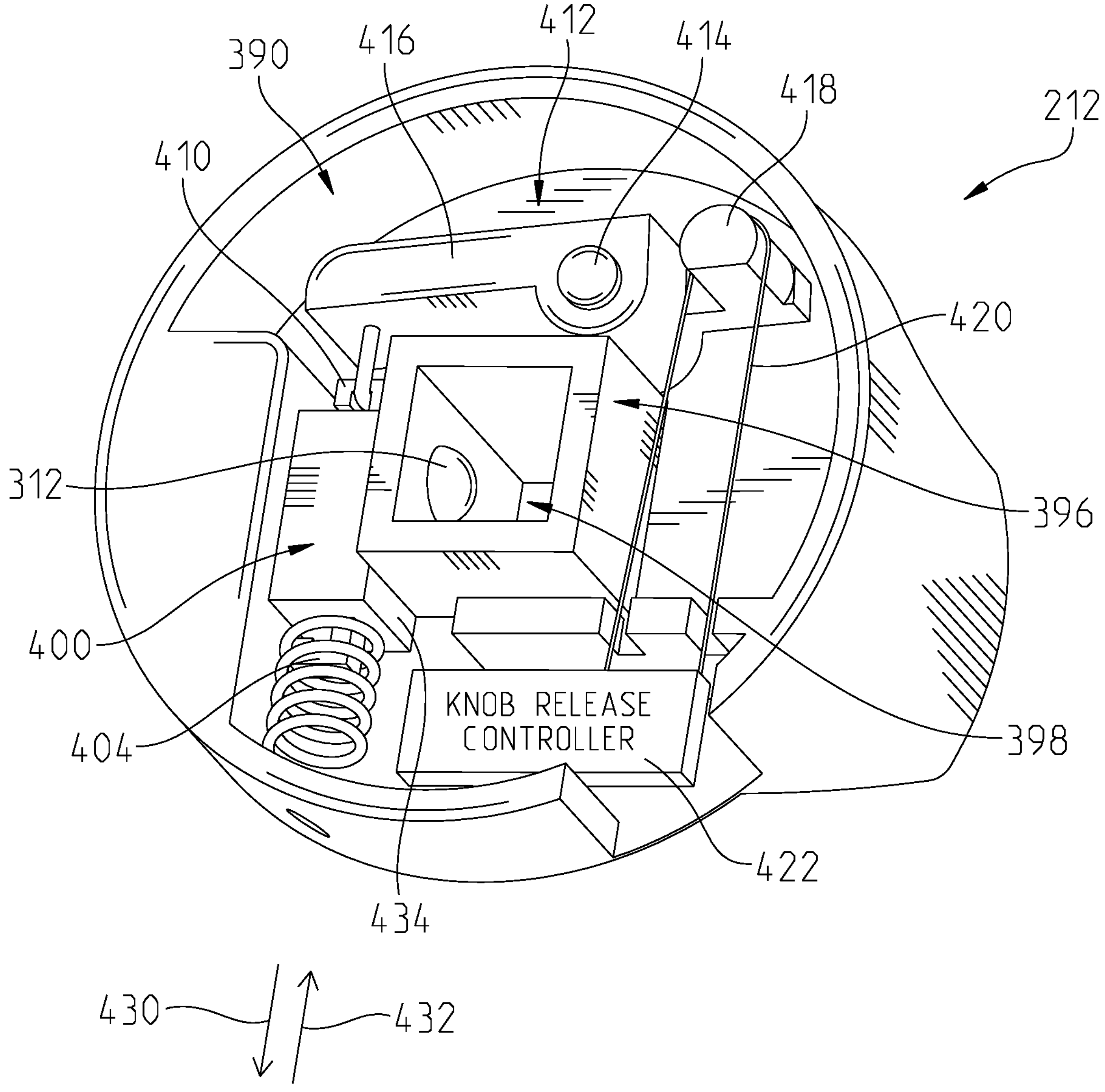
FIG. 11 illustrates a rear, perspective view of an exemplary operator actuatable input device of the interchangeable electro-mechanical lock core of FIG. 2.

Referring to FIG. 11, an exemplary embodiment of operator actuatable input device 212 is shown. Operator actuatable input device 212 may be removed from extension 310 of clutch 280. Operator actuatable input device 212 includes a cavity 390 on a rear side of operator actuatable input device 212. Operator actuatable input device 212 includes a central support 396 having a rectilinear interior 398 sized and shaped to receive extension 310 of clutch 280. Coupler 312 extends into interior 398 of central support 396 to interact with groove 314 of extension 310 (see FIG. 7).

A blocker 400 is positioned along a first side of central support 394 and is moveable in cavity 390 in direction 430 and direction 432. A side surface 434 of blocker 400 urges coupler 312 into interior 398 of central support 396 when blocker 400 is in the illustrated position. As blocker 400 is moved in direction 432, coupler 312 may be received in a recess (not shown) in side surface 434 of blocker 400 to permit coupler 312 to exit groove 314 of extension 310. Blocker 400 is biased to the illustrated position through a biasing member, illustratively spring 404, biasing blocker 400 in direction 430.

Blocker 400 is moved in direction 432 due to a rotation of a lever 412 positioned in cavity 390 about a fulcrum 414. Blocker 400 is coupled to a first lever arm 416 of lever 412 through a wire 410. A second lever arm 418 of lever 412 is coupled to a Nitinol wire 420 which contracts when an electrical current is applied to the wire and returns to its original length when the electrical current is removed. Wire 420 is coupled to a knob release controller 422 which applies a current to nitinol wire 420 when operator actuatable input device 212 is to be removed. When nitinol wire 420 contracts, second lever arm 418 is moved in direction 430 which in turn causes first lever arm 416 to move in direction 432. The movement of first lever arm 416 in direction 432 in turn raises blocker 400 in direction 432 against the bias of spring 404.

In one embodiment, knob release controller 422 includes logic which determines whether appropriate electronic credentials have been presented to remove operator actuatable input device 212. In another embodiment, knob release controller 422 communicates with electronic controller 254 and electronic controller 254 includes logic which determines whether appropriate electronic credentials have been presented. If appropriate electronic credentials have been presented electronic controller 254 provides a command to knob release controller 422 to apply a sufficient current to nitinol wire 420 to move blocker 400 and allow coupler 312 to exit groove 314 of extension 310.

Although nitinol wire 420 is shown actuating a lever 412 other arrangements are contemplated. In one embodiment, nitinol wire 420 is directly coupled to blocker 400 to actuate blocker 400. One advantage, among others, of incorporating lever 412 is the force multiplication of lever 412 and the movement range multiplication of lever 412 due to the unequal lengths of first lever arm 416 and second lever arm 418. In another embodiment, nitinol wire 420 is directly coupled to coupler 312 to move coupler 312 out of interior 398 of central support 396.

As explained in more detail herein, electronic controller 254 has a sleep mode and an awake mode. An advantage, among others, for having a sleep mode is the ability to increase battery life. As mentioned in connection with FIG. 1, interchangeable electro-mechanical lock core 200, as an example of interchangeable electro-mechanical lock core 100, may include a power source 144 positioned in lock core body 202 of interchangeable electro-mechanical lock core 200 and/or a power source 146 positioned in operator actuatable input device 212 of interchangeable electro-mechanical lock core 200. In one embodiment, electronic controller 254 is in the sleep mode until an actuation of operator actuatable input device 212 is detected. In another embodiment, electronic controller 254 is in sleep mode until a signal from an operator device 902 (see FIG. 41) is received.

Figure 14:
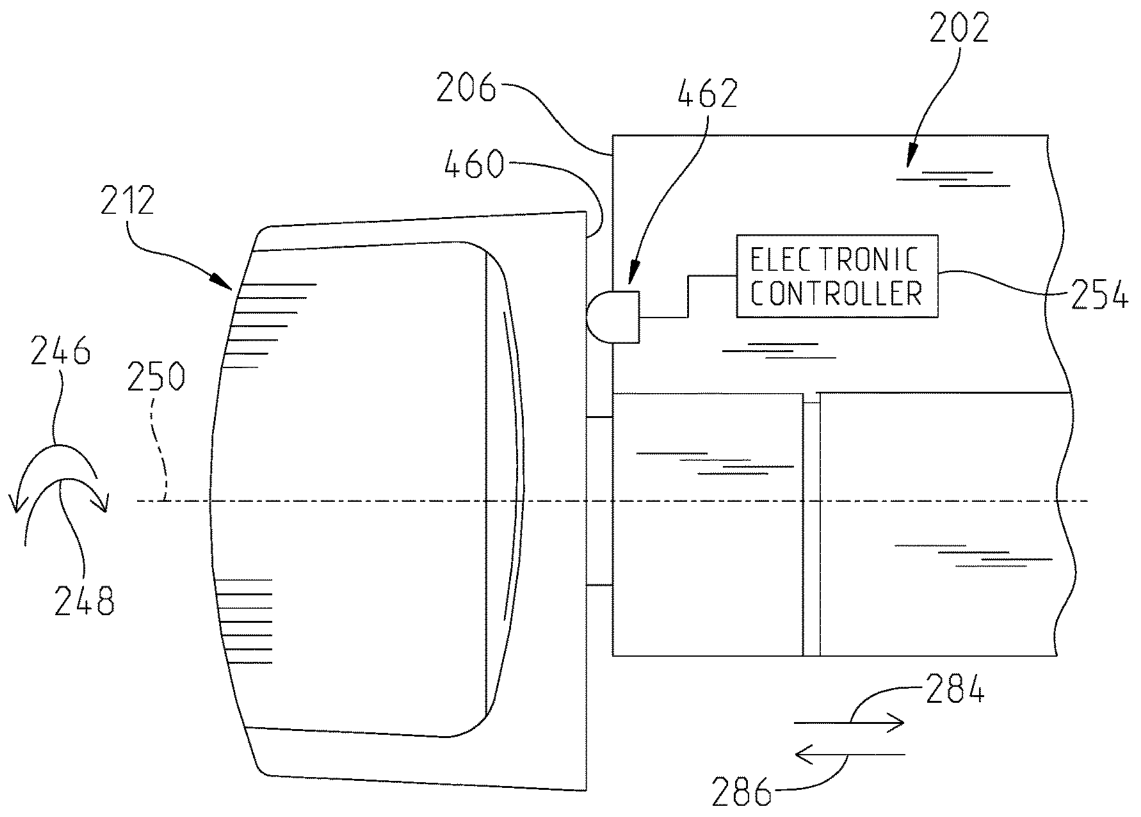
FIG. 14 illustrates a first exemplary system for detecting a physical input with the operator actuatable input device of interchangeable electro-mechanical lock core.

Referring to FIG. 14, a first system for detecting a movement of operator actuatable input device 212 in a direction 284 along moveable plug axis 250 is shown. The system includes an actuator 462, such as a button, which may extend from second end 206 of lock core body 202 towards operator actuatable input device 212. An operator of interchangeable electro-mechanical lock core 200 activates electronic controller 254 to the awake mode by applying an external force to operator actuatable input device 212 to move operator actuatable input device 212 in direction 284 an amount sufficient for a rear surface 460 of operator actuatable input device 212 to actuate actuator 462. The actuation of actuator 462 closes a switch of a wake-up circuit of electronic controller 254 and places electronic controller 254 in an awake mode.

Figure 15:
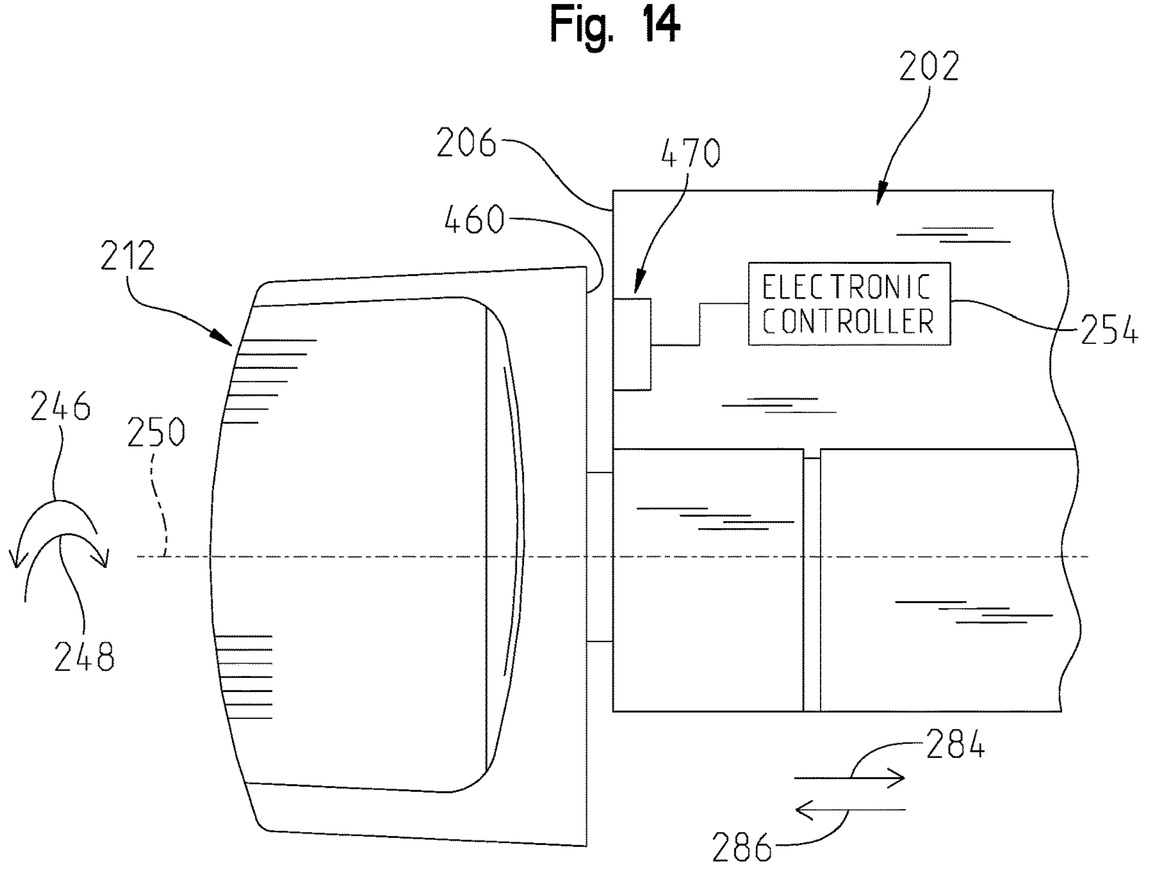
FIG. 15 illustrates a second exemplary system for detecting a physical input with the operator actuatable input device of interchangeable electro-mechanical lock core.
Figure 16:
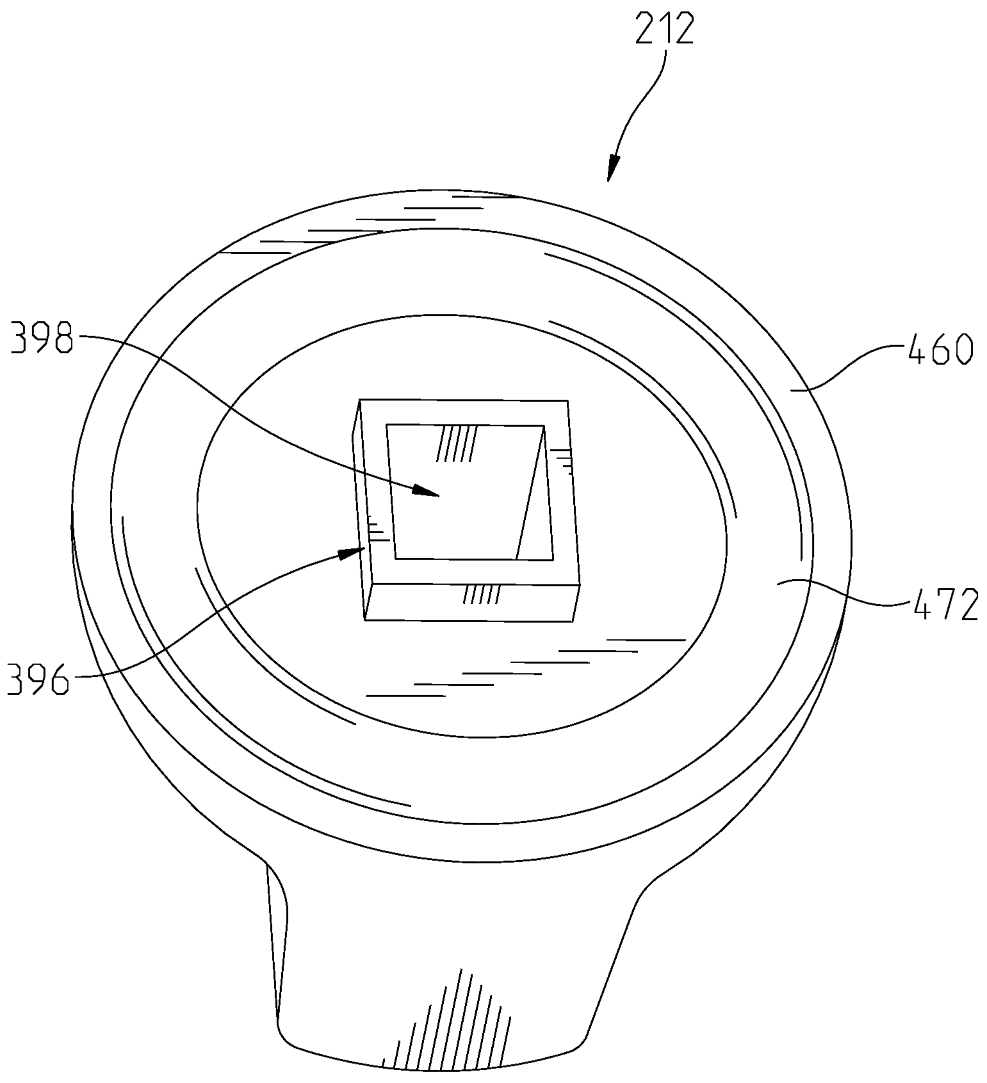
FIG. 16 illustrates a rear, perspective view of the operator actuatable input device for the system of FIG. 15.

Referring to FIG. 15, a second system for detecting a movement of operator actuatable input device 212 in a direction 284 along moveable plug axis 250 is shown. The system includes a sensor 470 positioned proximate to second end 206 of lock core body 202. As shown in FIG. 16, operator actuatable input device 212 includes a ring magnet 472 positioned proximate to rear surface 460 of operator actuatable input device 212. Sensor 470, in one example, is a Hall effect sensor which detects a proximity of ring magnet 472 to second end 206 of lock core body 202. An operator of interchangeable electro-mechanical lock core 200 activates electronic controller 254 to the awake mode by applying an external force to operator actuatable input device 212 to move operator actuatable input device 212 in direction 284 an amount sufficient to be detected by sensor 470. Sensor 470 is connected to a wake-up circuit of electronic controller 254 and places electronic controller 254 in an awake mode.

Figure 17:
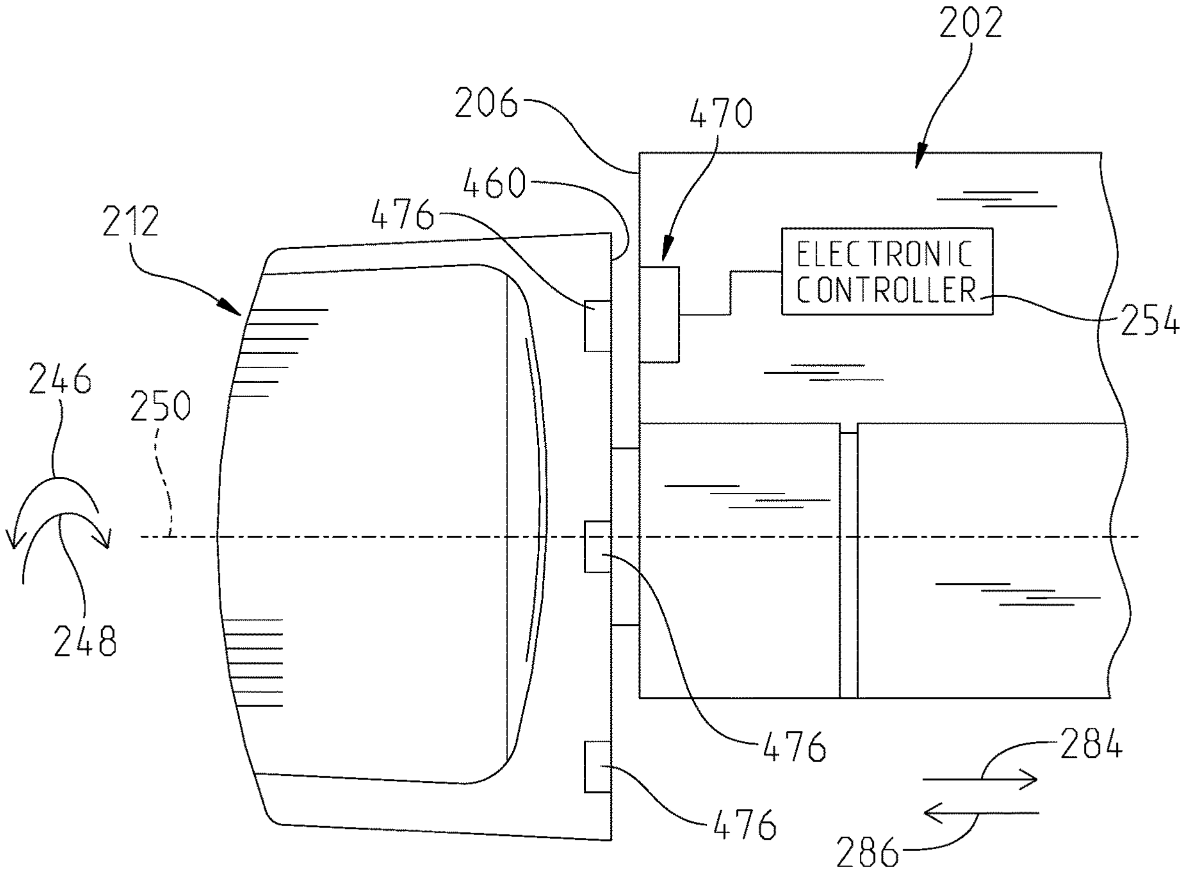
FIG. 17 illustrates a third exemplary system for detecting a physical input with the operator actuatable input device of interchangeable electro-mechanical lock core.
Figure 18:
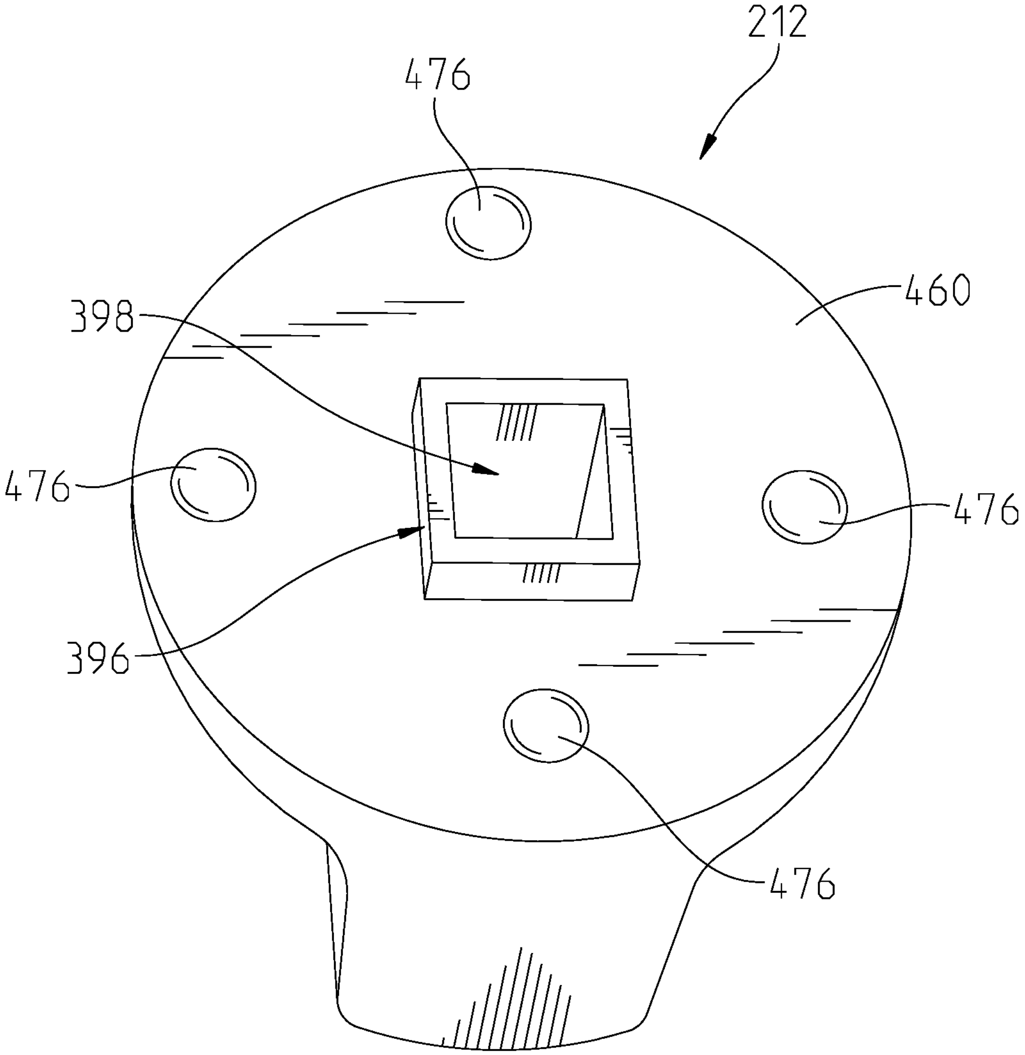
FIG. 18 illustrates a rear, perspective view of the operator actuatable input device for the system of FIG. 17.

Referring to FIG. 17, a system for detecting a movement of operator actuatable input device 212 in either direction 246 or direction 248 about moveable plug axis 250 is shown. The system also includes sensor 470 positioned proximate to second end 206 of lock core body 202. As shown in FIG. 18, operator actuatable input device 212 includes a plurality of spaced apart magnets 476 positioned proximate to rear surface 460 of operator actuatable input device 212. Sensor 470 detects a presence of one of spaced apart magnets 476 positioned in front of sensor 470. As such, if operator actuatable input device 212 is rotated about moveable plug axis 250 in either direction 246 or direction 248, sensor 470 will detect a presence of a first one of magnets 476 at a first time, followed by the absence of any magnets 476 at a second time, and a presence of another one of magnets 476 at a third time. An operator of interchangeable electro-mechanical lock core 200 activates electronic controller 254 to the awake mode by applying an external force to operator actuatable input device 212 to rotate operator actuatable input device 212 in either direction 246 or direction 248 an amount sufficient to be detected by sensor 470. Sensor 470 is connected to a wake-up circuit of electronic controller 254 and places electronic controller 254 in an awake mode.

An advantage, among others, of a system which detects an axial external force in direction 284 along moveable plug axis 250 is that the system may also be used as a safety feature to limit damage to blocker 260, motor 266, and clutch 280. If an operator awakes electronic controller 254 and continues to apply an external force in direction 284 along moveable plug axis 250, electronic controller 254 may alert the operator to release operator actuatable input device 212. In one example, electronic controller 254 sends a signal to operator devices 902 proximate to interchangeable electro-mechanical lock core 200 to release operator actuatable input device 212. In another example, either operator actuatable input device 212 or lock core body 202 includes visual indicators, such as light emitting diodes 488 (see FIG. 20), which can be illuminated to indicate incorrect operation of interchangeable electro-mechanical lock core 200. In one embodiment, electronic controller 254, alerts the operator to release operator actuatable input device 212, prior to activating motor 266 to move blocker 260 to the release position, assuming appropriate electronic credentials have been provided to electronic controller 254, because the continued external force in direction 284 on operator actuatable input device 212 causes clutch 280 to exert a force on blocker 260 in direction 284 and the increased friction between clutch 280 and blocker 260 may cause motor 266 to overheat or malfunction.

Another advantage, among others, of the systems described in connection with FIGS. 14-18 is that operator actuatable input device 212 may alone be used to both activate electronic controller 254 and to actuate moveable core plug 220 of interchangeable electro-mechanical lock core 200. A separate operator activation input is not needed as part of interchangeable electro-mechanical lock core 200. Further, the use of a first physical input to activate electronic controller 254 and a second physical input to actuate moveable core plug 220 reduces the energy usage of interchangeable electro-mechanical lock core 200 because motor 266 is not used to actuate moveable core plug 220. In one example a second physical input and a third physical input are needed to actuate moveable core plug 220. Additional details regarding exemplary power architectures and electronic credential authentication methodologies are disclosed herein.

Figure 19:
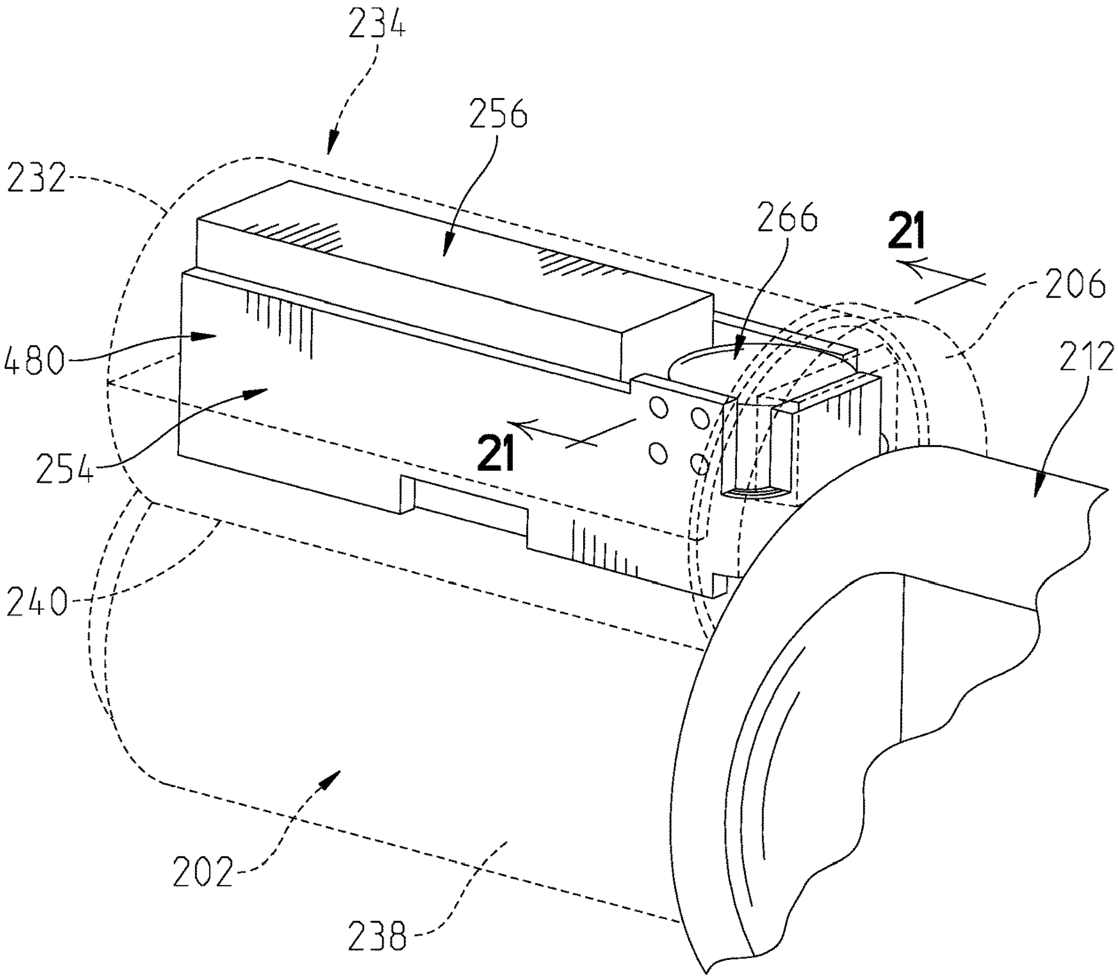
FIG. 19 illustrates a perspective view of an exemplary packaging of an electrical controller, a power source, and a motor of the interchangeable electro-mechanical lock core of FIG. 2.
Figure 20:
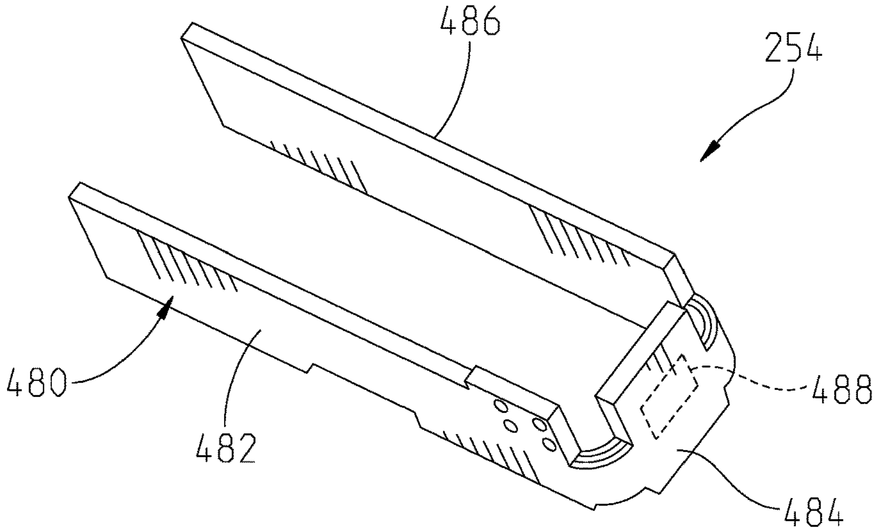
FIG. 20 illustrates a top, perspective view of the electronic controller of FIG. 19.
Figure 21:
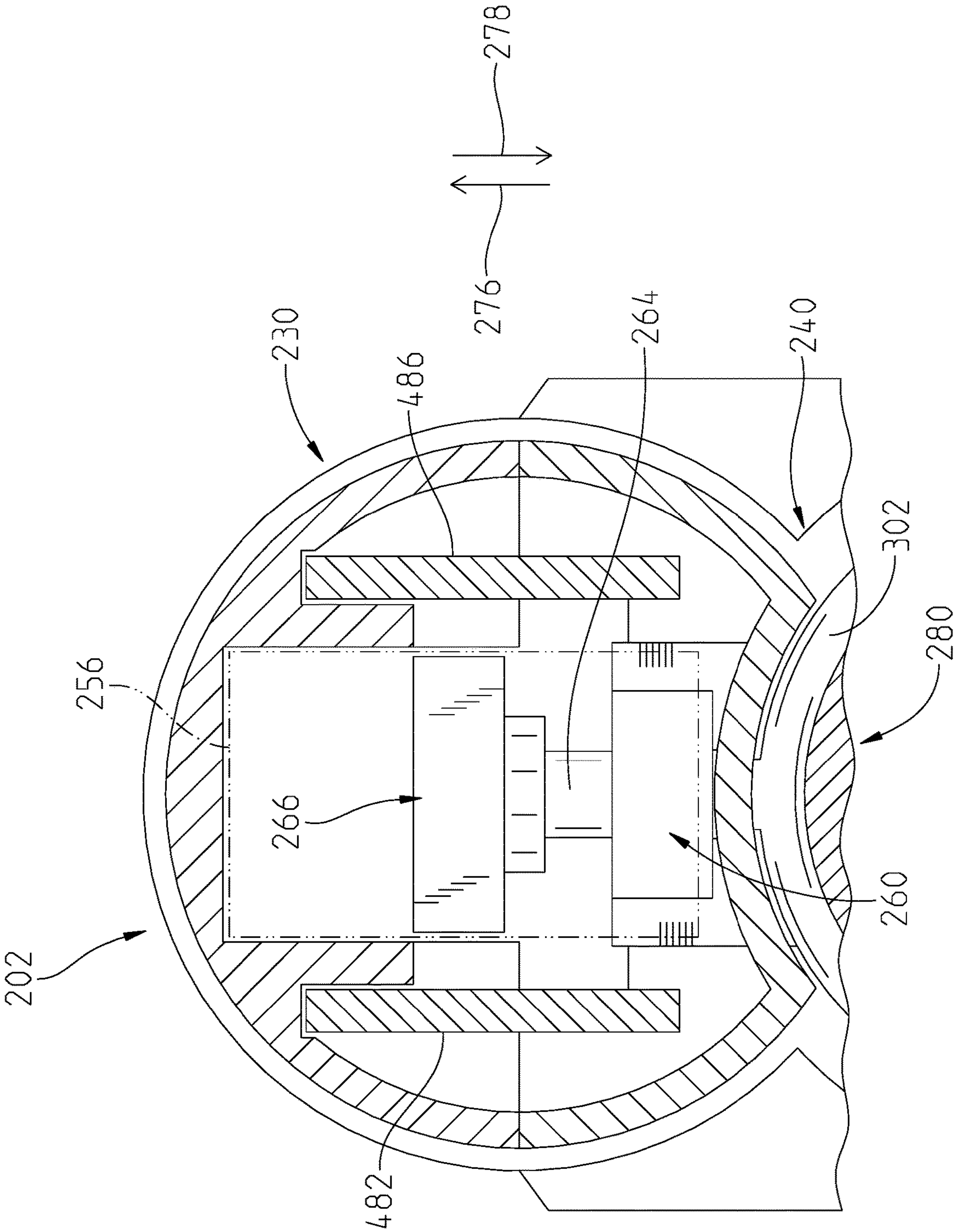
FIG. 21 is a partial sectional view of the exemplary packaging of the electrical controller, the power source, and the motor of the interchangeable electro-mechanical lock core of FIG. 19.

Referring to FIGS. 19-21, an exemplary packaging of electronic controller 254, power source 256, and motor 266 of interchangeable electro-mechanical lock core 200 in lock core body 202 is shown. Each of electronic controller 254, power source 256, and motor 266 are positioned in first cylindrical portion 232 of upper portion 230 of lock core body 202. Motor 266 is positioned closer to second end 206 of lock core body 202 so threaded shaft 264 of motor 266 may drive blocker 260 into and out of engagement with clutch 280 in direction 278 and direction 276, respectively (see FIG. 21). Power source 256 is positioned rearward of motor 266 and proximate to first end 204 of lock core body 202.

Referring to FIG. 20, electronic controller 254 includes a flex circuit arrangement 480 having a first circuit board leg portion 482, a front circuit board portion 484, and a second circuit board leg portion 486. Although not illustrated, flex circuit arrangement 480 includes various microprocessors and other circuit elements which perform the logic of electronic controller 254. As shown in FIGS. 19 and 21, flex circuit arrangement 480 is positioned around motor 266 and extending rearward along power source 256. In one example, flex circuit arrangement 480 includes at least one light emitting diode 488 which is visible through at least one window (not shown) in second end 206 of lock core body 202.

Figure 22:
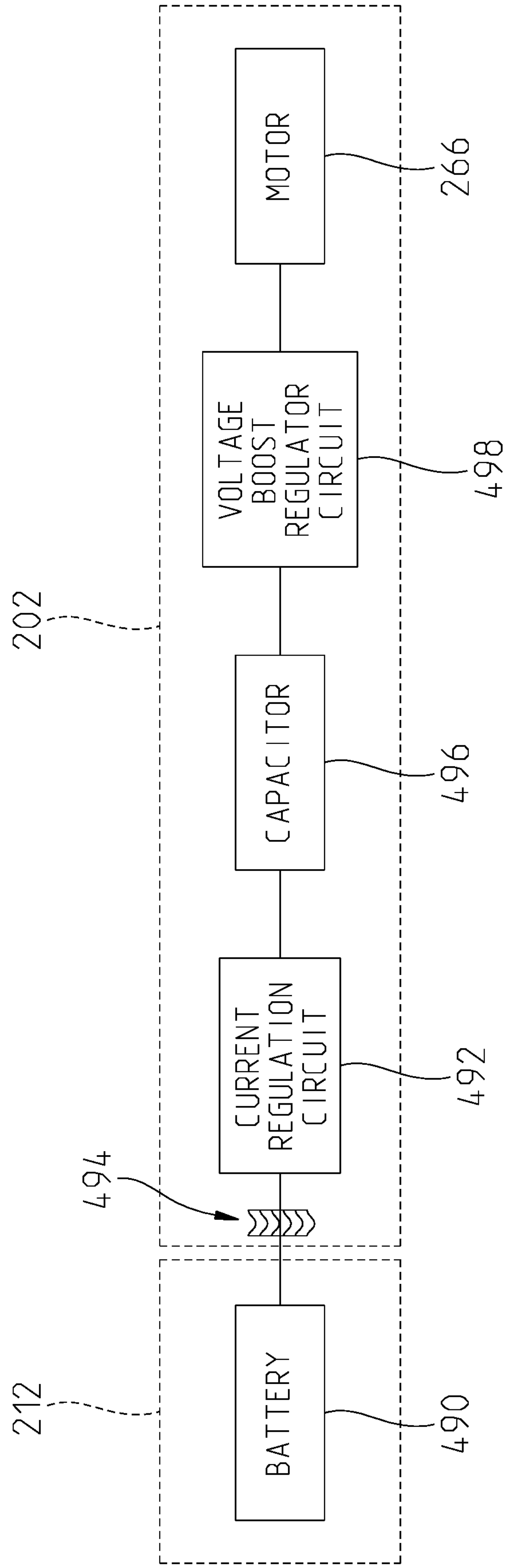
FIG. 22 illustrates an exemplary power architecture for the interchangeable electro-mechanical lock core of FIG. 2.

In one embodiment, power source 256 is a battery which powers electronic controller 254 and motor 266. In another embodiment, power source 256 is a capacitor which receives power from a battery positioned in operator actuatable input device 212. Referring to FIG. 22, in one embodiment a battery 490 is supported by operator actuatable input device 212. In one example, battery 490 is a 3 volt battery. An exemplary battery is a CR2032 model coin battery.

Battery 490 is electrically connected to a current regulation circuit 492 of electronic controller 254 positioned in lock core body 202 of interchangeable electro-mechanical lock core 200. In one example, battery 490 is connected to current regulation circuit 492 through brush contacts 494 which permit the rotation of operator actuatable input device 212 about moveable plug axis 250 relative to lock core body 202. In one example, current regulation circuit 492 is a constant current charger circuit. Current regulation circuit 492, in turn, is electrically coupled to a capacitor 496 positioned in lock core body 202 to charge capacitor 496. In one example, capacitor 496 is positioned in the location of power source 256 in FIG. 19. In one embodiment, capacitor 496 may be charged up to 3 volts and is charged in up to 4 seconds.

Capacitor 496 is electrically coupled to a voltage boost regulator circuit 498 of electronic controller 254 positioned in lock core body 202 of interchangeable electro-mechanical lock core 200. Voltage boost regulator circuit 498 is activated when motor 266 is to run to move blocker 260. Voltage boost regulator circuit 498 boosts the voltage of capacitor 496 to a voltage level needed by motor 266. An advantage, among others, for placement of battery 490 in operator actuatable input device 212 is that a larger capacity battery may be utilized due to additional space in operator actuatable input device 212. Further, battery 490 may be replaced without removing interchangeable electro-mechanical lock core 200 from opening 124 of housing 126 (See FIG. 1).

Figure 23:
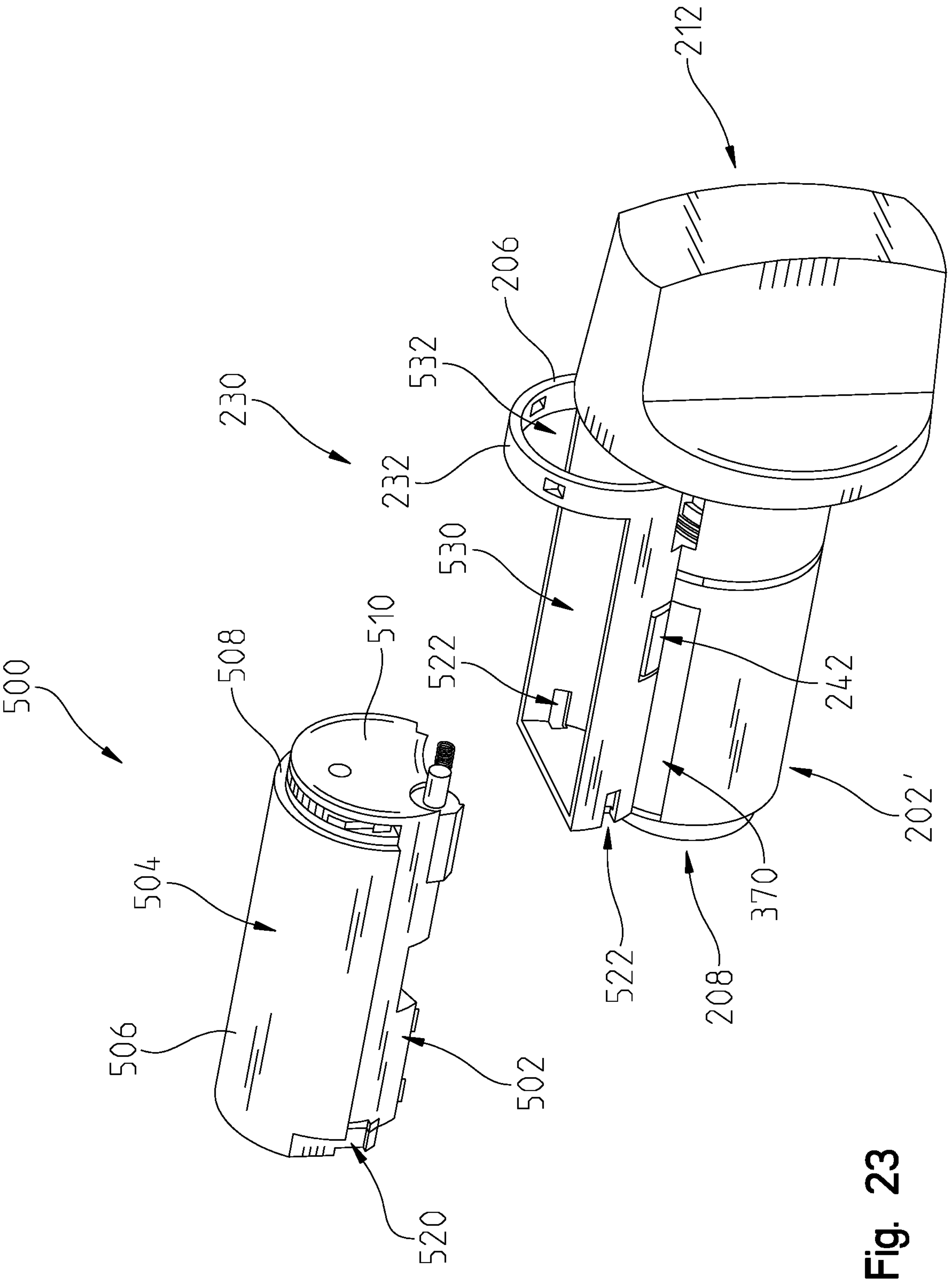
FIG. 23 illustrates a perspective view an alternative lock core body for the interchangeable electro-mechanical lock core of FIG. 2 wherein the electronic controller, the power source, the motor and the blocker are provided as a sub-assembly spaced apart from the remainder of the lock core body, the sub-assembly to be assembled with the remainder of the lock core body.
Figure 24:
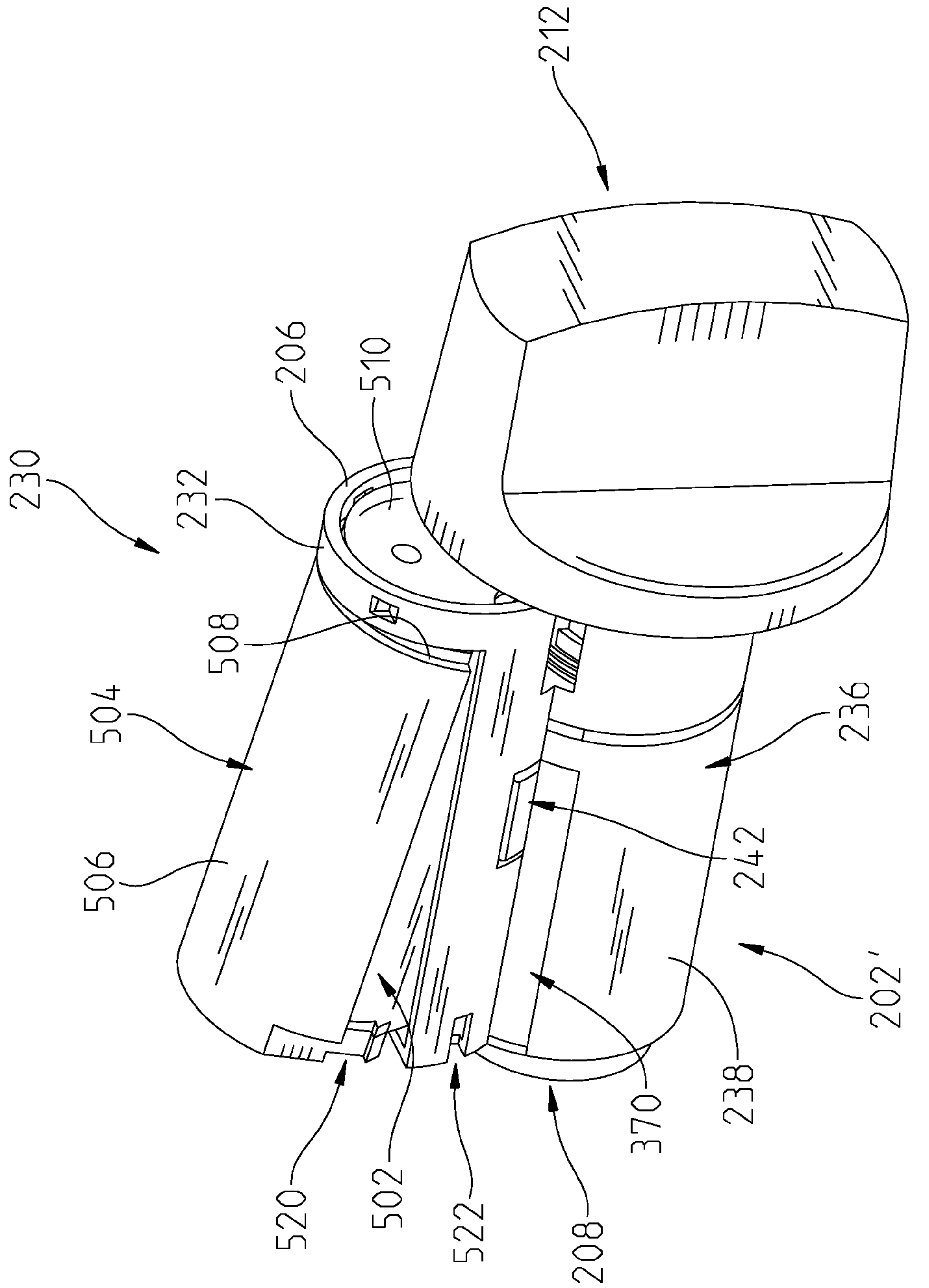
FIG. 24 illustrates the sub-assembly of FIG. 23 being assembled to the remainder of the lock core body.

Referring to FIGS. 23 and 24, an alternative embodiment of lock core body 202' is illustrated. Lock core body 202' has the same envelope 236 as lock core body 202, but upper portion 230 is split into multiple components. Upper portion 230 continues to include first cylindrical portion 232 proximate waist portion 240 and at second end 206 of lock core body 202'. An assembly 500 houses motor 266, electronic controller 254, and power source 256. Assembly 500 is inserted into lock core body 202' to complete the shape of lock core body 202'

Assembly 500 includes a base 502 and a cover 504. Base 502 and cover 504 cooperate to house electronic controller 254, power source 256, and motor 266. In one embodiment, assembly 500 also houses or supports blocker 260. Cover 504 has a cylindrical shape 506 which generally matches the shape of first cylindrical portion 232 of upper portion 230. Assembly 500 is inserted into a cavity 530 of lock core body 202' from a rear portion of lock core body 202'.

A front section of assembly 500 is received by opening 532 in upper portion 230 of lock core body 202'. A front wall 510 of assembly 500 is generally flush with second end 206 of lock core body 202' when assembly 500 is assembled to the remainder of lock core body 202'. A front wall 508 of cover 504 abuts upper portion 230 when assembly 500 is assembled to the remainder of lock core body 202' A rear portion of assembly 500 includes a plurality of clips 520 which are received in openings 522 in lock core body 202' An advantage, among others, for having electronic controller 254, power source 256, and motor 266 housed in a separate assembly 500 is the ease of assembly of electronic controller 254, power source 256, and motor 266 outside of the interior of lock core body 202.

Figure 25:
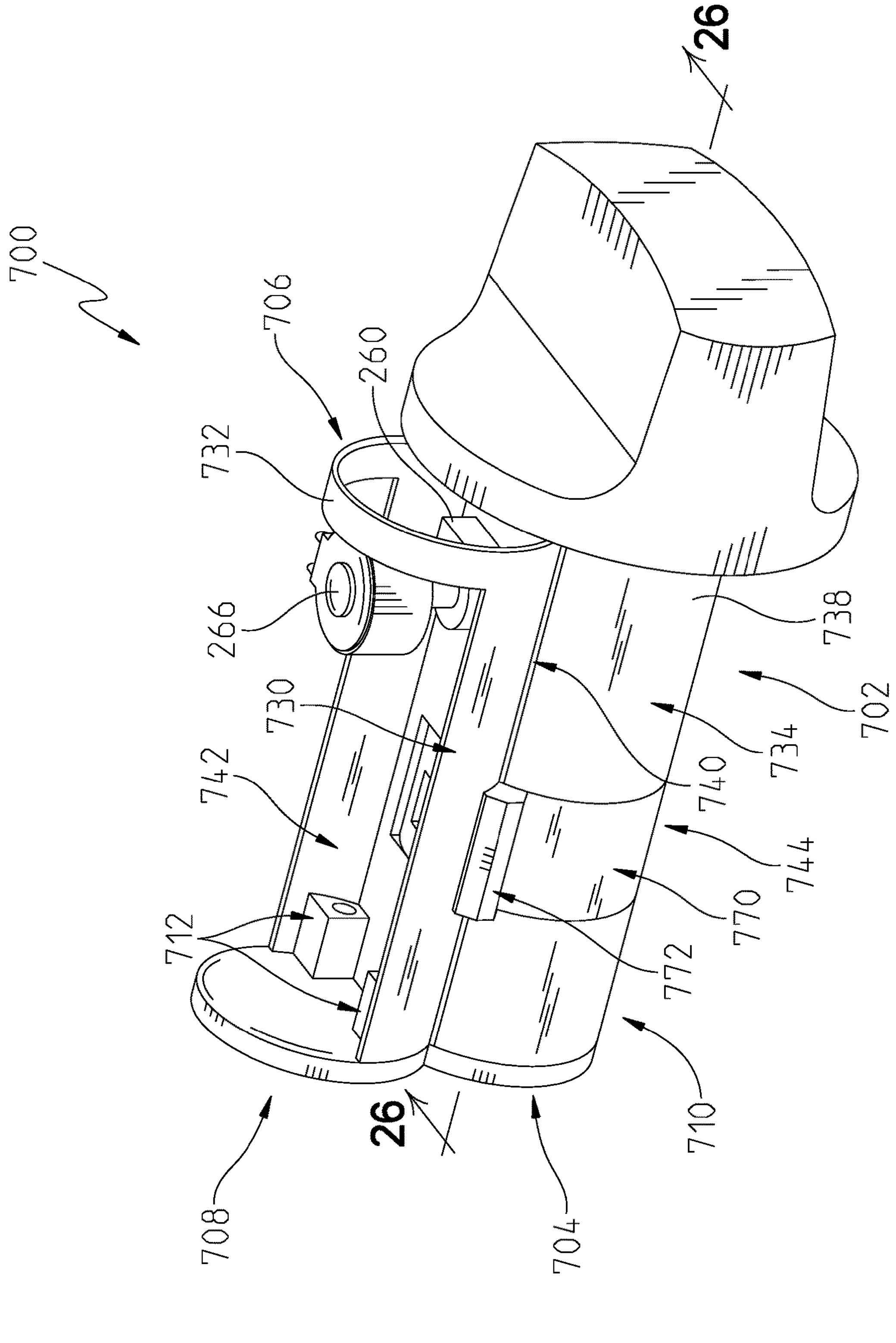
FIG. 25 illustrates a front, perspective view of another exemplary embodiment of the exemplary interchangeable electro-mechanical lock core of FIG. 1 with the electronic controller and the power source removed.
Figure 26:
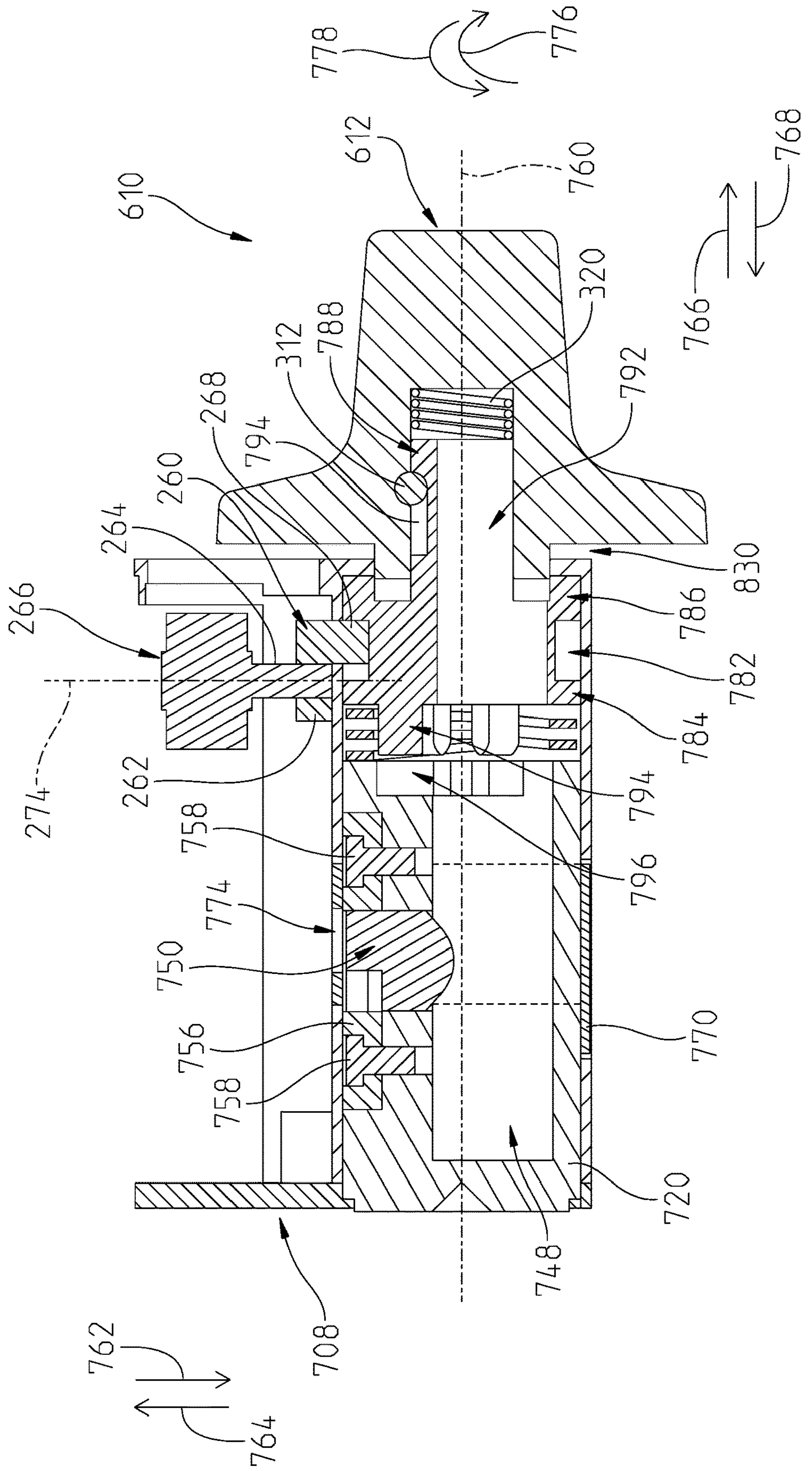
FIG. 26 illustrates a sectional view of the interchangeable electro-mechanical lock core of FIG. 25 along lines 26-26 of FIG. 25 with a blocker in a blocking position wherein the blocker is received in a circumferential groove of a clutch to maintain engagement features of the clutch spaced apart from engagement features of a moveable plug.

Referring to FIGS. 25-40, an exemplary interchangeable electro-mechanical lock core 700 according to the description of interchangeable electro-mechanical lock core 100 is shown. Referring to FIGS. 25 and 26, interchangeable electro-mechanical lock core 700 includes a lock core body 702 having a first end 704 and a second end 706. First end 704 of interchangeable electro-mechanical lock core 700 is a cover 708 positioned over an open end of a central body 710. Cover 708 is fastened to central body 710 with a plurality of fasteners (not shown) threaded into blocks 712 of central body 710. A locking device interface 714 (see FIG. 27) is illustrated as a rear end of a moveable core plug 720 of interchangeable electro-mechanical lock core 700. As is known in the art, locking device interface 714 may include one or more recesses and/or one or more protrusions which interface with cam members, tailpieces, or other types of throw members which in turn interact with locking device 110. Although locking device interface 714 is shown as positioned at first end 204 of lock core body 202 and recessed into moveable core plug 720, locking device interface 714 may extend beyond first end 704 of lock core body 702. In the illustrated embodiment, locking device interface 714 includes recesses 716 in moveable core plug 720 (see FIGS. 39 and 40) which receive pins (not shown) of locking device 110.

An operator actuatable assembly 610 is shown supported by interchangeable electro-mechanical lock cores 700. Operator actuatable assembly 610 is operatively coupled to a moveable core plug 720 (see FIG. 26) through a clutch 780. Operator actuatable assembly 610 has an alternate operator actuatable input device 612 compared to operator actuatable assembly 210, but interfaces with clutch 780 in the same manner as operator actuatable input device 212 of operator actuatable assembly 210 with clutch 280.

Referring to FIG. 25, lock core body 702 includes an upper portion 730 having a first cylindrical portion 732, a lower portion 736 having a second cylindrical portion 738, and a waist portion 740. The maximum lateral extents of upper portion 730, lower portion 736, and waist portion 740 satisfy the relationships of FIG. 3A for lock core body 202 wherein the maximum lateral extent ($d_3$) of the waist portion is less than the maximum lateral extent ($d_1$) of the upper portion and is less than the maximum lateral extent ($d_2$) of the lower portion.

Interchangeable electro-mechanical lock core 700 includes motor 266 and blocker 260 from interchangeable electro-mechanical lock core 200. Additionally, electronic controller 254 and power source 256 are included as part of interchangeable electro-mechanical lock core 700. Electronic controller 254, power source 256, motor 266, and blocker 260 are part of an assembly, similar to assembly 500 of FIG. 23, which is received in a cavity 742 of lock core body 702. The operation of electronic controller 254, power source 256, motor 266, and blocker 260 is the same as for interchangeable electro-mechanical lock core 200.

As shown in FIG. 25, lower portion 736 of lock core body 702 includes an opening 744 in which a control sleeve 770 is received. Control sleeve 770 supports a core keeper 772 in a similar manner as control sleeve 370 of interchangeable electro-mechanical lock core 200 supports core keeper 242 of interchangeable electro-mechanical lock core 200. The external shape of control sleeve 770 generally matches the cylindrical shape of second cylindrical portion 738 of lower portion 734.

Figure 30:
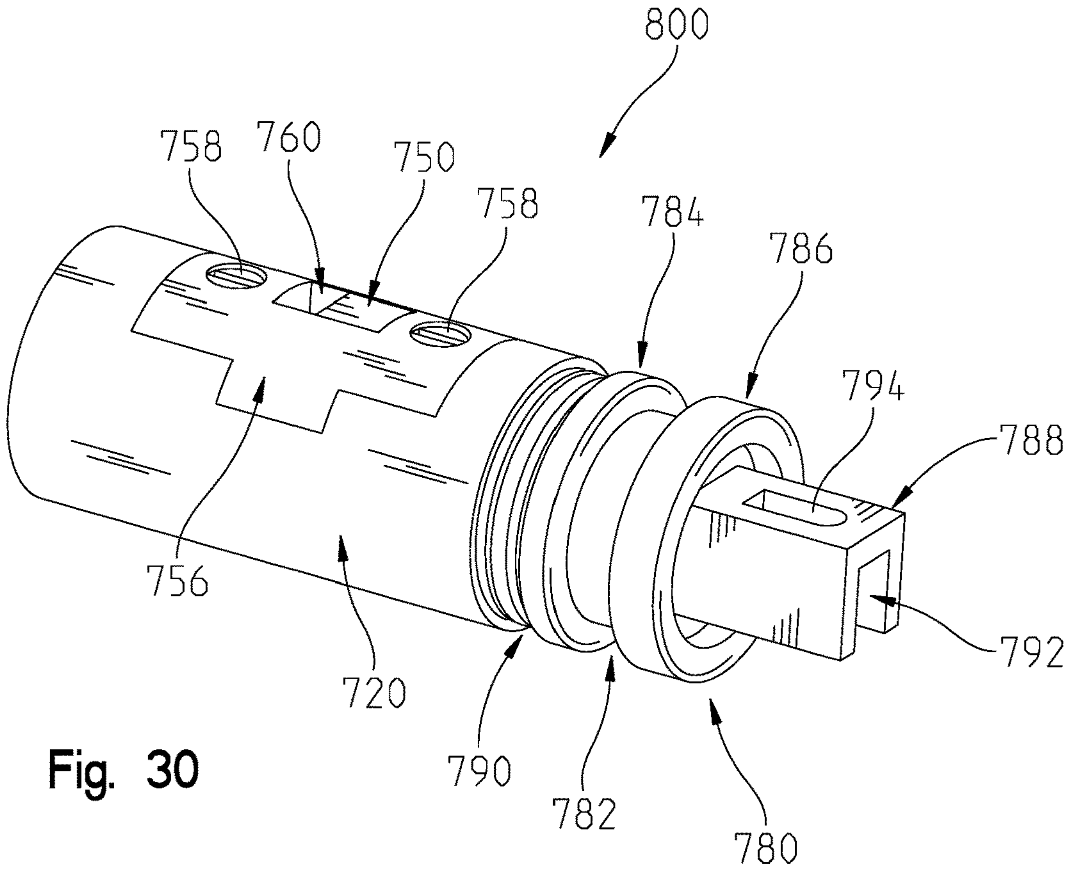
FIG. 30 illustrates a front, perspective view of a lock actuator assembly of the interchangeable electro-mechanical lock core of FIG. 25.

Referring to FIG. 30, a lock actuation assembly 800 is shown. Lock actuation assembly 800 is positioned in lower portion 734 of lock core body 702 (see FIG. 26). Lock actuation assembly 800 includes moveable core plug 720, clutch 780, and a biasing member 790. Biasing member 790, like biasing member 290 of interchangeable electro-mechanical lock core 200, biases clutch 780 away from moveable core plug 720. In one example, biasing member 790 is a wave spring.

Clutch 780 includes a circumferential groove 782, which like circumferential groove 282 of clutch 280, receives second portion 268 of blocker 260. Circumferential groove 782 is bounded by a first shoulder 784 and a second shoulder 786.

Referring to FIG. 26, moveable core plug 720 includes a channel 748 which receives a control element 750 in the same manner that moveable core plug 220 includes a channel 340 which receives pins 360. When control element 750 is biased upward in direction 764, control element 750 is received in an opening 774 of control sleeve 770 to couple moveable core plug 720 to control sleeve 770.

Figure 31:
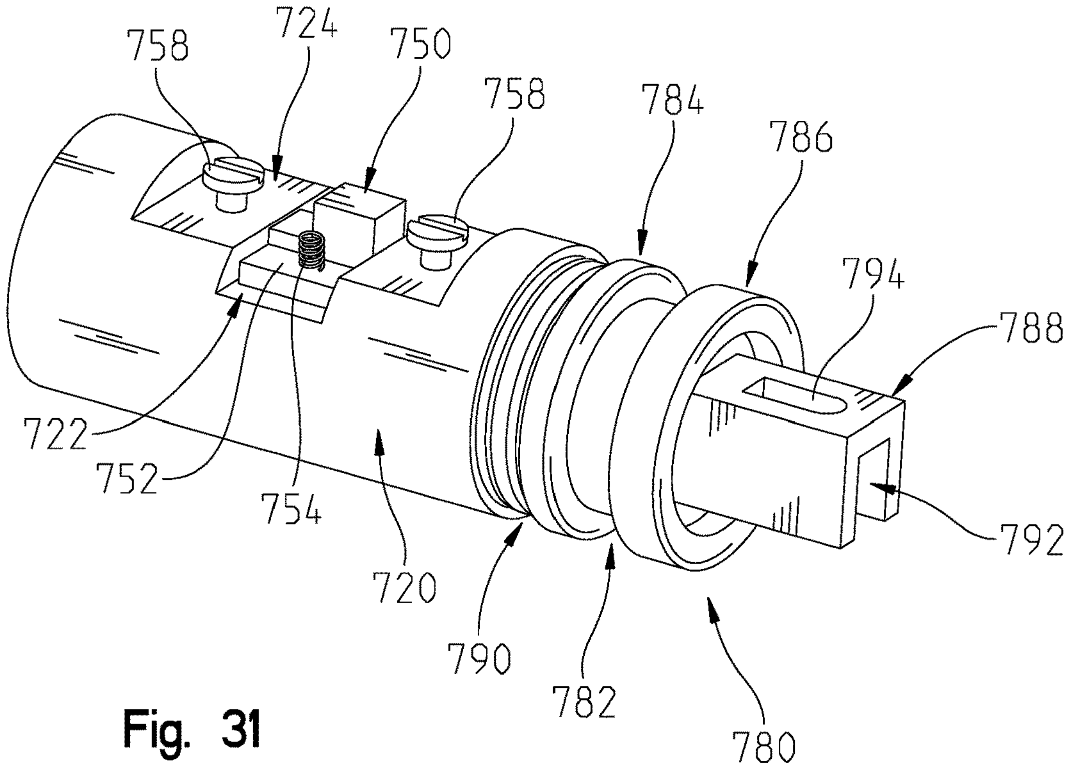
FIG. 31 illustrates the lock actuator assembly of FIG. 30 with a cover removed.
Figure 32:
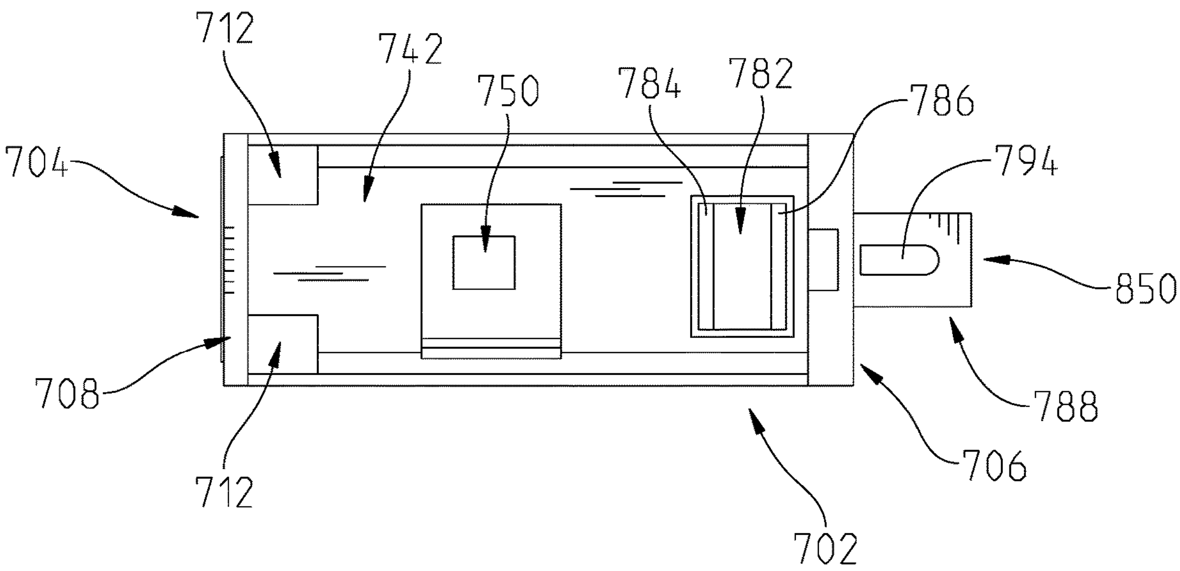
FIG. 32 illustrates a top view of the interchangeable electro-mechanical lock core of FIG. 25 with an operator actuatable input device, electronic controller, power source, motor, and blocker removed.

Referring to FIG. 31, control element 750 is received in an opening 722 of moveable core plug 720. Control element 750 includes side extensions 752 which support biasing members 754, illustratively springs. Biasing members 754 are compressed against an underside of a cover 756 which is secured to moveable core plug 720 through fasteners 758. Cover 756 is received in a recess 724 of moveable core plug 720. Cover 756 has an opening 760 through which control element 750 can extend to couple to control sleeve 770. Biasing members 754 bias control element 750 downward in direction 762 into channel 748 of moveable core plug 720.

Clutch 780 includes an extension 788 having a U-shaped channel 792. U-shaped channel 792 and channel 748 receive key 352 to actuate control element 750, as described in more detail herein. Similar to the removal of operator actuatable input device 212 of operator actuatable assembly 210 to access central channel 340 of moveable core plug 220 and channel 346 of clutch 280 of interchangeable electro-mechanical lock core 200, operator actuatable input device 612 of operator actuatable assembly 610 is removed to access u-shaped channel 792 of clutch 780 and channel 748 of moveable core plug 720.

Referring to FIGS. 26-29, sectional views of interchangeable electro-mechanical lock core 700 is shown. FIG. 26 corresponds generally to FIG. 7 for interchangeable electro-mechanical lock core 200. Referring to FIG. 26, threaded shaft 264 of motor 266 is rotatable about an axis 274 and is received in a threaded aperture in first portion 262 of blocker 260. Blocker 260 may be moved upward in direction 764 along axis 274 relative to clutch 780 or downward in direction 762 relative to clutch 780. The orientation of blocker 260 is maintained by the shape and size of lock core body 702 and of an opening 776 (see FIG. 32) in lock core body 702. As such, due to a rotation of threaded shaft 264 of motor 266 in a first direction about axis 274, blocker 260 is moved downwardly in direction 762 and due to a rotation of threaded shaft 264 of motor 266 in a second direction about axis 274, blocker 260 is moved upwardly in direction 764.

As mentioned herein, blocker 260 cooperates with clutch 780 to deny or grant access to moveable core plug 720. As shown in FIG. 26, second portion 268 of blocker 260 is received in circumferential groove 782 of clutch 780 which restricts axial movement of clutch 780 along a moveable plug axis 760 in direction 768 and direction 766 relative to blocker 260. Second shoulder 786 of clutch 780, which corresponds with a wall of circumferential groove 782, cooperates with second portion 268 of blocker 260 to restrict movement of clutch 780 in direction 768 and first shoulder 784 of clutch 780, which corresponds with a wall of circumferential groove 782, cooperates with second portion 268 of blocker 260 to restrict movement of clutch 780 in direction 766. The relationship shown in FIG. 26 is referred to as a blocked position of blocker 260 due to the restricted axial movement of clutch 780 relative to blocker 260 along moveable plug axis 760.

Figure 27:
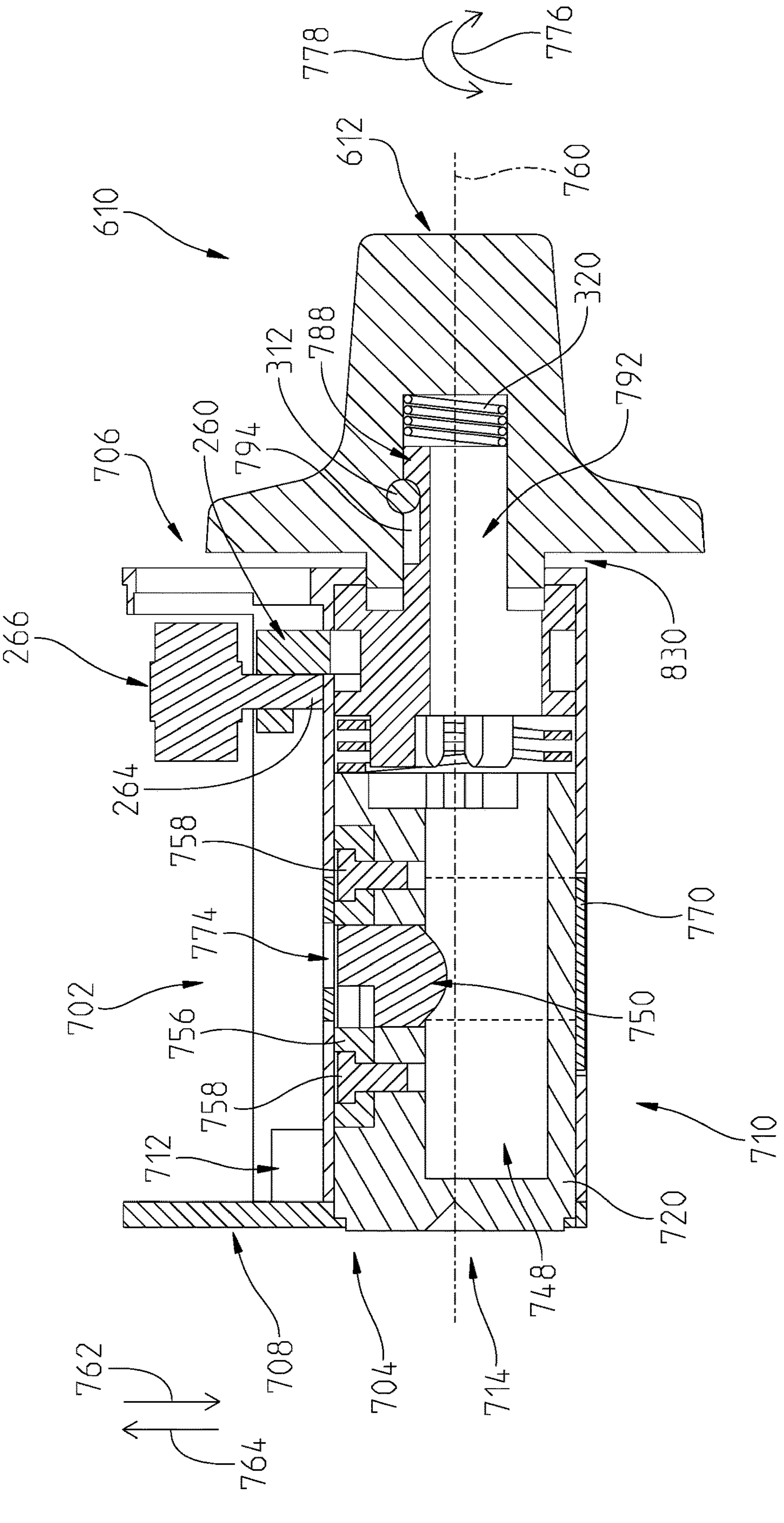
FIG. 27 illustrates the sectional view of FIG. 26 with the blocker in a release position thereby allowing the engagement features of the clutch to engage with the engagement features of the moveable plug.

FIG. 27 corresponds generally to FIG. 8 for interchangeable electro-mechanical lock core 200. Referring to FIG. 27, when second portion 268 of blocker 260 is removed from circumferential groove 782 of clutch 780, clutch 780 may move to a greater degree axially along moveable plug axis 760 relative to blocker 260. As shown in the illustrated embodiment of FIG. 27, second portion 268 of blocker 260 is moved upward in direction 764 such that second portion 268 of blocker 260 is positioned completely above clutch 780. The relationship shown in FIG. 27 is referred to as a release position of blocker 260 due to the less restricted axial movement of clutch 780 relative to blocker 260 along moveable plug axis 760. One advantage, among others for having blocker 260 received in circumferential groove 782 of clutch 780 is that clutch 780 is able to freely rotate about moveable plug axis 760 in direction 776 or direction 778 while blocker 260 is in the blocked position (FIG. 26) and while blocker 260 is in the released position (FIG. 27). Additional details regarding the interactions of blocker 260 and clutch 780 and the operation of interchangeable electro-mechanical lock core 700 are provided herein.

FIG. 26 is the rest position of interchangeable electro-mechanical lock core 700. In the rest position, operator actuatable assembly 610 and clutch 780 are freely rotatable about moveable plug axis 760 and blocker 260 prevents the axial movement of clutch 780 in direction 768 to maintain clutch 780 in a spaced apart relationship relative to moveable core plug 720. Thus, moveable core plug 720 cannot be rotated about moveable plug axis 760 to in turn rotate locking device interface 714 and thus actuate lock device 110.

Figure 28:
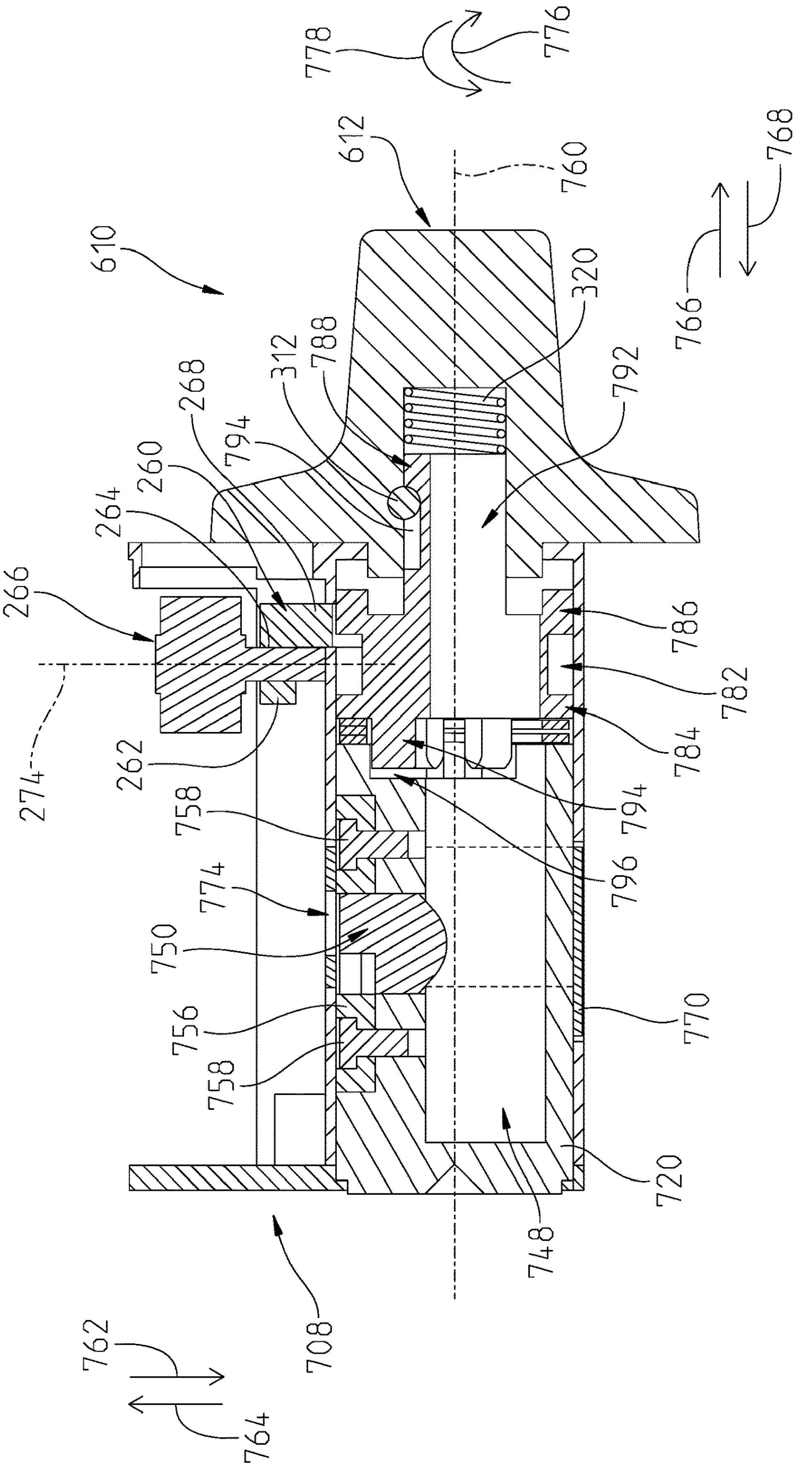
FIG. 28 illustrates the sectional view of FIG. 27 wherein the clutch has been moved along a moveable plug axis of the interchangeable electro-mechanical lock core to bring the engagement features of the clutch into engagement with the engagement features of the moveable plug.

Referring to FIG. 27, blocker 260 has been moved in direction 764 by motor 266 to a release position of blocker 260. In the release position, second portion 268 of blocker 260 is positioned outside of circumferential groove 782 of clutch 780. This is an access position for interchangeable electro-mechanical lock core 700. With second portion 268 of blocker 260 removed from circumferential groove 782 of clutch 780, an operator may move operator actuatable assembly 610 and clutch 780 in direction 768 to bring engagement features 794 of clutch 780 into engagement with engagement features 796 of moveable core plug 720, as illustrated in FIG. 28. In one embodiment, engagement features 794 and 796 are protrusions and recesses similar to engagement features 292, 294 of interchangeable electro-mechanical lock core 200. With engagement features 794 of clutch 780 engaged with engagement features 796 of moveable core plug 720, an operator may rotate moveable core plug 720 to effect a rotation of locking device interface 714 and, in turn, an actuation of the locking device 110 coupled to locking device interface 714.

Figure 29:
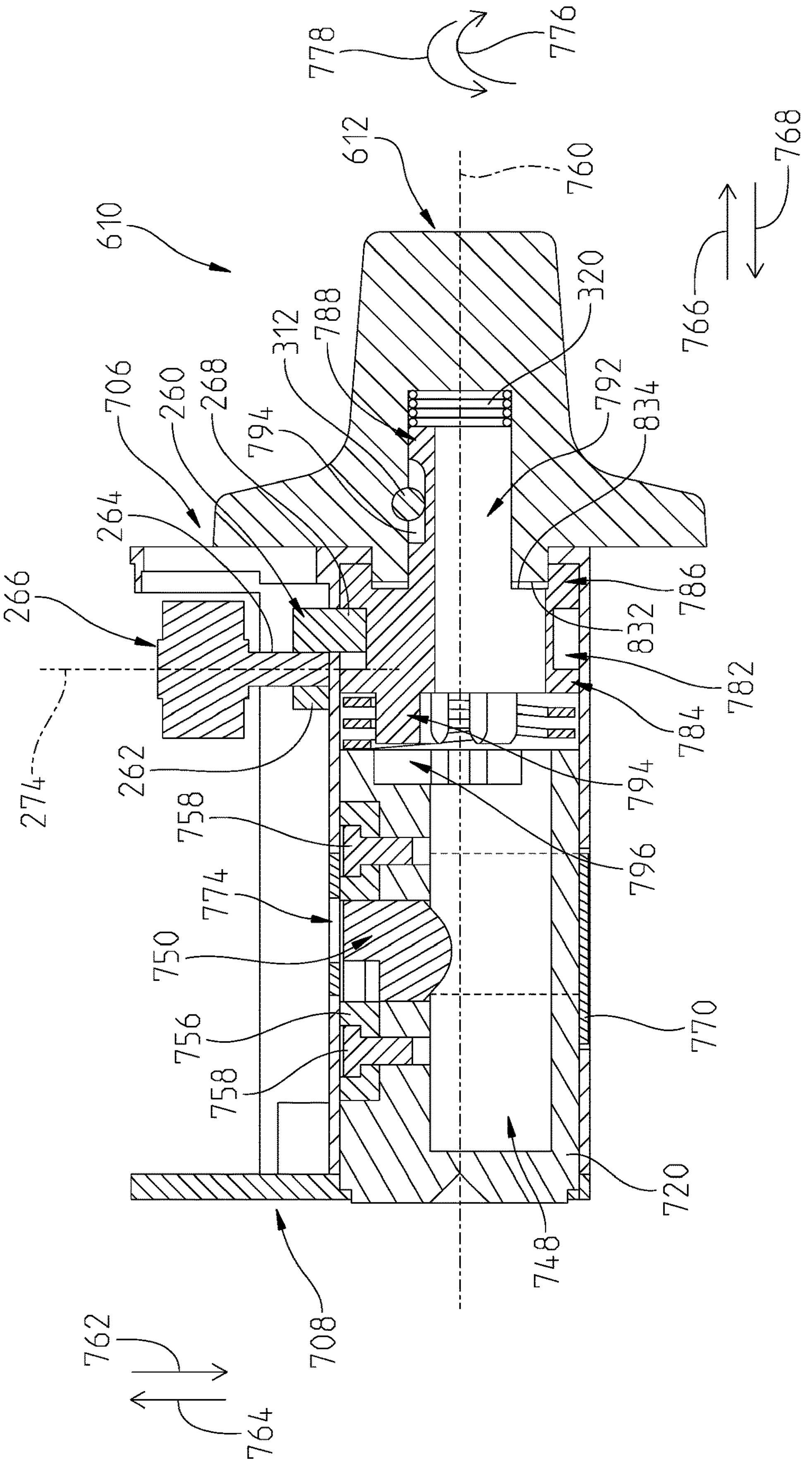
FIG. 29 illustrates the sectional view of FIG. 26 wherein the blocker is in the blocking position and an operator actuatable assembly has been moved axially towards the blocker due to an external force on an operator actuatable input device of the operator actuatable assembly.

As shown in FIG. 28, biasing member 790, illustratively a spring, is compressed due to an external force on operator actuatable input device 612 of operator actuatable assembly 610 in direction 768 when blocker 260 is in the release position, as opposed to, biasing member 320 between extension 788 and operator actuatable input device 612. This is due to biasing member 320 having a higher stiffness than biasing member 790. As shown in FIG. 29, when blocker 260 is in the blocking position, an external force on operator actuatable input device 612 of operator actuatable assembly 610, in direction 768, results in biasing member 320 being compressed until operator actuatable input device 612 bottoms out against second end 706 of lock core body 702. A gap 830 (see FIG. 27) between operator actuatable input device 612 and second end 706 of lock core body 702 is needed to permit the movement of clutch 780 in direction 768 when blocker 260 is in the release position as shown in FIG. 28. The inclusion of biasing member 320 reduces the force experienced by blocker 260 when blocker 260 is in the blocking position due to an external force on operator actuatable input device 612 in direction 768. The force experienced by blocker 260 is limited to the compression force of biasing member 320 since when operator actuatable input device 612 bottoms out against second end 706 of lock core body 702 a small gap between a surface 834 of clutch 780 and a surface 832 of operator actuatable input device 612 still exists.

An advantage, among others, for the inclusion of biasing member 320 and the geometry of operator actuatable input device 612 and clutch 780 is that the operator actuatable assembly 610 as opposed to clutch 780 and blocker 260 will absorb the excess force (which is passed on to lock core body 702 when operator actuatable assembly 610 contacts lock core body 702) thereby increasing the durability of interchangeable electro-mechanical lock core 700 from being damaged. Biasing member 320 also absorbs an initial large spike of the external force and assists in returning operator actuatable input device 612 to the position shown in FIG. 26.

Figure 36:
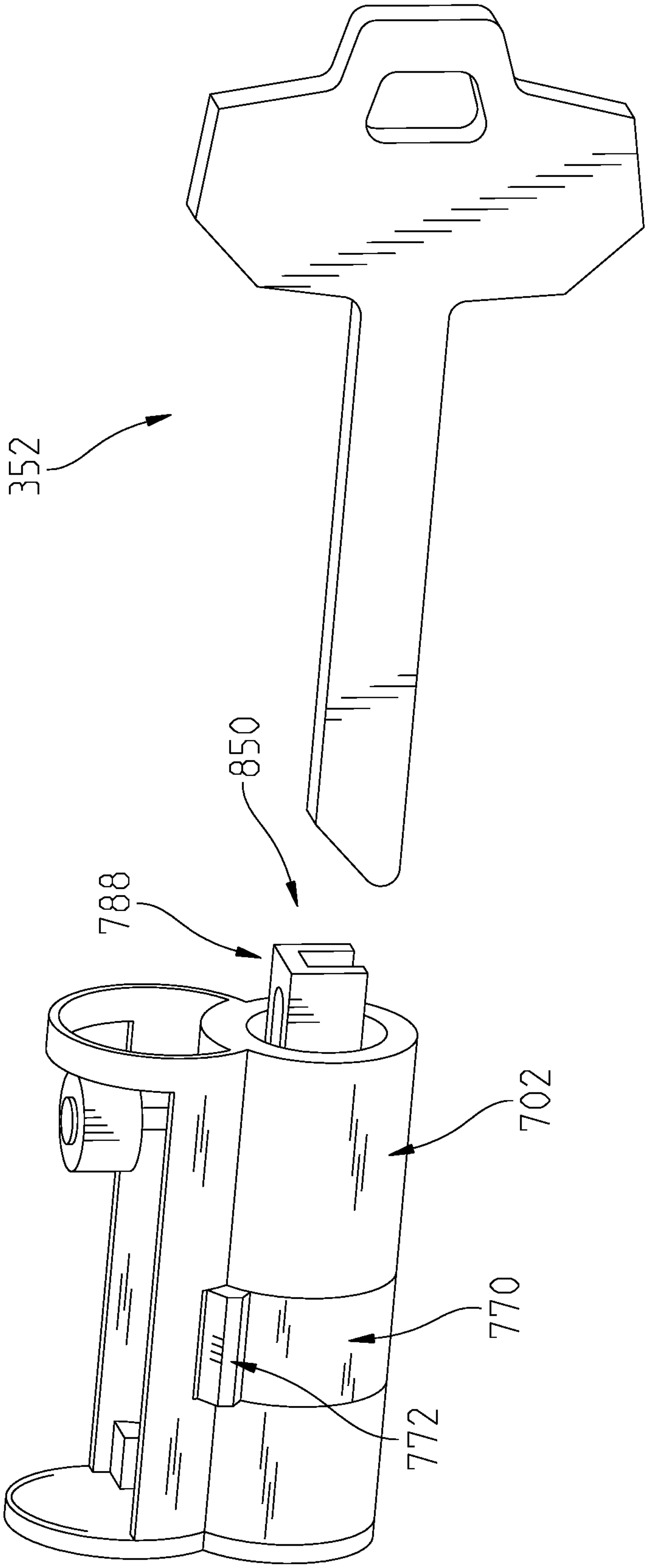
FIG. 36 illustrates a perspective view of the interchangeable electro-mechanical lock core of FIG. 25 with an operator actuatable input device removed and a key spaced apart from the interchangeable electro-mechanical lock core.
Figure 37:
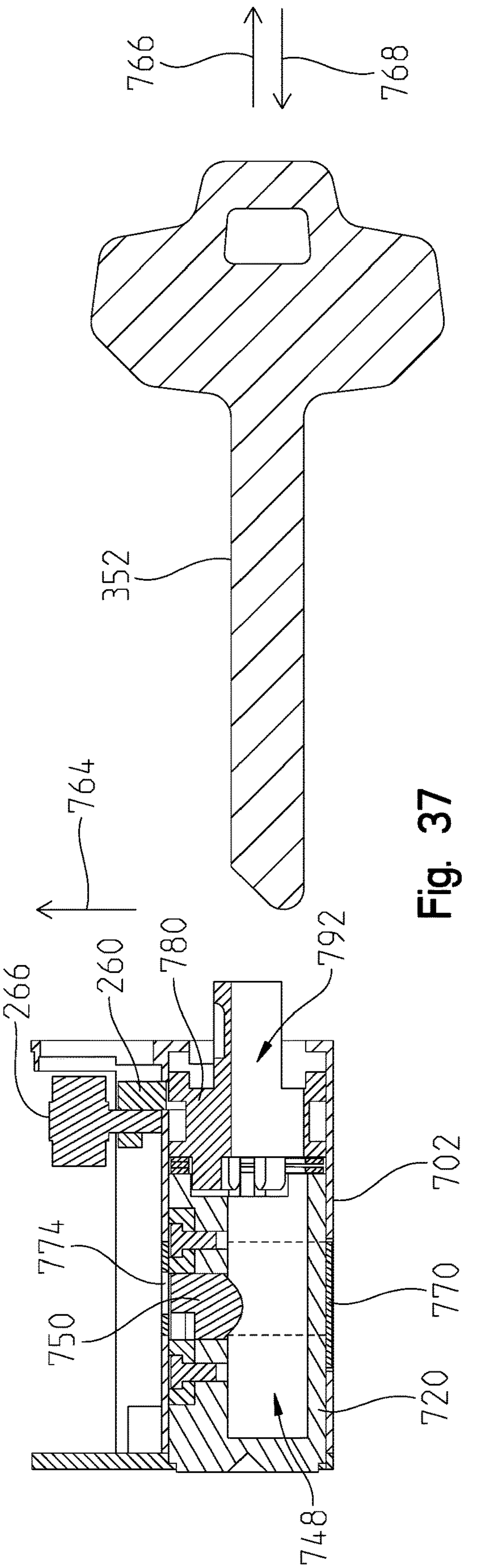
FIG. 37 illustrates a sectional view of the assembly of FIG. 36 with the key spaced apart from the keyway of the interchangeable electro-mechanical lock core.
Figure 38:
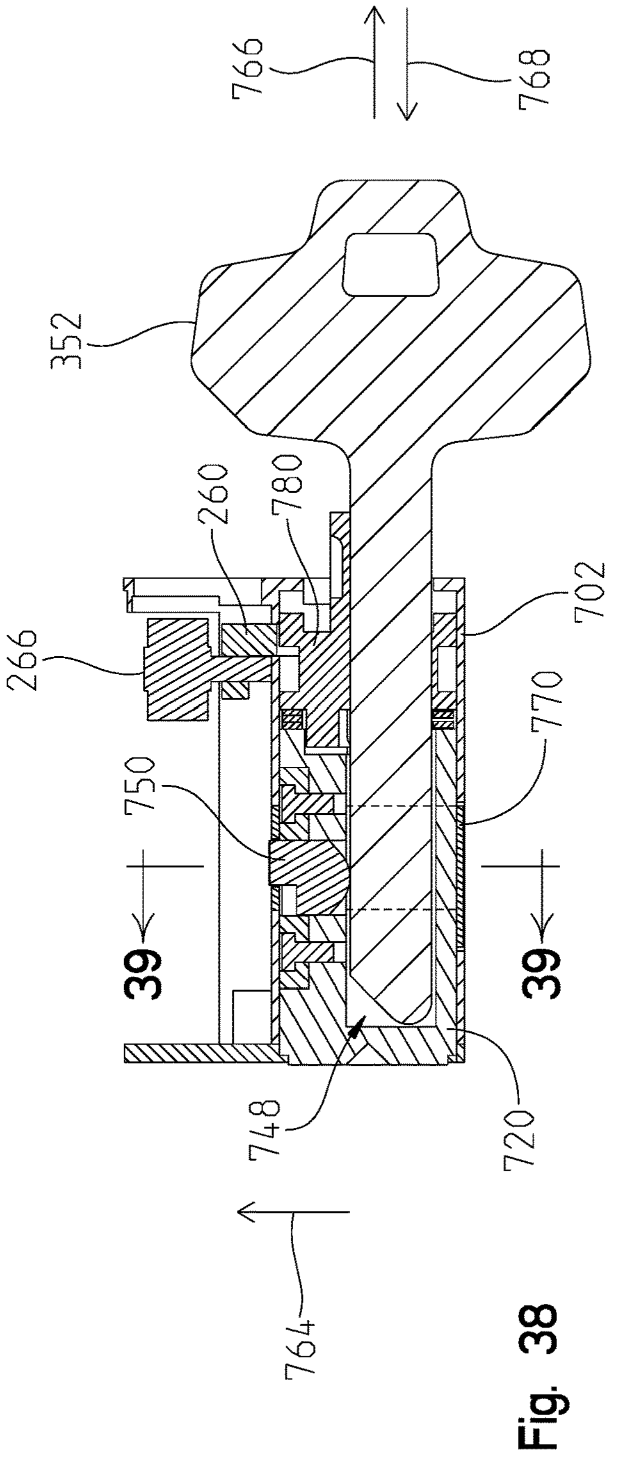
FIG. 38 illustrates the sectional view of the FIG. 37 with the key positioned in the keyway of the interchangeable electro-mechanical lock core.

Referring to FIGS. 36-38, interchangeable electro-mechanical lock core 700 is illustrated with operator actuatable input device 612 removed. When operator actuatable input device 612 is removed from the remainder of interchangeable electro-mechanical lock core 700, channel 792 of clutch 780 and channel 748 of moveable core plug 720 are accessible from a forward end 850 of extension 788 of clutch 780, as shown in FIG. 37.

Turning to FIG. 37, when operator actuatable input device 612 is removed from extension 788 of clutch 780, a key 352 may be inserted into channel 792 of clutch 780 and channel 748 of moveable core plug 720 in direction 768. As shown in FIG. 38, when key 352 is inserted control element 750 is moved in direction 764 against the bias of biasing members 754. Control element 750 is received in opening 774 of control sleeve 770. With control element 750 received in opening 774 of control sleeve 770, key 352 may be rotated about moveable plug axis 760 which in turn rotates moveable core plug 720 and control sleeve 770 about moveable plug axis 760.

Figure 33:
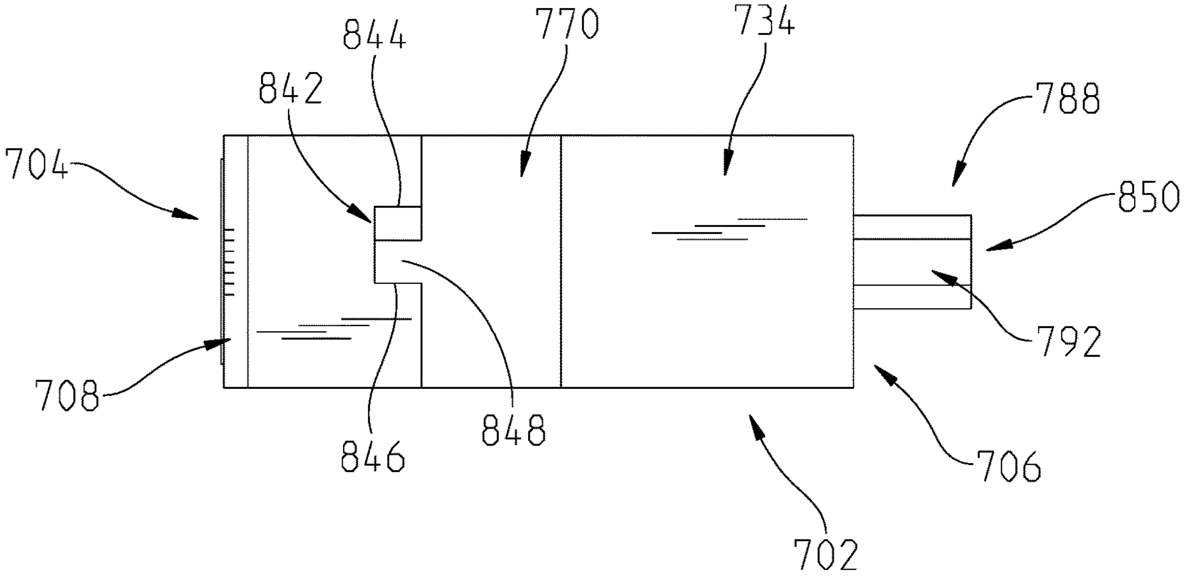
FIG. 33 illustrates a bottom view of the assembly of FIG. 32.
Figure 34:
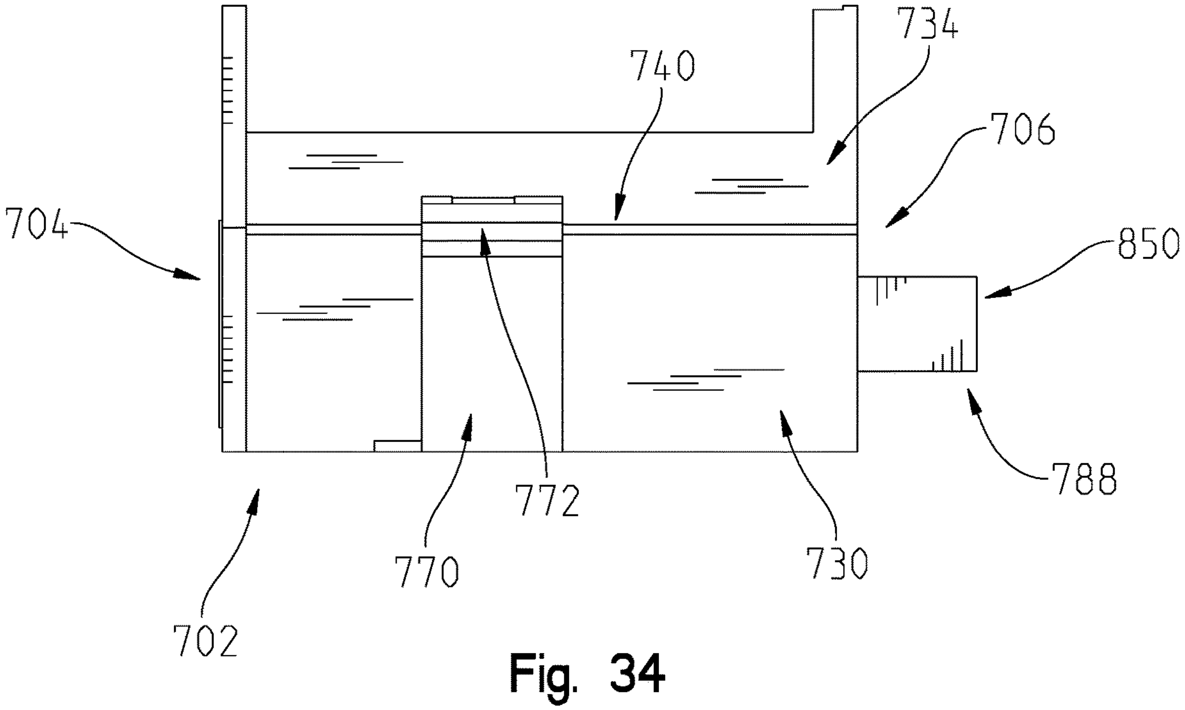
FIG. 34 illustrates a side view of the assembly of FIG. 32.
Figure 35:
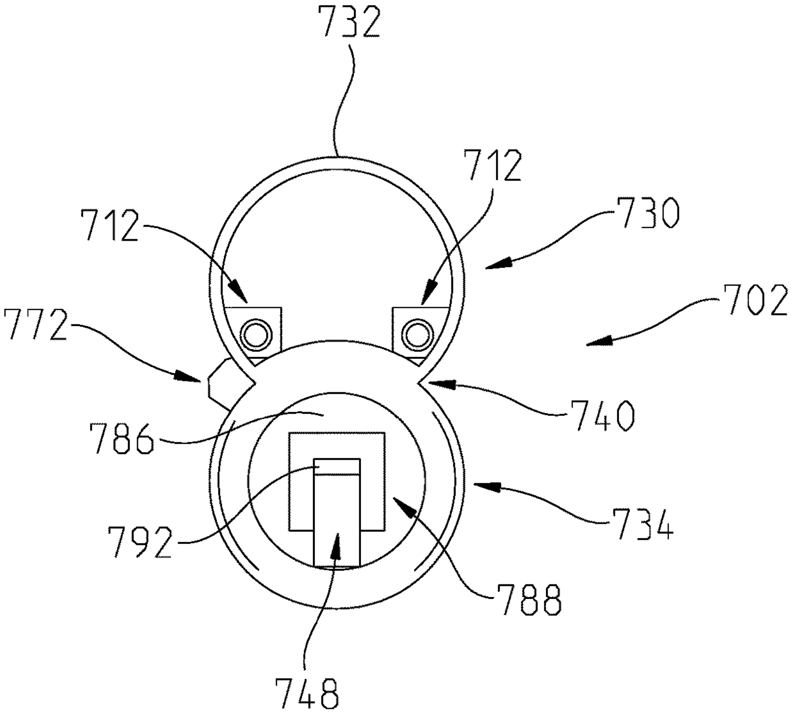
FIG. 35 illustrates an end view of the assembly of FIG. 32.

Referring to FIG. 33, a slot 842 in lock core body 702 includes a first stop surface 844 and a second stop surface 846 which limit a rotation of control sleeve 770 about moveable core plug axis 760. As shown in FIG. 33, control sleeve 770 includes an extension 848 received in slot 842 that interacts with first stop surface 844 and a second stop surface 846 to limit the rotation of control sleeve 770 about moveable core plug axis 760.

Figure 40:
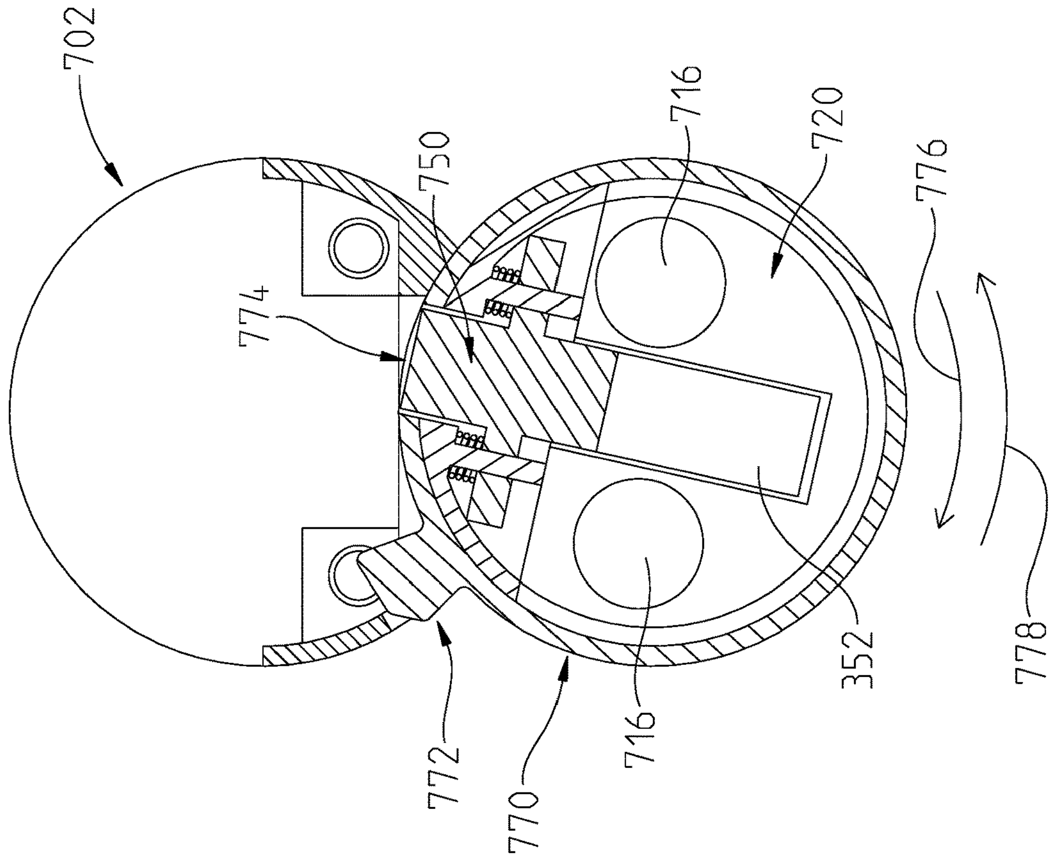
FIG. 40 illustrates the sectional view of FIG. 38 with a core keeper positioned within an envelope of the lock core body due to a rotation of the lock actuator assembly and control sleeve.
Figure 39:
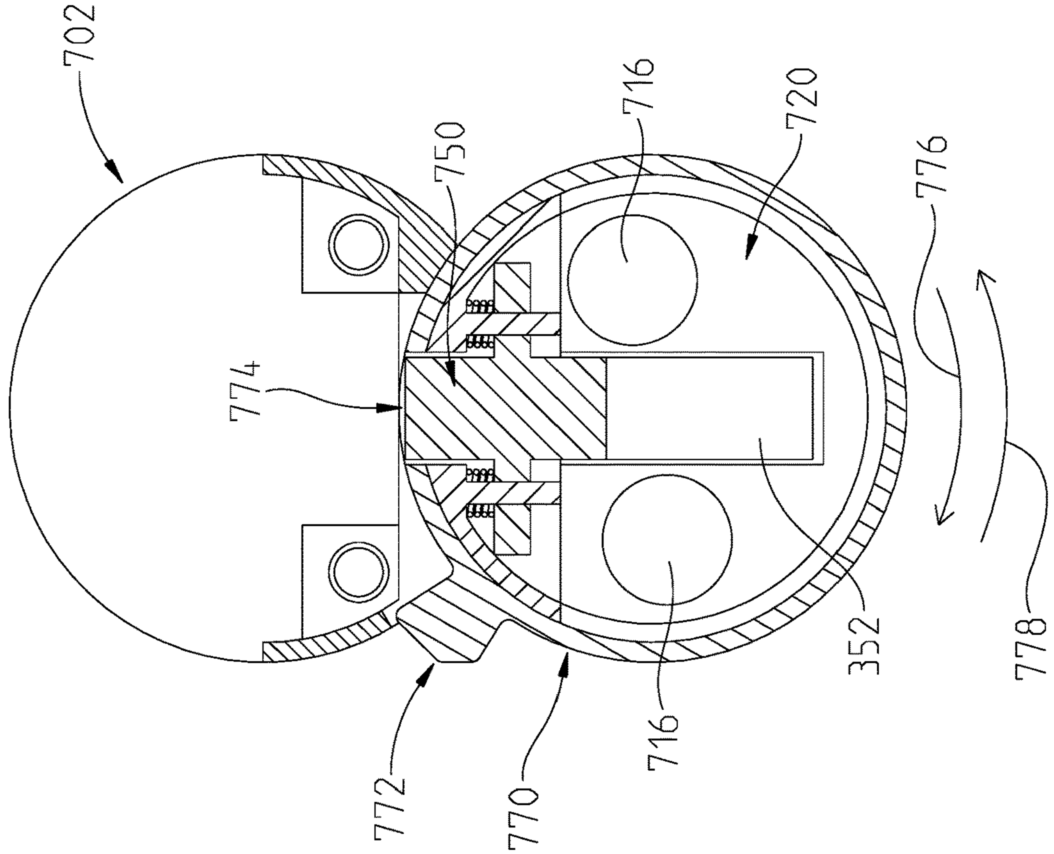
FIG. 39 illustrates a sectional view of the assembly of FIG. 36 along lines 39-39 in FIG. 38.

Referring to FIG. 25, core keeper 772 is coupled to control sleeve 770. A rotation of key 352 about moveable plug axis 760 results in a rotation of control sleeve 770 which in turn results in core keeper 772 being moved to within the envelope of lock core body 702. With core keeper 772 positioned within the envelope of lock core body 702, interchangeable electro-mechanical lock core 700 may be removed from the housing in which it is positioned. FIG. 39 illustrates control element 750 received in opening 774 of control sleeve 770 prior to rotation about moveable core plug axis 760 in direction 776. FIG. 40 illustrates control element 750 received in opening 774 of control sleeve 770 and moveable plug 720, control sleeve 770, and core keeper 772 rotated about moveable core plug axis 760 in direction 776. In one embodiment, a biasing member, such as a torsion spring, is operatively coupled to control sleeve 770 and lock body 702 to bias core keeper 772 to a position extending outside of envelope of lock core body 702.

Figure 41:
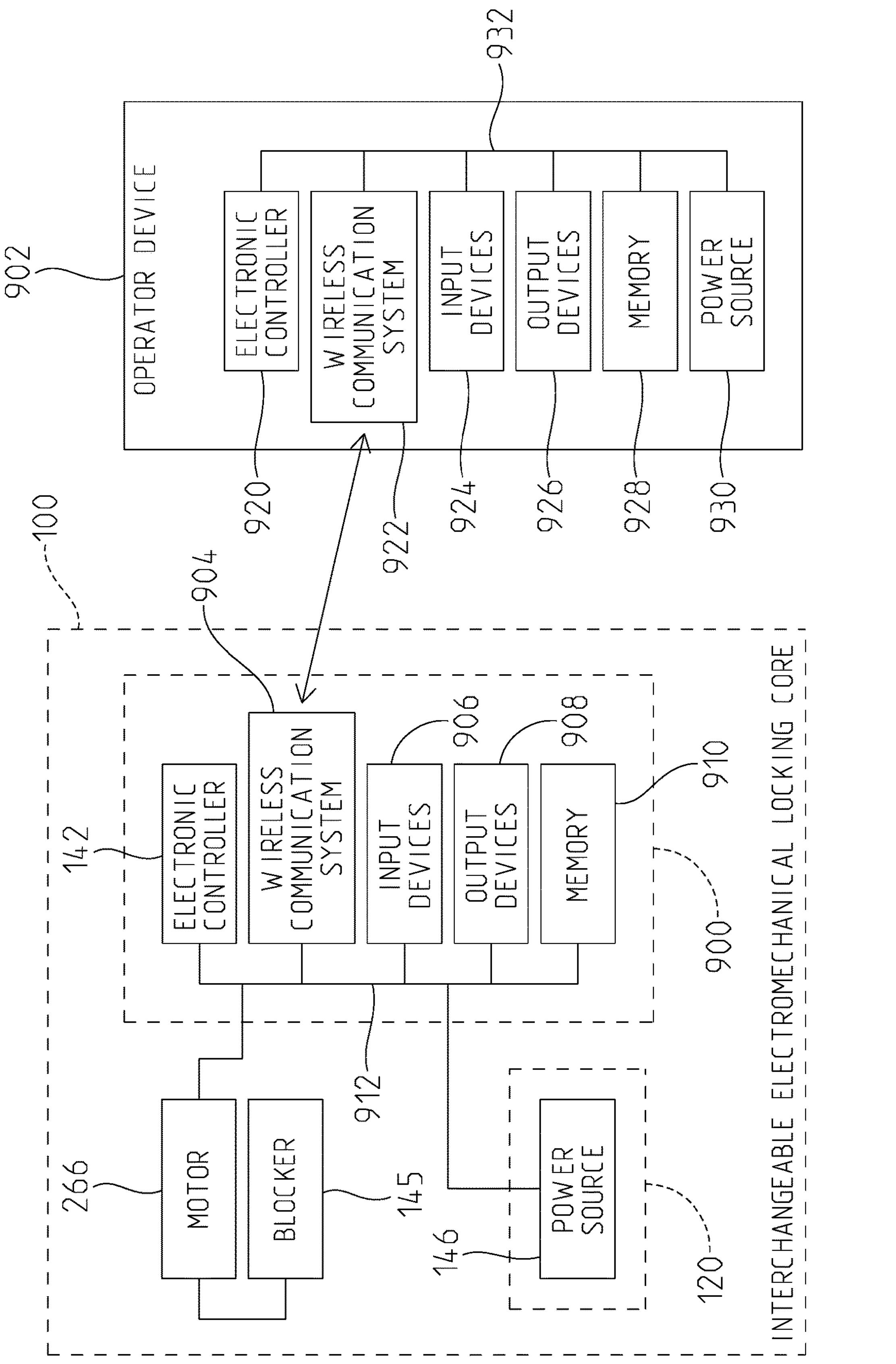
FIG. 41 illustrates a representative view of an exemplary electro-mechanical locking core and an operator device.
Figure 42:
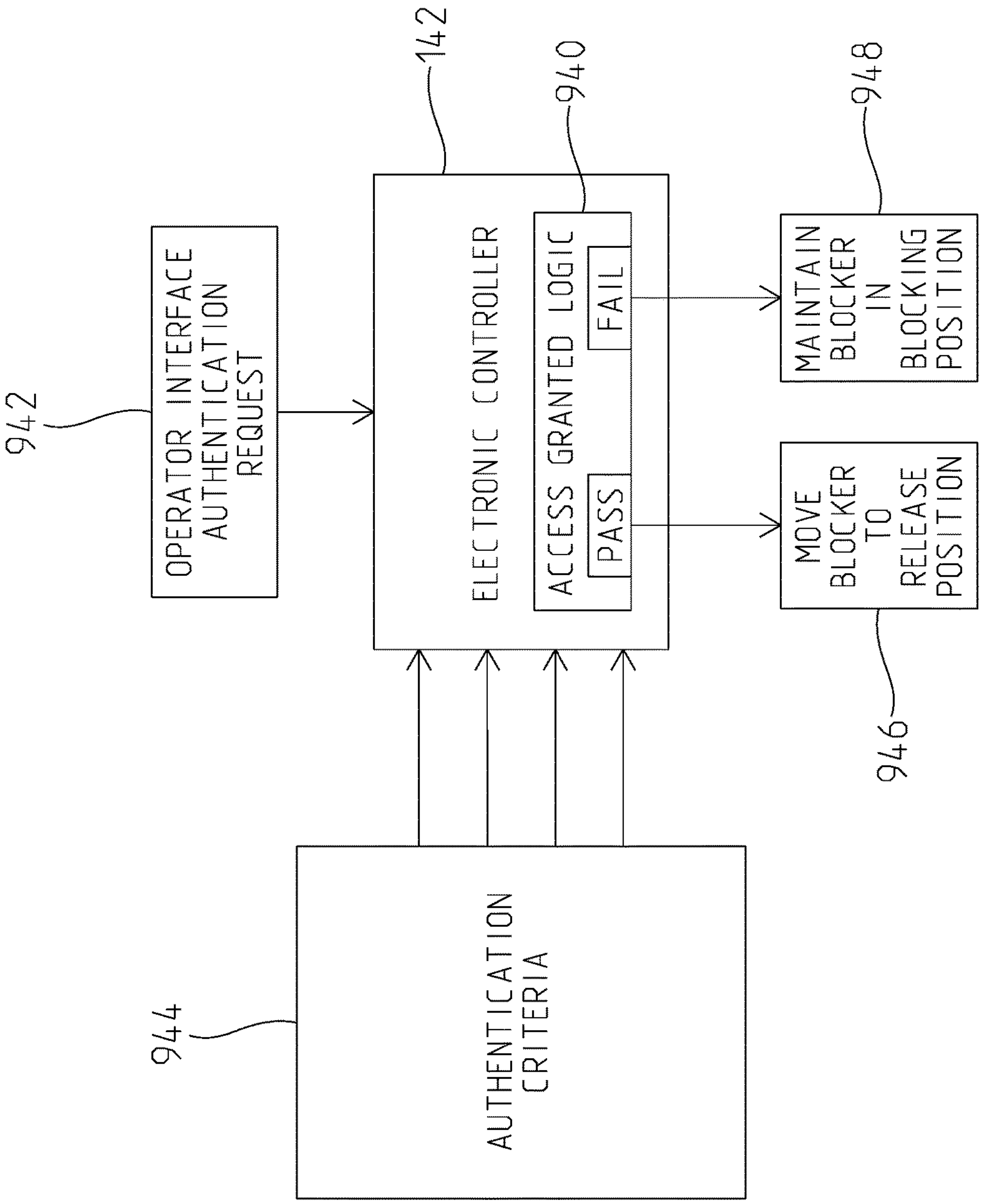
FIG. 42 illustrates a representative view of a control sequence of the electro-mechanical locking core.

Referring to FIGS. 41 and 42, an exemplary representation of electrical assembly 900 of interchangeable electro-mechanical lock core 100 and the representative embodiments of interchangeable electro-mechanical lock core 200 and interchangeable electro-mechanical lock core 700 is shown. An operator device 902 for use with interchangeable electro-mechanical lock core 100 is also shown. Electrical assembly 900 includes electronic controller 142, a wireless communication system 904, one or more input devices 906, one or more output devices 908, and a memory 910 all electrically interconnected through circuitry 912. In the illustrated embodiment, electronic controller 142 is microprocessor-based and memory 910 is a non-transitory computer readable medium which includes processing instructions stored therein that are executable by the microprocessor of electronic controller 142 to control operation of electro-mechanical lock core 100 including positioning blocker 140 in one of a blocking position (see FIG. 7 for blocker 260) and a release position (see FIG. 8 for blocker 260). Exemplary non-transitory computer-readable mediums include random access memory (RAM), read-only memory (ROM), erasable programmable read-only memory (e.g., EPROM, EEPROM, or Flash memory), or any other tangible medium capable of storing information.

Motor 266 is operatively coupled to electronic controller 142 and circuitry 912. Circuitry 912 includes circuitry on one or more circuit boards and components. In the example illustrated in FIG. 41, power source 146 which is positioned within operator actuation assembly 120 of electro-mechanical lock core 100 is shown. As mentioned herein, a power source 144 may be positioned in core assembly interchangeable electro-mechanical lock core 100. Advantages, among others, for incorporating power source 146 in operator actuation assembly 120 is the ease of replacement of power source 146 and the ability to incorporate a battery as the power source with an increased capacity compared to the space constraints of an interior of interchangeable electro-mechanical lock core 100.

Wireless communication system 904 includes a transceiver and other circuitry needed to receive and send communication signals to other wireless devices, such as an operator device 902. In one embodiment, wireless communication system 904 includes a radio frequency antenna and communicates with other wireless devices over a wireless radio frequency network, such as a BLUETOOTH network or a WIFI network. In one embodiment, wireless communication system 904 includes a near field antenna and communicates with other wireless devices over a near field communication network. In one embodiment, wireless communication system 904 includes both a BLUETOOTH network capability and a near field communication network capability.

In one embodiment, electro-mechanical lock core 100 communicates with operator device 902 without the need to communicate with other electro-mechanical lock cores 100. Thus, electro-mechanical lock core 100 does not need to maintain an existing connection with other electro-mechanical locking cores 100 to operate. One advantage, among others, is that electro-mechanical lock core 100 does not need to maintain network communications with other electro-mechanical lock cores 100 thereby increasing the life of power source 146. In one embodiment, electro-mechanical lock core 100 does maintain communication with other electro-mechanical locking cores 100 and is part of a network of electro-mechanical locking cores 100. Exemplary networks include a local area network and a mesh network. Additional details regarding exemplary networked systems are included in the disclosure of U.S. Provisional Patent Application Ser. No. 62/410,186, filed Oct. 19, 2016, titled ELECTRO-MECHANICAL CORE APPARATUS, SYSTEM, AND METHODS OF OPERATING AN ELECTRO-MECHANICAL CORE APPARATUS, the entire disclosure of which is expressly incorporated by reference herein.

Exemplary input devices 906 include buttons, switches, levers, a touch display, keys, and other operator actuatable devices which may be actuated by an operator to provide an input to electronic controller 142. Once communication has been established with operator device 902, various input devices 924 of operator device 902 may be actuated by an operator to provide an input to electronic controller 142. In one embodiment, electro-mechanical lock core 100 requires an actuation of an input device 906 of electro-mechanical lock core 100 prior to taking action based on communications from operator device 902. In another embodiment, elector-mechanical lock core 100 periodically scans for operator devices 902 without requiring an actuation of an input device 906 of electro-mechanical lock core 100 prior to taking action. An advantage, among others, for requiring an actuation of an input device 906 of electro-mechanical lock core 100 prior to taking action based on communications from operator device 902 is that electro-mechanical lock core 100 does not need to evaluate every wireless device that comes into proximity with electro-mechanical lock core 100. Rather, electro-mechanical lock core 100 may use the actuation of input devices 906 to start listening for communications from operator device 902. As explained in more detail herein, in one embodiment, operator actuation assembly 120 functions as an input device 906. As discussed herein, operator actuation assembly 120 may be rotated or translated to wake-up electronic controller 142. Further, operator actuation assembly 120 may be configured to capacitively sense an operator tap on operator actuation assembly 120 or in close proximity to operator actuation assembly 120, ultrasonically sense an operator device in close proximity to operator actuation assembly 120, or inductively sense an operator device in close proximity to operator actuation assembly 120.

Exemplary output devices 908 include visual output devices, audio output device, and/or tactile output devices. Exemplary visual output devices include lights, segmented displays, touch displays, and other suitable devices for providing a visual cue or message to an operator of operator device 902. Exemplary audio output devices include speakers, buzzers, bells and other suitable devices for providing an audio cue or message to an operator of operator device 902. Exemplary tactile output devices include vibration devices and other suitable devices for providing a tactile cue to an operator of operator device 902. In one embodiment, electro-mechanical lock core 100 sends one or more output signals from wireless communication system 904 to operator device 902 for display on operator device 902.

Operator device 902 is carried by an operator, Exemplary operator devices 902 include cellular phones, tablets, personal computing devices, watches, badges, and other suitable devices associated with an operator that are capable of communicating with electro-mechanical lock core 100 over a wireless network. Exemplary cellular phones, include the IPHONE brand cellular phone sold by Apple Inc., located at 1 Infinite Loop, Cupertino, CA 95014 and the GALAXY brand cellular phone sold by Samsung Electronics Co., Ltd.

Operator device 902 includes an electronic controller 920, a wireless communication system 922, one or more input devices 924, one or more output devices 926, a memory 928, and a power source 930 all electrically interconnected through circuitry 932. In one embodiment, electronic controller 920 is microprocessor-based and memory 928 is a non-transitory computer readable medium which includes processing instructions stored therein that are executable by the microprocessor of operator device 902 to control operation of operator device 902 including communicating with electro-mechanical lock core 100. Exemplary non-transitory computer-readable mediums include random access memory (RAM), read-only memory (ROM), erasable programmable read-only memory (e.g., EPROM, EEPROM, or Flash memory), or any other tangible medium capable of storing information.

Referring to FIG. 42, electronic controller 142 executes an access granted logic 940 which controls the position of blocker 140 in either a blocking position (see FIG. 7 for blocker 260) and a release position (see FIG. 8 for blocker 260). Access granted logic 940 may be stored on memory 910 for execution by electronic controller 142.

Electronic controller 142 receives an operator interface authentication request, as represented by block 942. In one embodiment, operator interface authentication request 942 is a message received over the wireless network from operator device 902. In one embodiment, operator interface authentication request 942 is an actuation of one or more of input devices 906. As explained in more detail herein, in one embodiment, operator actuation assembly 120 functions as an input device 906. Operator actuation assembly 120 may be rotated or translated to signal an operator interface authentication request or may capacitively sense an operator tap on operator actuation assembly 120 or in close proximity to operator actuation assembly 120 as an operator interface authentication request 942, ultrasoncially sense an operator device in close proximity to operator actuation assembly 120, or inductively sense an operator device in close proximity to operator actuation assembly 120.

Electronic controller 142 further receives authentication criteria 944 which relate to the identity and/or access level of the operator of operator device 902. In one embodiment, the authentication criteria 944 is received from operator device 902 or communicated between electronic controller 142 and operator device 902.

Access granted logic 940 based on operator interface authentication request 942 and authentication criteria 944 determines whether the operator of operator device 902 is granted access to actuate moveable core plug 106 which in turn actuates lock device interface 112. If the operator of operator device 902 is granted access to actuate moveable core plug 106, access granted logic 940 powers motor 266 to move blocker 140 to the release position, as represented by block 946. If the operator of operator device 902 is denied access to actuate moveable core plug 106, access granted logic 940 maintains blocker 140 in the blocking position, as represented by block 948.

Figure 43:
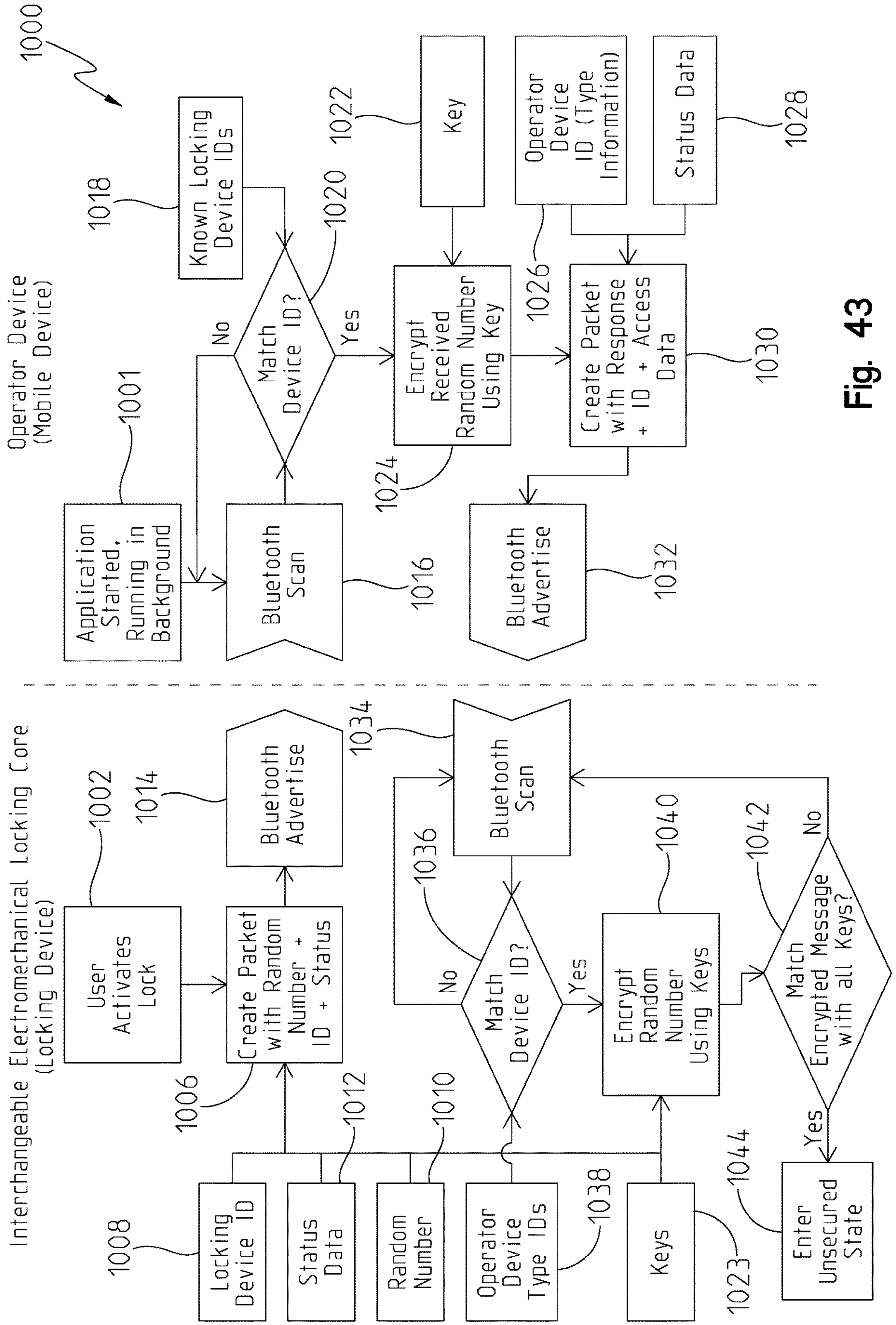
FIG. 43 illustrates an exemplary processing sequence of the interchangeable electro-mechanical locking core and an operator device.

Referring to FIG. 43, an exemplary embodiment 1000 of access granted logic 940 is illustrated. Embodiment 1000 utilizes BLUETOOTH advertising packets or datagrams being sent from both interchangeable electro-mechanical lock core 100 and operator device 902. When an operator approaches interchangeable electro-mechanical lock core 100, the operator would press a button or otherwise signal to interchangeable electro-mechanical lock core 100 their intent to actuate lock device 110 which corresponds to an operator interface authentication request 942 (see FIG. 42). After the operator provides the operator interface authentication request 942, interchangeable electro-mechanical lock core 100 will enter a BLUETOOTH advertising state broadcasting a packet of data containing identification information about interchangeable electro-mechanical lock core 100 (name, serial number, model) and a random challenge token (random number of about 64 or 128 bits in length). Operator device 902 will be in BLUETOOTH scan mode listening for BLUETOOTH advertising broadcast data. Upon receiving a broadcast BLUETOOTH advertising packet or datagram, operator device 902 checks to see if the received broadcast BLUETOOTH advertising packet came from a locking device matching the model and serial number of a locking device the operator is authorized to access. If interchangeable electro-mechanical lock core 100 is one the operator of operator device 902 is permitted to access, then the operator will have been previously provided an encryption key for storage on operator device 902 which matches a key stored in memory 910 of interchangeable electro-mechanical lock core 100. Using this encryption key, operator device 902 will encrypt the random number (challenge token) and begin to broadcast that encrypted data (response token) utilizing BLUETOOTH advertising packets. Upon receiving a BLUETOOTH advertising packet with a correctly encrypted random number interchangeable electro-mechanical lock core 100 will enter an unsecured state. An exemplary unsecure state is moving blocker 140 to the release position. This is an exemplary description of a basic method of how interchangeable electro-mechanical lock core 100 and operator device 902 may interact. By adding additional data, data packets and/or process steps more advanced functions can be achieved using the basic method of exchanging encrypted data via BLUETOOTH advertising packets.

An advantage, among others, of using an encrypted challenge/response authentication system via BLUETOOTH advertising packets is that user authentication can be realized quickly. BLUETOOTH advertising packets allow interchangeable electro-mechanical lock core 100 and operator device 902 to exchange data without manual intervention and without pairing interchangeable electro-mechanical lock core 100 and operator device 902. Quick authentication is necessary to provide an acceptable user experience. BLUETOOTH advertising is based on specifications maintained by the Bluetooth Special Interest Group (Bluetooth SIG).

Referring to FIG. 43, embodiment 1000 of access granted logic 940 is illustrated. An operator activates interchangeable electro-mechanical lock core 100, as represented by block 1002. This activation corresponds to operator interface authentication request 942. Further, the operator has an access application running on operator device 902, as represented by block 1001.

Figure 44:
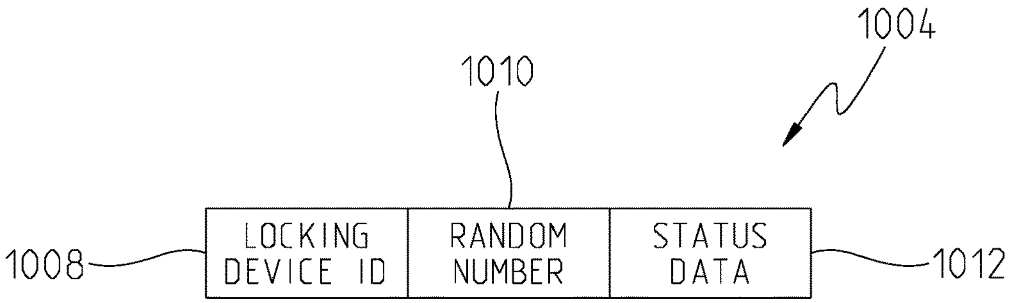
FIG. 44 illustrates an exemplary packet broadcast by the interchangeable electro-mechanical locking core during the processing sequence of FIG. 43.

Interchangeable electro-mechanical lock core 100 generates a packet 1004 (see FIG. 44) to broadcast, as represented by block 1006. In the illustrated embodiment, the packet includes an identifier 1008 associated with interchangeable electro-mechanical lock core 100, a challenge token, illustratively a random number 1010, and status information 1012. Exemplary status information includes the present state of the hardware and software of interchangeable electro-mechanical lock core 100. In the illustrated embodiment, packet 1004 is a BLUETOOTH advertising datagram, but other packet formats may be implemented.

In the illustrated embodiment, packet 1004 is broadcast by wireless communication system 904 of interchangeable electro-mechanical lock core 100 as part of a BLUETOOTH advertising datagram, as represented by block 1014. BLUETOOTH advertising datagrams are broadcast and receivable by devices, such as interchangeable electro-mechanical lock core 100 and operator device 902, without first establishing a persistent connection between interchangeable electro-mechanical lock core 100 and operator device 902. In one example, packet 1004 is broadcast as plain text.

The application running on operator device 902 is actively scanning for BLUETOOTH advertising datagrams, as represented by block 1016. Once the packet 1004 broadcast by interchangeable electro-mechanical lock core 100 in block 1014 is received by operator device 902, the application on operator device 902 compares the identifier 1008 included in packet 1004 to a list of identifiers 1018 that operator device 902 is configured to recognize, as represented by block 1020. If identifier 1008 is not in the list of identifiers 1018, the application on operator device 902 returns to block 1016 to scan for further packets.

Figure 46:
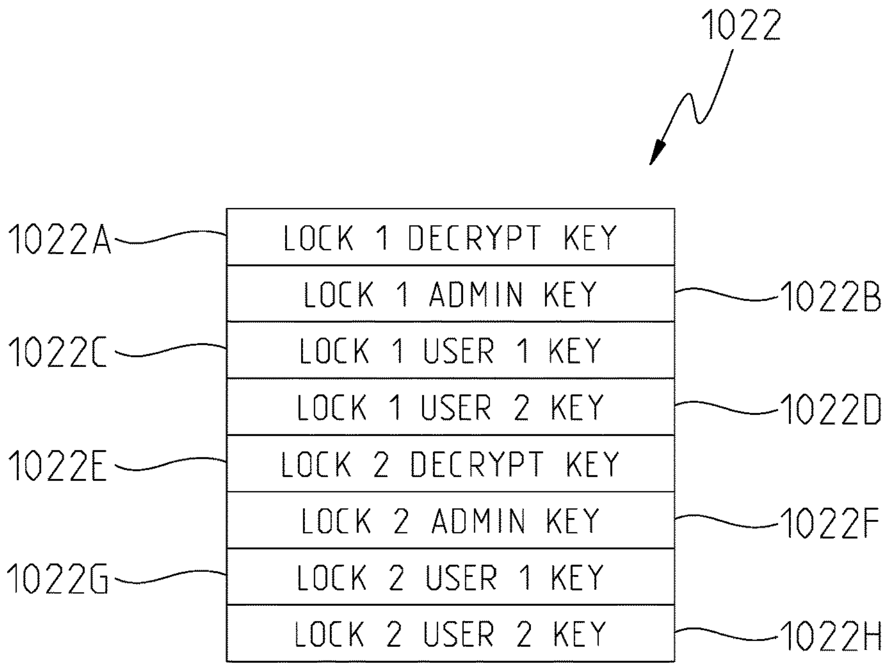
FIG. 46 illustrates exemplary keys stored on the operator device for use during the processing sequence of FIG. 43.

If identifier 1008 is in the list of identifiers, the application on operator device 902 encrypts the received random number 1010 with a key 1022 stored on operator device 902, as represented by block 1024. Key 1022 is also stored on interchangeable electro-mechanical lock core 100. In one example, key 1022 is specific to operator device 902 or the operator associated with operator device 902. In one embodiment, multiple keys 1022 for multiple interchangeable electro-mechanical lock cores 100 may be stored on operator device 902 in a local database or stored remotely in a database accessible by operator device 902. Exemplary keys 1022A-H are illustrated in FIG. 46. In one embodiment, the encryption process in block 1024 is performed by a remote computing resource accessible by operator device 902 and the keys 1022 are stored remotely on a memory accessible by the remote computing resource. An advantage, among others, is increased security because the application running on operator device 902 will have no knowledge of the keys 1022 needed to operate interchangeable electro-mechanical lock core 100.

Figure 45:
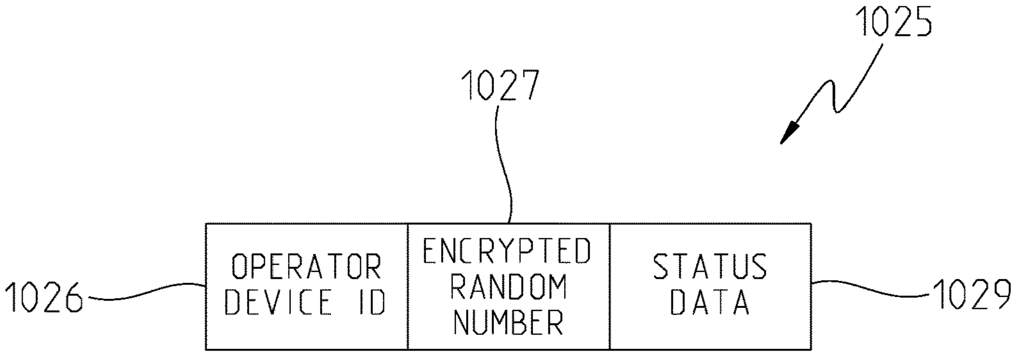
FIG. 45 illustrates an exemplary packet broadcast by the operator device during the processing sequence of FIG. 43.

Operator device 902 generates a packet 1025 (see FIG. 45) to broadcast, as represented by block 1030. In the illustrated embodiment, packet 1025 includes an identifier 1026 associated with operator device 902, a challenge token response, illustratively the encrypted version of the random number 1027 generated in block 1024, and status information 1028. Exemplary status information includes commands, status information and/or handshaking control. In the illustrated embodiment, packet 1025 is a BLUETOOTH advertising datagram, but other packet formats may be implemented.

In the illustrated embodiment, packet 1025 is broadcast by wireless communication system 922 of operator device 902 as part of a BLUETOOTH advertising datagram, as represented by block 1032. The advertisement process on operator device 902 will continue until terminated by the user, by a response from interchangeable electro-mechanical lock core 100 and/or a timeout from the unlocking application on operator device 902.

When interchangeable electro-mechanical lock core 100 sent packet 1004 in block 1014, interchangeable electro-mechanical lock core 100 began scanning for BLUETOOTH advertising datagrams, as represented by block 1034. These advertising and scanning processes of interchangeable electro-mechanical lock core 100 will continue until a valid response is received; a timeout has been reached, or some other hardware/software event has occurred. In one example, the operator must continue to actuate operator actuatable assembly 120 or another input device 906 until packet 1025 is validated by interchangeable electro-mechanical lock core 100. The validation of packet 1025 may be communicated to the operator by output devices 908 of interchangeable electro-mechanical lock core 100 or the application 1001 running on operator device 902.

When packet 1025 is received by interchangeable electro-mechanical lock core 100, the operator device identifier 1026 is compared to a listing of operator device identifiers 1038 stored on memory 910 of interchangeable electro-mechanical lock core 100. The received operator device identifier may be specific to a single unlocking application running on a single operator device 902 or a family, class or general version of an unlocking application. Interchangeable electro-mechanical lock core 100 determines if identifier 1026 matches one of operator device identifiers 1038, as represented by block 1036. If not, interchangeable electro-mechanical lock core 100 continues to scan for BLUETOOTH advertising packets. If a match exists, interchangeable electro-mechanical lock core 100 encrypts the random number 1010 most recently broadcast by interchangeable electro-mechanical lock core 100 with the keys 1023 stored on or available to interchangeable electro-mechanical lock core 100, as represented by block 1040.

Each of the encrypted versions of random number 1010 are compared with the received encrypted random number 1027, as represented by block 1042. If no match is found, interchangeable electro-mechanical lock core 100 continues to scan for BLUETOOTH advertising packets. If a match is found, interchangeable electro-mechanical lock core 100 enters an unsecured state, as represented by block 1044. In one embodiment, prior to entering the unsecure state, the electronic controller determines if this is an inaugural attempt to use the electronic credentials to actuate the lock device, and if so, the electronic controller sends instructions to the operator device 902 to launch instructional information on a display of the operator device 902. The instructional information may include instructions on the proper use of the interchangeable lock core. In addition, at any time that the electronic controller detects improper use of the interchangeable lock core, the electronic controller may broadcast instructions to all operator devices in the proximity of the interchangeable lock core to display information on the display of the operator device. Exemplary improper use includes repeating depressing of the operator actuatable input device or continued force on operator actuatable input device prior to the blocker moving to the release position.

In one embodiment, the type of unsecured state is based on the permissions associated with the matched key 1023. For example, a key 1 of keys 1023 may be an administrative key, a key 2 of keys 1023 may be a super user key, and a key 3 of keys 1023 may be a user key. Upon receiving a datagram encrypted using key 1, interchangeable electro-mechanical lock core 100 may enter into a state allowing Generic Attribute Profile ("GATT") services to be enabled and allowing the user full access to change firmware, delete users etc. on interchangeable electro-mechanical lock core 100. In one example, for key 1, interchangeable electro-mechanical lock core 100 and operator device 902 establish a secure paired connection. If the datagram interchangeable electro-mechanical lock core 100 received was encrypted with key 2, interchangeable electro-mechanical lock core 100 may enter into a state with limited GATT services enabled and be allowed to add a temporary user or restrict access temporarily. If the datagram interchangeable electro-mechanical lock core 100 received was encrypted with key 3, interchangeable electro-mechanical lock core 100 may keep the GATT interface off and only enter the state where the locking device is allowed to be mechanically actuated. For example, in response to key 3, electronic controller 142 of interchangeable electro-mechanical lock core 100 causes motor 266 to move blocker 140 from the blocking position (see FIG. 7 for blocker 260) to the release position (see FIG. 8 for blocker 260). Additionally, packet 1025 may include operational codes (E.g. Opcode 0x01=operate unlock, Opcode 0x02=core removal, Opcode 0x03=request enable GATT server, etc. . . . ).

When interchangeable electro-mechanical lock core 100 enters an unsecured state, interchangeable electro-mechanical lock core 100 may terminate communication with operator device 902, continue advertising waiting for a change in the status registers, or wait for some other user interaction to signal the intent to return to a secured state of interchangeable electro-mechanical lock core 100. Additionally, this exchange can be utilized to provide service such as checking battery level of interchangeable electro-mechanical lock core 100 or retrieving logged data from interchangeable electro-mechanical lock core 100. The logged data may include information on operator device identifiers 1026 associated with successful matches and operator device identifiers 1026 associated with unsuccessful matches.

Figure 47A:
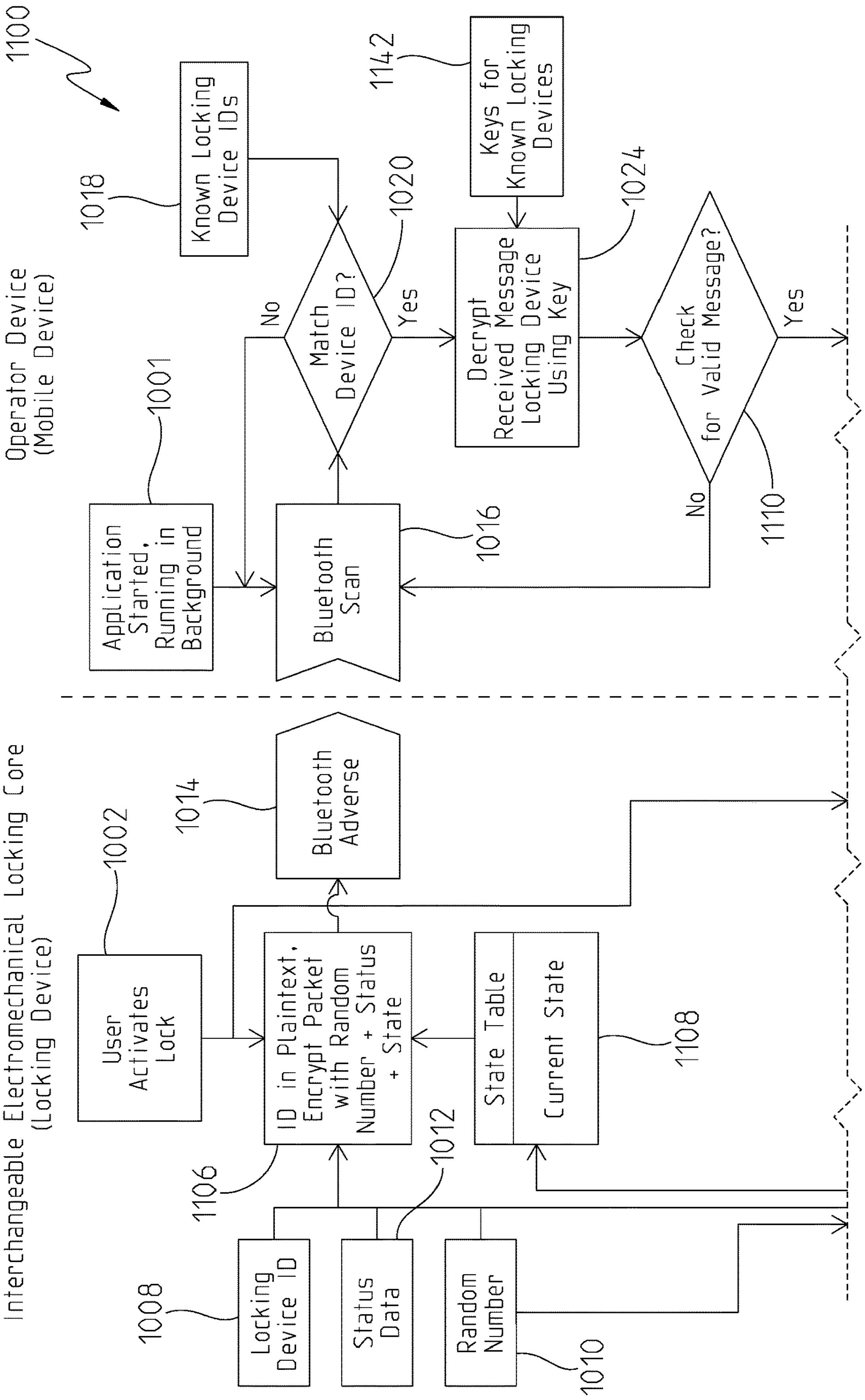
FIGS. 47A and 47B illustrate another exemplary processing sequence of the interchangeable electro-mechanical locking core and an operator device.
Figure 47B:
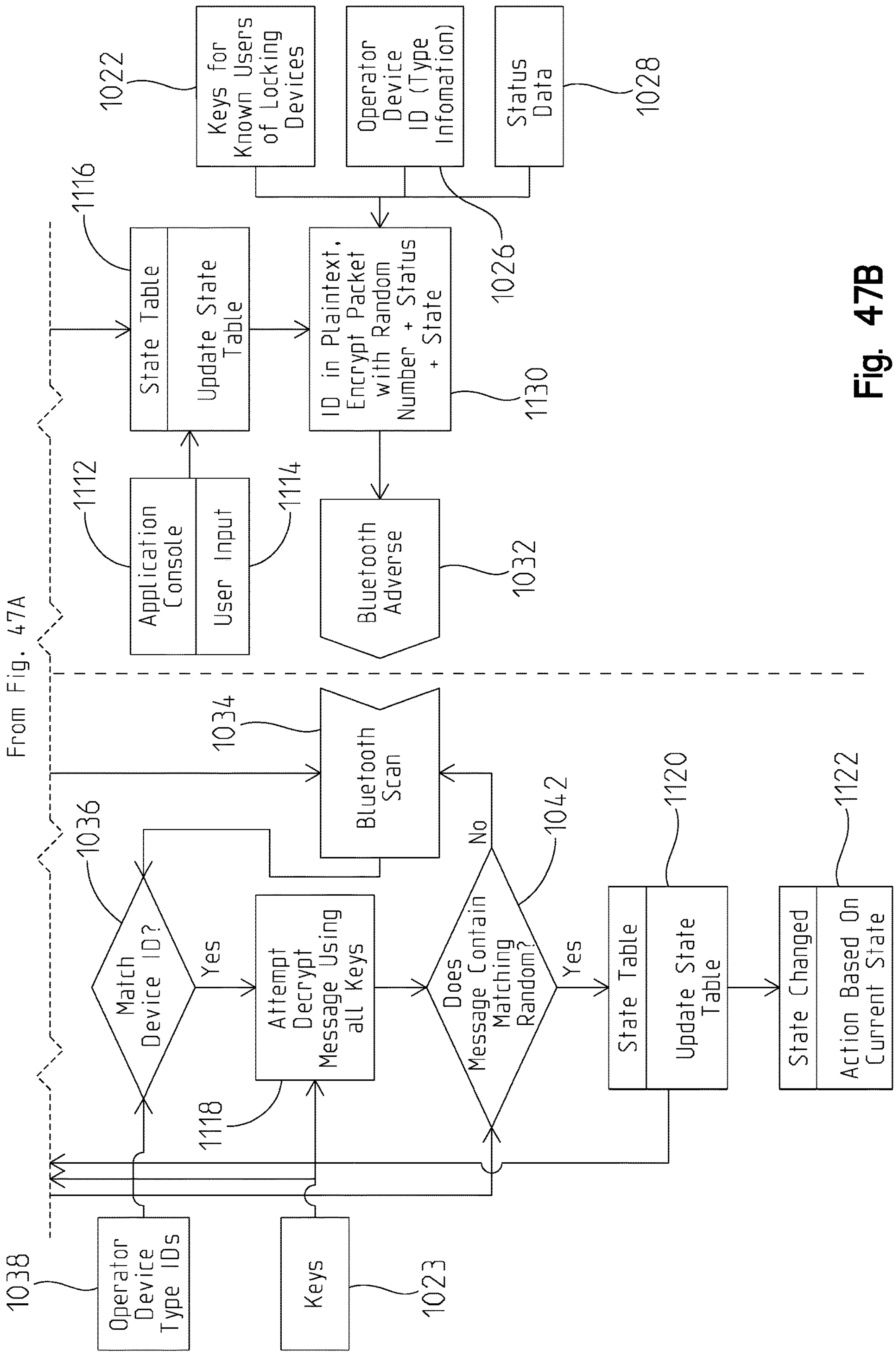

Referring to FIGS. 47A and 47B, another embodiment 1100 of access granted logic 940 is illustrated. Embodiment 1100 is largely the same as embodiment 1000 and thus common blocks are represented with the same reference numerals. Embodiment 1100 employs state machines in both the application 1001 running on operator device 902 and interchangeable electro-mechanical lock core 100 to, among other advantages, provide additional control using quick communications between interchangeable electro-mechanical lock core 100 and the application 1001 of operator device 902. The state machine would rely on continued communication between interchangeable electro-mechanical lock core 100 and operator device 902. Using a state machine allows for more involved exchanges of information and higher degrees control based on the numbers of states in each state table. A difference between the state based authentication of embodiment 1100 and the serial advertising based authentication of embodiment 1000 is that the process flow for the serial method would flow towards an endpoint whereas with the state method, the process flow can switch to multiple states deterministically reaching an endpoint only when warranted.

Figure 48:
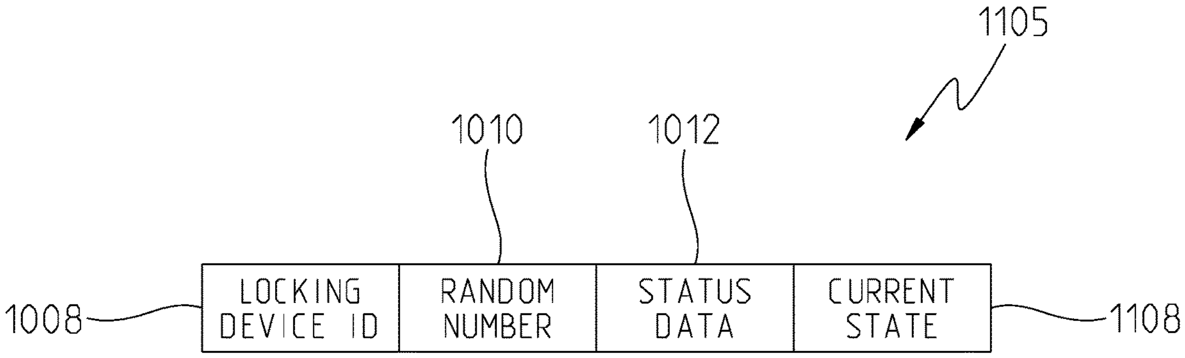
FIG. 48 illustrates an exemplary packet broadcast by the interchangeable electro-mechanical locking core during the processing sequence of FIGS. 47A and 47B.

Referring to FIG. 47A, in embodiment 1100, interchangeable electro-mechanical lock core 100 broadcasts a BLUETOOTH advertising packet 1105 (see FIG. 48), as represented by block 1014. In addition to identifier 1008, random number 1010, and status information 1012, packet 1105 includes a current state identifier 1108 of interchangeable electro-mechanical lock core 100. The identifier 1008 is included in packet 1105 as plain text while random number 1010, status information 1012, and current state identifier 1108 are encrypted with a key 1023 associated with interchangeable electro-mechanical lock core 100 and included in packet 1105, as represented by block 1106.

Operator device 902 receives packet 1105, as represented by block 1016 and determines if operator device 902 is associated with interchangeable electro-mechanical lock core 100, as represented by block 1020. If associated with interchangeable electro-mechanical lock core 100, application 1001 of operator device 902 decrypts the encrypted portions of packet 1105 with a key 1142 stored on or available to operator device 902 for interchangeable electro-mechanical lock core 100, as represented by block 1024. If the decrypted packet is a valid message, application 1001 continues to block 1116, otherwise, application 1001 returns to block 1016 to scan for additional packets.

Figure 49:
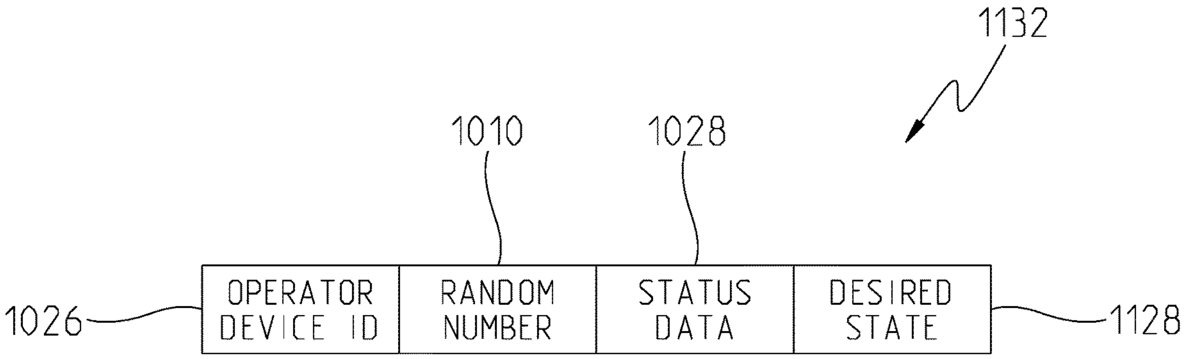
FIG. 49 illustrates an exemplary packet broadcast by the operator device during the processing sequence of FIGS. 47A and 47B.

The decrypted packet includes a current state of interchangeable electro-mechanical lock core 100. A user interface 1112 of application 1001 may display the current state of interchangeable electro-mechanical lock core 100 on a display of operator device 902. The operator may select a desired state 1128 for interchangeable electro-mechanical lock core 100 with application 1001, as represented by block 1114. The state table on operator device 902 is updated to the desired state 1128, as represented by block 1116. Operator device 902 broadcasts a BLUETOOTH advertising packet 1132 (see FIG. 49), as represented by block 1130. In addition to identifier 1026, random number 1010, and status information 1028, packet 1132 includes a desired state identifier 1128. The identifier 1026 is included in packet 1132 as plain text while random number 1010, status information 1028, and desired state 1128 are encrypted with a key 1022 associated with the operator of operator device 902 and included in packet 1132, as represented by block 1130.

Interchangeable electro-mechanical lock core 100 receives packet 1132, as represented by block 1034 and determines if operator device 902 is associated with interchangeable electro-mechanical lock core 100, as represented by block 1036. If associated with operator device 902, interchangeable electro-mechanical lock core 100 decrypts the encrypted portions of packet 1132 with the keys 1023 stored on or available to interchangeable electro-mechanical lock core 100 for the operator of operator device 902, as represented by block 1118. Interchangeable electro-mechanical lock core 100 determines if the decrypted packet includes a random number that matches the most recent random number broadcast by interchangeable electro-mechanical lock core 100, as represented by block 1042. If so, interchangeable electro-mechanical lock core 100 updates the state table of interchangeable electro-mechanical lock core 100 to include desired state 1128 as the current state 1108, as represented by block 1120. Based on the now current state of interchangeable electro-mechanical lock core 100, interchangeable electro-mechanical lock core 100 may alter the configuration of interchangeable electro-mechanical lock core 100. In one example, interchangeable electro-mechanical lock core 100 may move blocker 140 from the blocking position (see FIG. 7 for blocker 260) to the release position (see FIG. 8 for blocker 260). In another example, interchangeable electro-mechanical lock core 100 may instruct knob release controller 422 to release operator actuatable input device 212. In one embodiment, interchangeable electro-mechanical lock core 100 begins broadcasting a revised packet 1105 containing the now, current state of interchangeable electro-mechanical lock core 100.

Figure 50A:
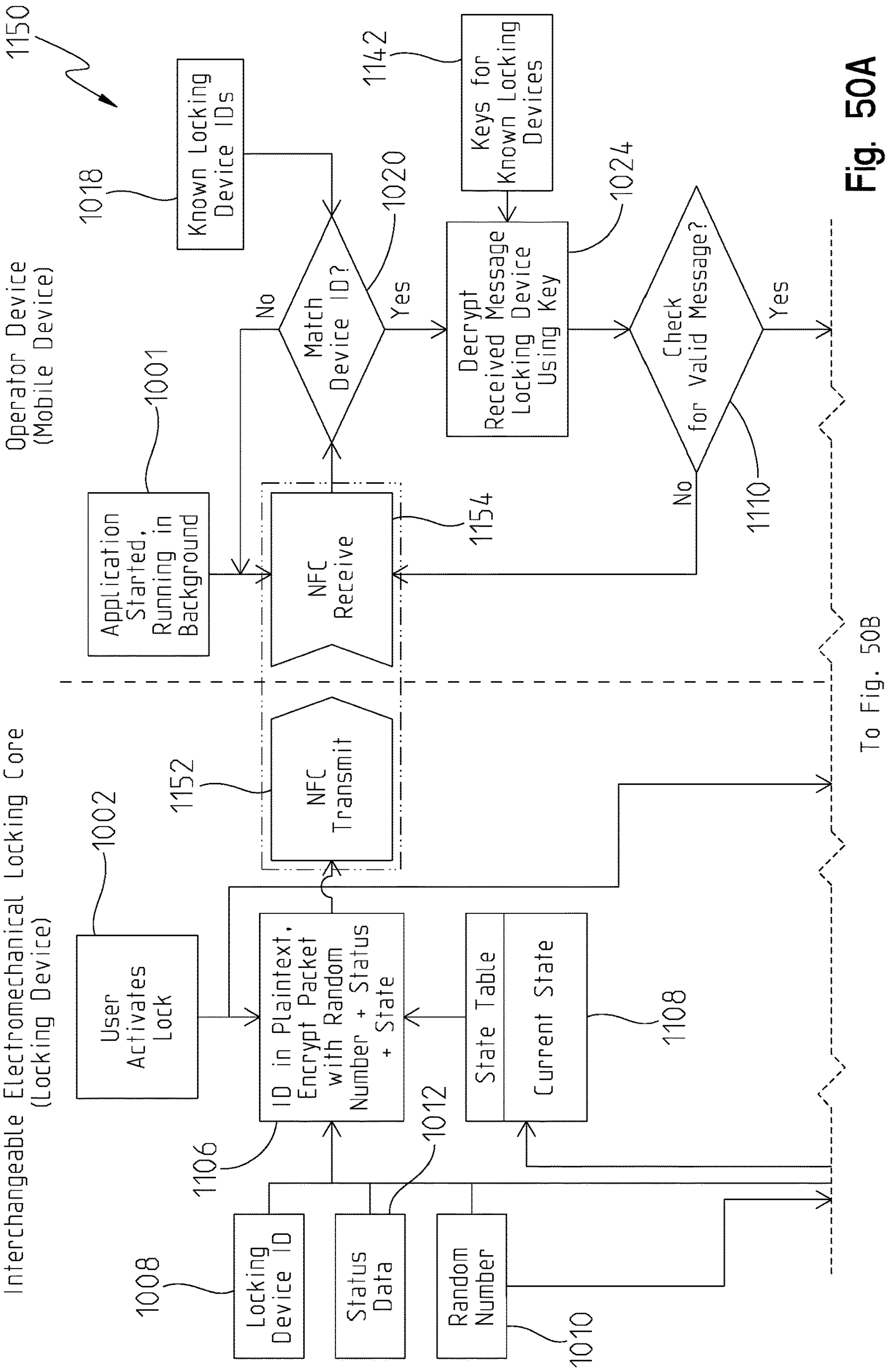
FIGS. 50A and 50B illustrate yet another exemplary processing sequence of the interchangeable electro-mechanical locking core and an operator device.
Figure 50B:
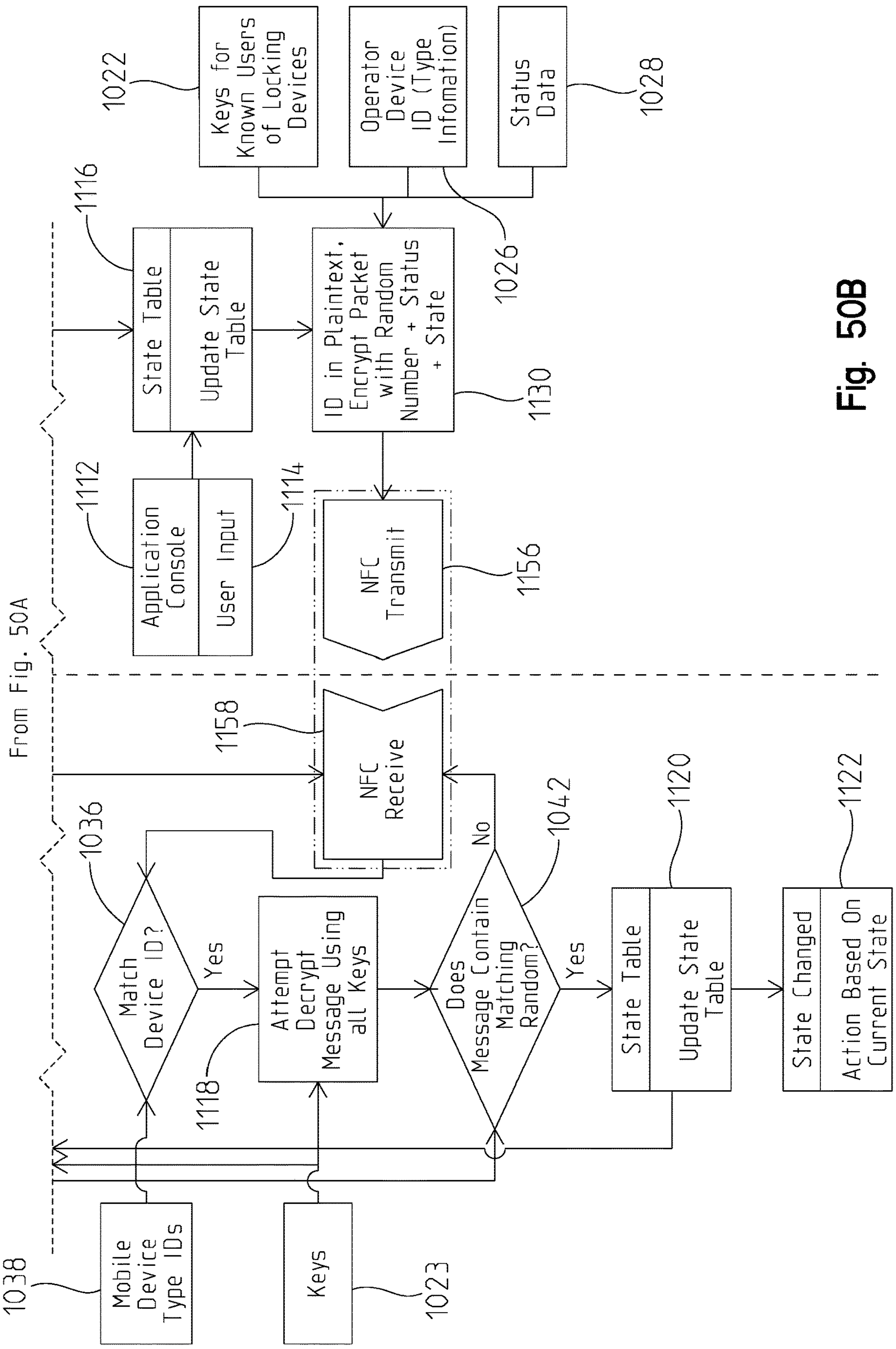

Referring to FIGS. 50A and 50B, embodiment 1100 is modified as embodiment 1150. Embodiment 1150 is identical to embodiment 1100, except that the wireless communication is through near field communication ("NFC"), not BLUETOOTH advertising packets. As such, interchangeable electro-mechanical lock core 100 sends packet 1105 over a near field communication protocol, as represented by block 1152, and operator device 902 receives packet 1105 over a near field communication protocol, as represented by block 1154. Similarly, operator device 902 sends packet 1132 over a near field communication protocol, as represented by block 1156, and interchangeable electro-mechanical lock core 100 receives packet 1132 over a near field communication protocol, as represented by block 1158.

In addition to transmitting the above-described packets, many NFC implementations support energy harvesting either inductively or through radio frequency ("RF") rectification. Inductive coupling is in widespread deployment in various types of operator devices 902, such as smart phones. To implement energy harvesting, operator device 902 will transmit excitation pulses to interchangeable electro-mechanical lock core 100 once the operator or application 1001 on operator device 902 indicates that the two devices, operator device 902 and interchangeable electro-mechanical lock core 100, are within close proximity. These excitation pulses will impart a charge onto an electrical energy storage device (e.g. capacitor or battery) within interchangeable electro-mechanical lock core 100. Once the charge has built to a sufficient level interchangeable electro-mechanical lock core 100 will indicate to operator device 902 that interchangeable electro-mechanical lock core 100 is ready to proceed with the communication steps outlined in the embodiments of access granted logic 940 disclosed herein. Operator device 902 will continue to periodically transmit excitation pulses to ensure that sufficient energy is provided to interchangeable electro-mechanical lock core 100 throughout the execution of access granted logic 940. Operator device 902 may be required to transmit additional or longer excitation pulses to ensure that sufficient energy is available to interchangeable electro-mechanical lock core 100. The need for additional or longer pulses may be communicated as part of status information 1012 from interchangeable electro-mechanical lock core 100 to operator device 902 or operator device 902 may use a secondary characteristic such as a received signal strength from interchangeable electro-mechanical lock core 100 to determine the appropriate excitation pulses.

Using energy harvesting it is possible to operate passive or small active electro-mechanical devices to perform the function of securing or actuating the positioning blocker 140 of interchangeable electro-mechanical lock core 100. An example of a passive locking mechanism would be to 'short circuit' a motor to impart a reaction torque or a shaft thus retarding motion. A passive system such as this would be a candidate to work with a system energized via energy harvesting. This is because to short circuit the motor a MOSFET could be utilized which will require extremely small amounts of energy to change and maintain an on or off state (short or open circuit). Similarly a small magnetic coil can be briefly activated using energy harvested and stored in a capacitor. The amount of energy available for this actuator will depend on the size of the capacitor and the quantity of excitation energy transferred to the locking device.

By using energy harvested by the NFC device a battery, capacitor and/or combination of both of interchangeable electro-mechanical lock core 100 can be charged with the stored energy be used to actuate an electro-mechanical system, such as blocker 260 and motor 266. The charge controller can communicate with operator device 902 (device providing RF coupled energy to the NFC locking device) state of charge and request higher rates of charge as needed. Likewise this battery charge information could be used to alert the operator of operator device 902 to keep the devices connected for a time period to allow charging of the battery.

Additionally, a second channel of communication (for example BLUETOOTH) could be employed that uses energy harvested from the near field communication system to provide the electrical energy necessary for operation.

Figure 51:
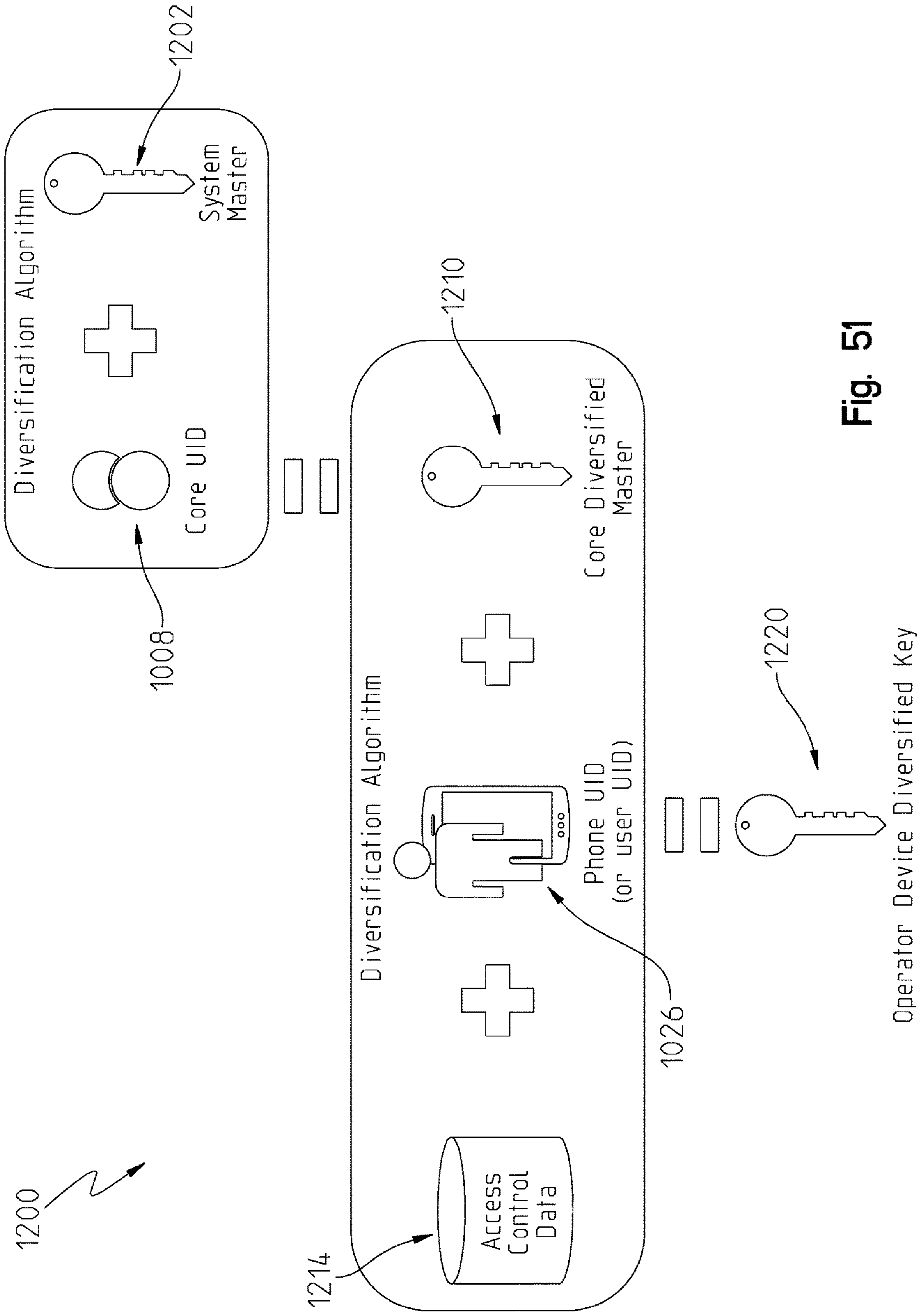
FIG. 51 illustrates an exemplary key diversification system for use with the interchangeable electro-mechanical locking core and the operator device.

In one embodiment a diversified key system 1200 (see FIG. 51) is implemented for use with access granted logic 940. In the diversified key system 1200, all keys in a given system originate from a system master key 1202. An exemplary system master key 1202 is a randomly generated 128 bit AES key, but system master key 1202 could be any symmetric encryption key. From system master key 1202, a unique core diversified master key 1210 can be generated for every individual interchangeable electro-mechanical lock core 100 in the system based on the system master key 1202 and the identifier 1008 of interchangeable electro-mechanical lock core 100. An exemplary process for generating the diversified keys is described in section 2.2 of NXP application note AN10922 included in the disclosure of U.S. Provisional Patent Application Ser. No. 62/410,186, filed Oct. 19, 2016, titled ELECTRO-MECHANICAL CORE APPARATUS, SYSTEM, AND METHODS OF OPERATING AN ELECTRO-MECHANICAL CORE APPARATUS, the entire disclosure of which is expressly incorporated by reference herein. At this first level of diversification, a unique system master key 1202 for a particular system and a unique core diversified master key 1210 for each individual interchangeable electro-mechanical lock core 100 within that system are provided. An advantage, among others, is that compromising the unique core diversified master key 1210 of a single interchangeable electro-mechanical lock core 100 does not compromise the keys for the other interchangeable electro-mechanical lock cores 100 or the system master key 1202.

Each operator or operator device 902 will have a unique identifier associated therewith, such as identifier 1026. Each operator device 902 will store a small database or table of interchangeable electro-mechanical lock cores 100 that the operator device 902 has access to. Each entry in this database contains the identifier 1008 of said interchangeable electro-mechanical lock core 100. Each database entry also contains an operator device diversified key 1220 which is unique to that particular operator device 902 for the particular interchangeable electro-mechanical lock core 100. No two keys in the database on the operator device 902 are alike. The operator device diversified keys 1220 stored on operator device 902 are generated centrally in the system software. The keys may be generated by the process described in section 2.2 of AN10922 using the specific unique core diversified master key 1210 for the specific interchangeable electro-mechanical lock core 100 (stored only on interchangeable electro-mechanical lock core 100, not operator device 902), the identifier 1026 of operator device 902, and the associated access rights 1214 of operator device 902 to interchangeable electro-mechanical lock core 100 (e.g. Monday-Friday from 8 am to 5 pm).

At this second level of diversification, a unique system master key 1202 for a particular system, a unique core diversified master key 1210 for each individual interchangeable electro-mechanical lock core 100, and a unique operator device diversified key 1220 for each interchangeable electro-mechanical lock core 100 that the operator device 902 has access to are provided. An advantage, among others, is that compromising the keys 1220 stored on operator device 902 does not compromise the system master key 1202 or the unique core diversified master key 1210 for each individual interchangeable electro-mechanical lock core 100 stored on the respective interchangeable electro-mechanical lock core 100.

Because the associated access rights 1214 of a particular operator device 902 to an individual interchangeable electro-mechanical lock core 100 are used as an input to the key diversification algorithm to generate operator device diversified key 1220 these associated access rights 1214 cannot be modified locally at the operator device 902 without invalidating operator device diversified key 1220 resulting in an access denied event at an interchangeable electro-mechanical lock core 100. An advantage, among others, is that an operator cannot maliciously modify their access rights to interchangeable electro-mechanical lock core 100 in order to gain additional access. A change in associated access rights 1214 requires a new operator device diversified key 1220 to be generated and requires unique core diversified master key 1210 to generate the new key.

In addition to the diversified key system 1200 described herein, a "key index" can be added to each of the diversified keys as an input to the diversification algorithm. This key index could be as simple as an enumeration (0, 1, 2 . . . ) or a randomly generated number of some length. This indexed list of keys would be stored on interchangeable electro-mechanical lock core 100 so at the time a core is setup in the system it would have a list of potentially hundreds of keys it could use. Any time this key index is incremented or changed the keys associated downstream would be required to be updated. This would allow a system to roll keys on a schedule or on demand.

Figure 52A:
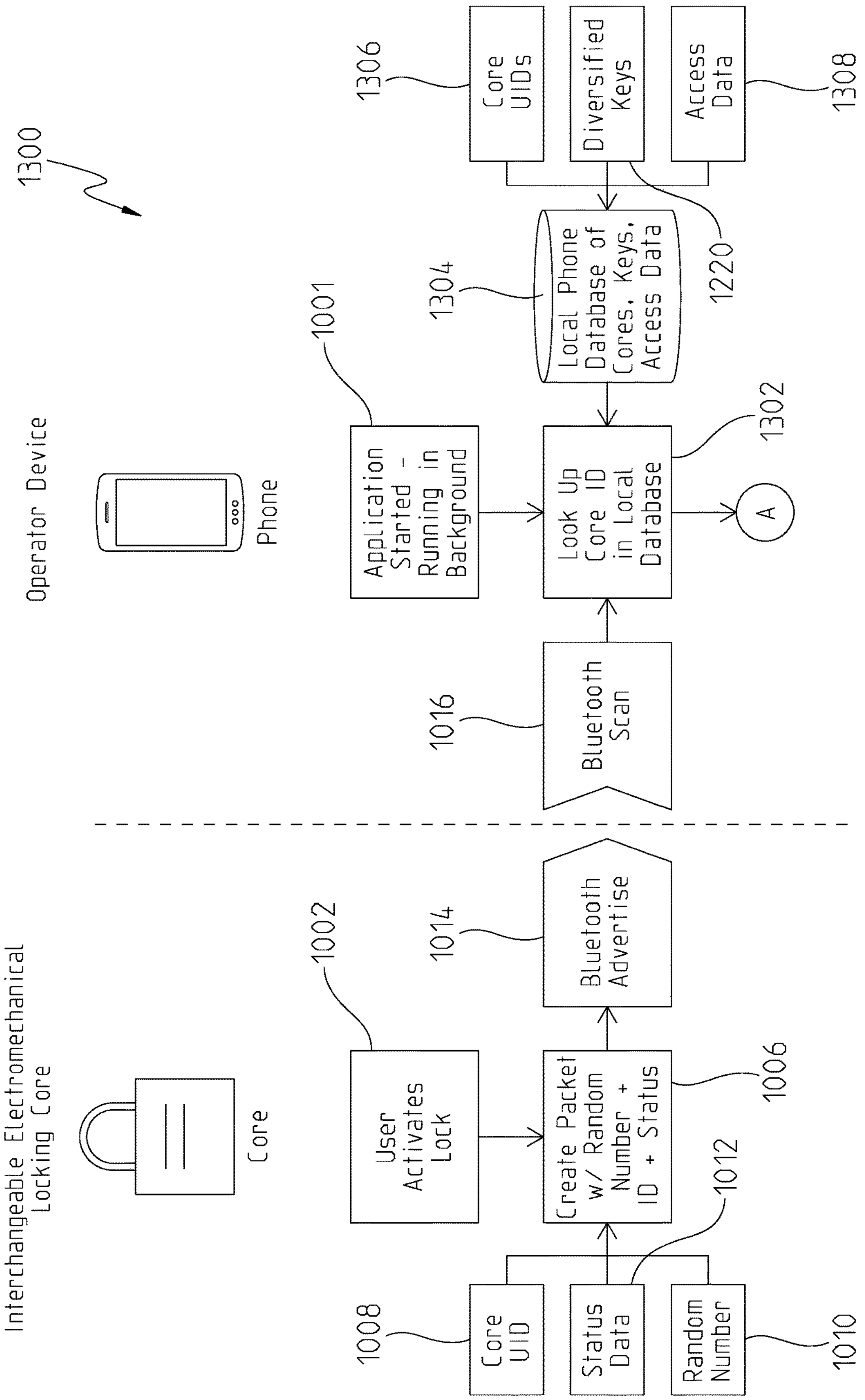
FIGS. 52A-52C illustrate still another exemplary processing sequence of the interchangeable electro-mechanical locking core and an operator device.
Figure 52B:
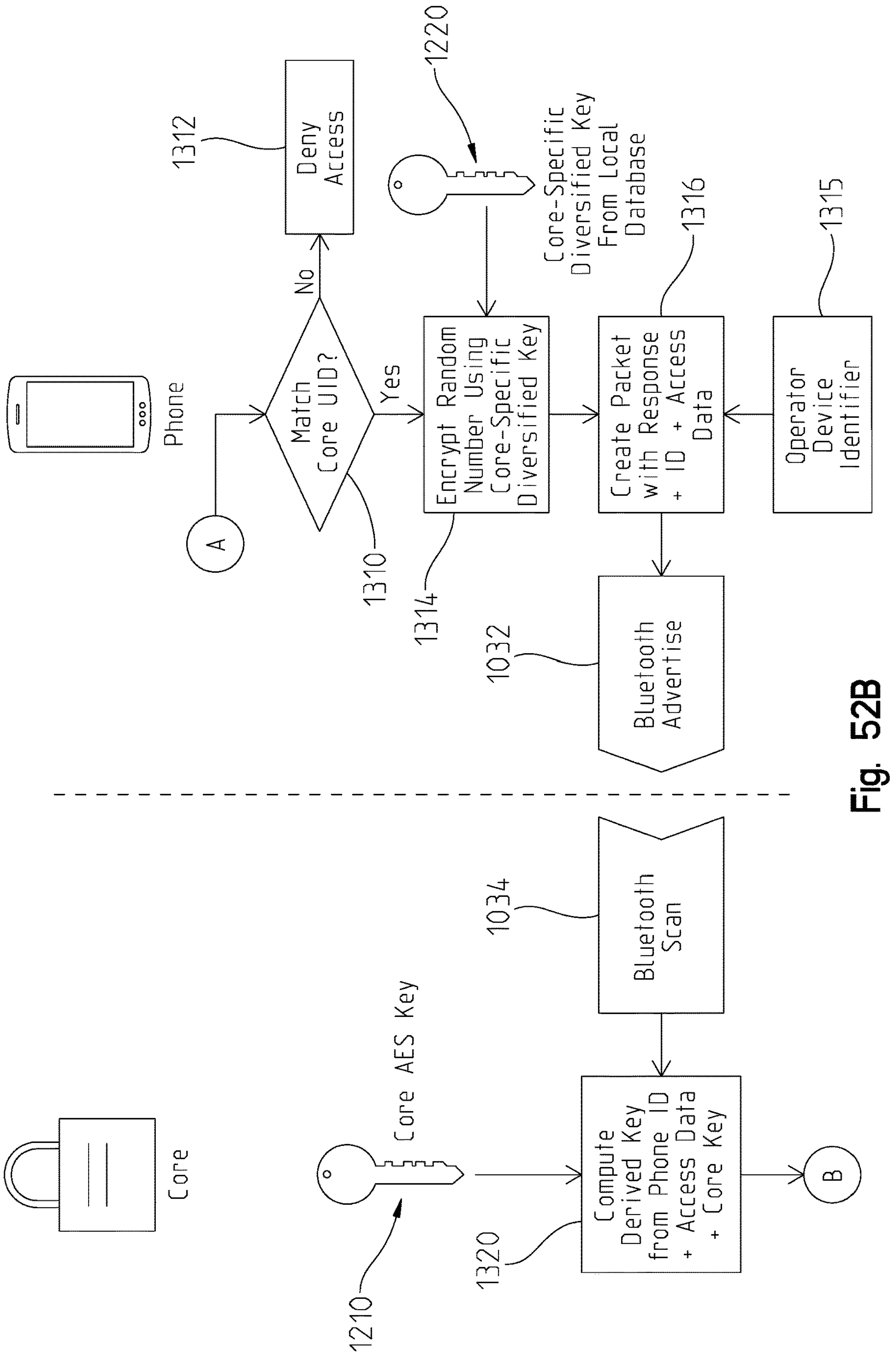
Figure 52C:
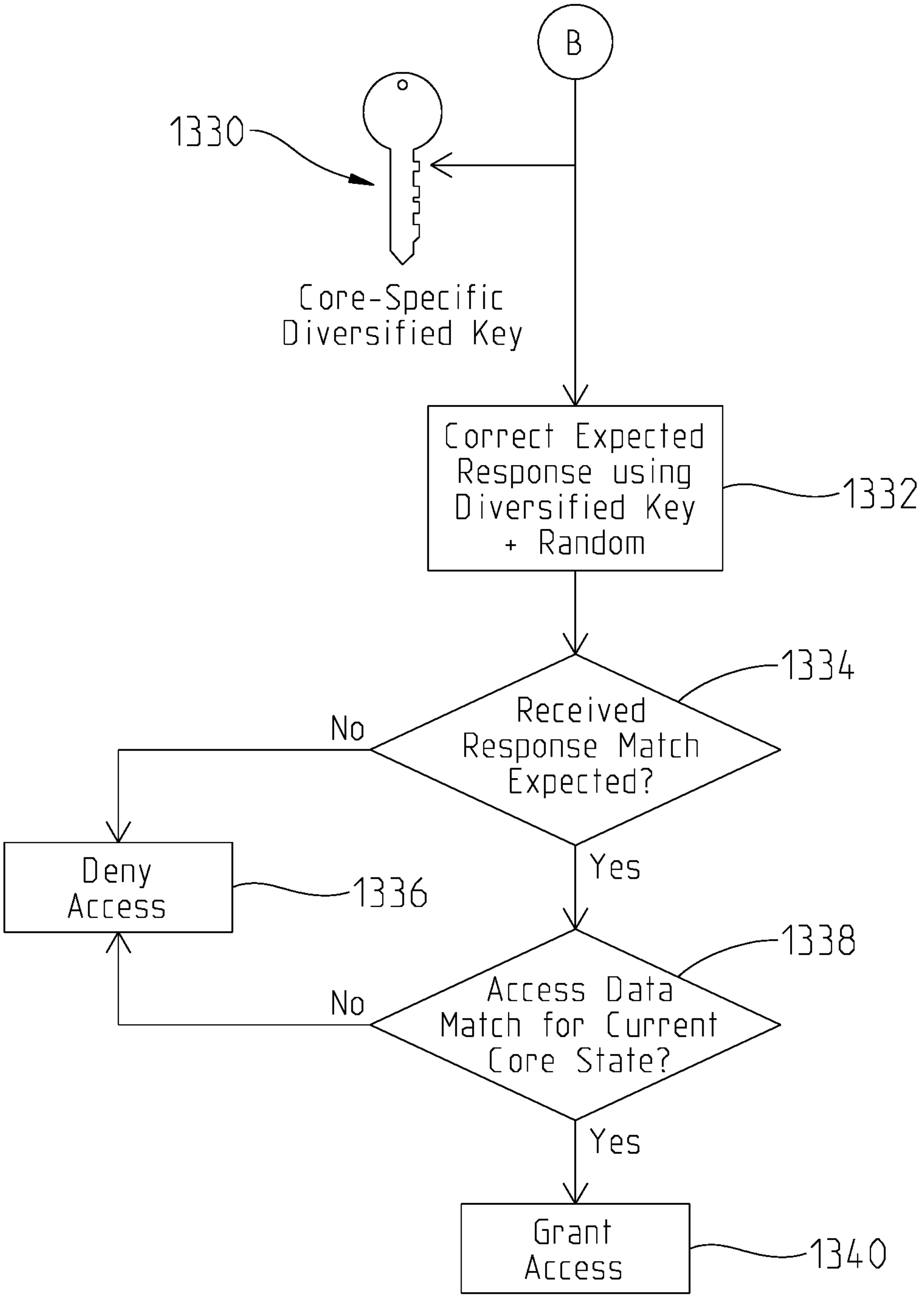

Referring to FIGS. 52A-52C, an embodiment 1300 of access granted logic 940 using the keys generated by diversified key system 1200 is illustrated. Embodiment 1300 utilizes BLUETOOTH advertising packets like embodiment 1000, but may implement other forms of wireless communication. Both embodiment 1300 and embodiment 1000 generate the same packet 1004 which is broadcast as part of a BLUETOOTH advertising packet, as represented by block 1014. Operator device 902 receives packet 1004 and looks up the received identifier 1008 in a local database 1304, as represented by block 1302. Local database 1304 contains records, each record including core identifiers 1302 that operator device 902 has access to, the access data 1308 of operator device 902 for the respective core, and the diversified keys 1220 for the respective core.

Operator device 902 determines if the received identifier 1008 has a match in local database 1304, as represented by block 1310. If not, access to interchangeable electro-mechanical lock core 100 is denied, as represented by block 1312. If found, operator device 902 encrypts the received random number 1010 with the operator device diversified key 1220 in local database 1304 corresponding to the matched interchangeable electro-mechanical lock core 100, as represented by block 1314. Operator device 902 then generates a response packet including the encrypted random number, the operator device identifier 1315 for operator device 902 (used to generate operator device diversified key 1220), and the access data 1308 operator device 902 has for interchangeable electro-mechanical lock core 100 stored in local database 1304 (used to generate operator device diversified key 1220). The response packet is sent to interchangeable electro-mechanical lock core 100, as represented by blocks 1032 and 1034.

Interchangeable electro-mechanical lock core 100 determines a local copy of operator device diversified key 1220, denoted as key 1330 in FIG. 57C, from the received operator device identifier 1315, the received access data 1308, and the locally stored unique core diversified master key 1210, as represented by block 1320. Next, interchangeable electro-mechanical lock core 100 uses key 1330 and random number 1010 to determine an expected encrypted version of random number 1010, as represented by block 1332. The received encrypted version of random number 1010 from operator device 902 is compared to the expected encrypted version of random number 1010 generated in block 1332, as represented by block 1334. If the two do not match, access to interchangeable electro-mechanical lock core 100 is denied, as represented by block 1336. If the two match, interchangeable electro-mechanical lock core 100 compares the received access data 1308 to the current core state, as represented by block 1338. In one example, the access data states access is allowed Monday through Friday from 9:00 AM to 5:00 PM. If the current time of electronic controller 142 of interchangeable electro-mechanical lock core 100 is in that window, access is granted, as represented by block 1340, otherwise access is denied, as represented by block 1336.

Figure 53:
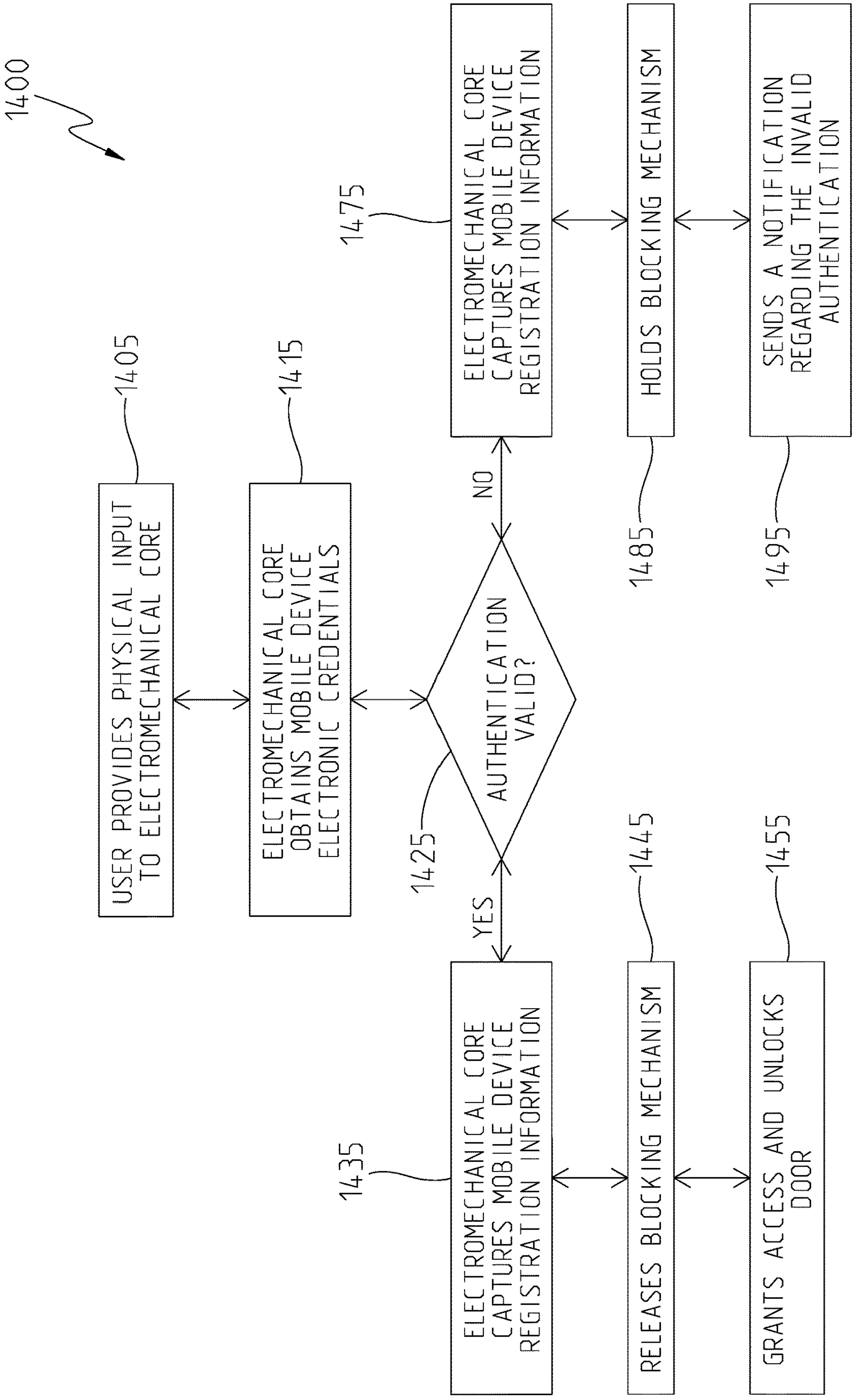
FIG. 53 illustrates an method of use of the interchangeable electro-mechanical locking core.

Referring to FIG. 53, a flowchart 1400 of one embodiment of a method for accessing an interchangeable electro-mechanical lock core 100 is provided. The operator may approach an interchangeable electro-mechanical lock core 100 at a predetermined proximity (e.g. NFC or BLE range) and provide a physical input, such as pressing or rotating a knob to activate interchangeable electro-mechanical lock core 100, as represented by block 1405. Interchangeable electro-mechanical lock core 100 scans for and obtains electronic credentials associated with the operator's mobile device, such as operator device 902, as represented by block 1415. Interchangeable electro-mechanical lock core 100 compares the obtained electronic credentials against authorized credentials, as represented by block 1425. If the credentials are authenticated, interchangeable electro-mechanical lock core 100 captures the mobile device registration information, such as mobile device id, as represented by block 1435; releases the blocking mechanism, as represented by block 1445; and grants the operator access and unlocks the door, as represented by block 1455. If the credentials are not authenticated, interchangeable electro-mechanical lock core 100 captures the mobile device registration information, such as mobile device id, as represented by block 1475; holds the blocking mechanism in position, as represented by block 1485; and sends a notification regarding the invalid authentication, as represented by block 1495. The notification can be include transmitting the mobile device information, date and time stamp, triggering an alarm, or contacting an authorized mobile device or system.

Figure 54:
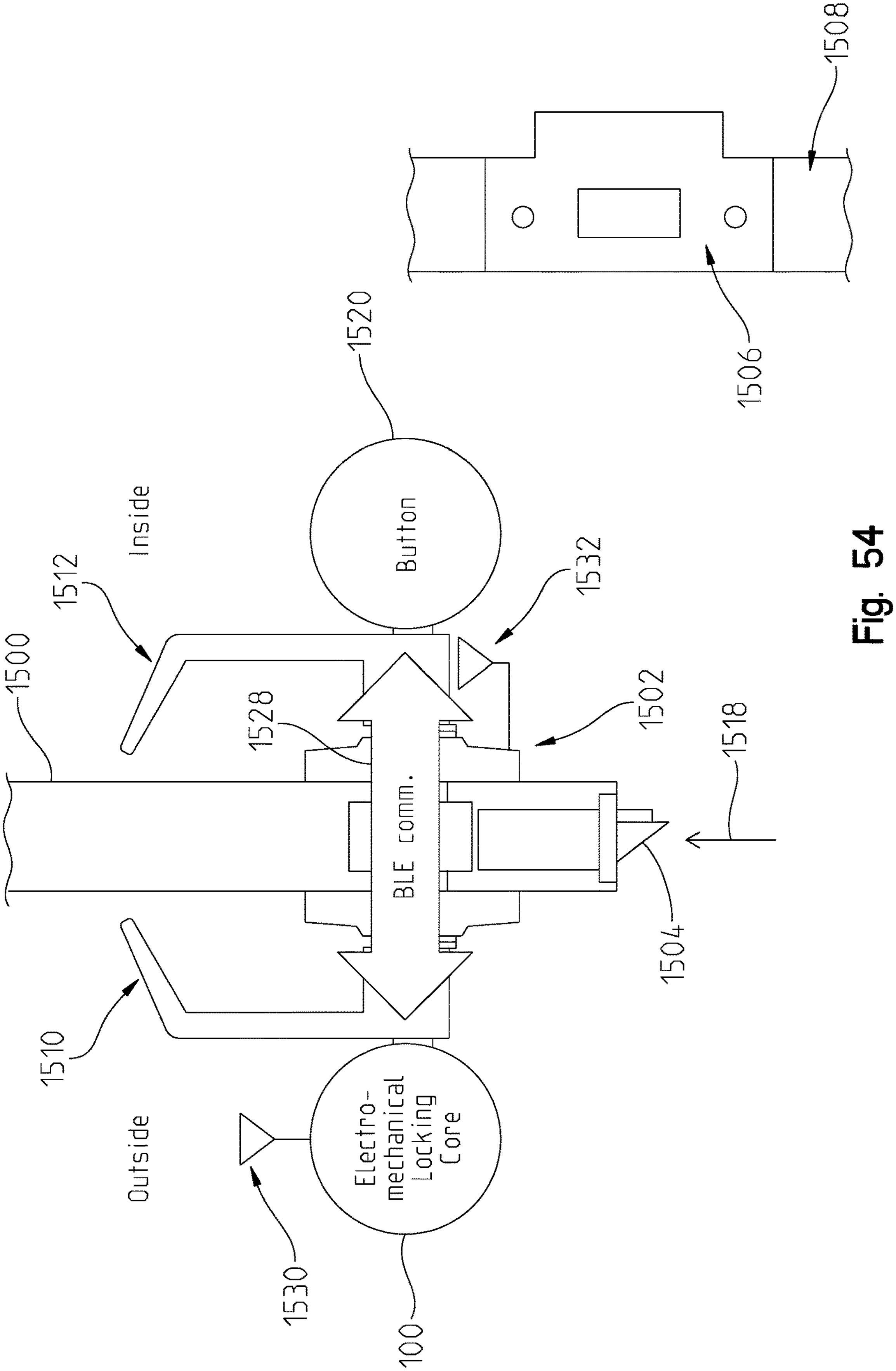
FIG. 54 illustrates and exemplary privacy system incorporating the interchangeable electro-mechanical locking core.

Referring to FIG. 54, a door 1500 is illustrated having a door lock system 1502 supported by the door 1500. Door lock system 1502 includes a latchbolt 1504 which cooperates with a strike 1506 supported by a door frame 1508 to hold the door 1500 relative to the door frame 1508. Door lock system 1502 further includes an exterior operator actuatable device 1510 and an interior operator actuatable device 1512, both of which are illustratively handles. As is known in the art, either exterior operator actuatable device 1510 or interior operator actuatable device 1512 may be rotated relative to door 1500 to retract latchbolt 1504 in direction 1518 to remove latchbolt 1504 from strike 1506. Further, as is known in the art, door lock system 1502 includes a locking device 110 which when in a locked state prevents the retraction of latchbolt 1504 in direction 1518 and in an unlocked state permits the retraction of latchbolt 1504 in direction 1518.

Exterior operator actuatable device 1510 of locking device 1502 includes interchangeable electro-mechanical lock core 100. Interior operator actuatable device 1512 of locking device 1502 includes a privacy button 1520 which is part of a privacy unit 1550 (see FIG. 55). Privacy button 1520 may alternatively be mounted on door 1500, door frame 1508, or other location on an interior side of door 1500. Privacy button 1520 may be actuated to indicate a desire that locking device 1502 should remain in the locked state.

Figure 55:
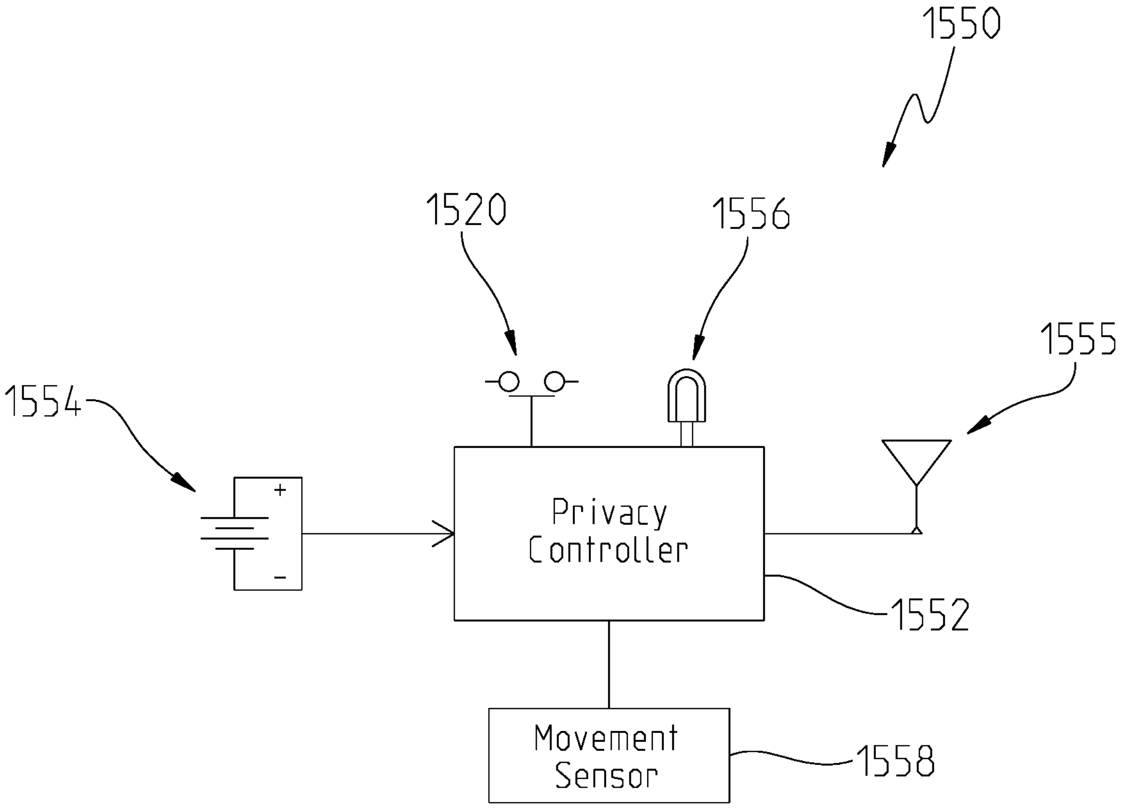
FIG. 55 illustrates an exemplary privacy unit of the privacy system of FIG. 54.

Referring to FIG. 55, privacy unit 1550 includes a privacy controller 1552 which includes logic, privacy button 1520, a battery 1554, an antenna 1555, a visual indicator device 1556, and a movement sensor 1558. Battery 1554 powers privacy controller 1552, visual indicator device 1556, and antenna 1555. Visual indicator device 1556 provides an indication to an occupant of the room associated with door 1500 of the state of privacy button 1520, activated privacy state when the privacy button has been actuated or deactivated privacy state when the privacy button has not been actuated or has been deactuated, such as by pressing the button a second time. Antenna 1555 communicates wireless signals to interchangeable electro-mechanical lock core 100 regarding the state of privacy button 1520 (activated privacy state or deactivated privacy state). Movement sensor 1558 monitors a movement of interior operator actuatable device 1512. If interior operator actuatable device 1512 detects a rotation of interior operator actuatable device 1512, it is assumed that the occupant has exited the room associated with door 1500 and thus, an activated privacy state should be cancelled. Exemplary movement sensors 1558 include vibration sensors, tilt sensors, and accelerometers.

Electronic controller 142 of interchangeable electro-mechanical lock core 100 controls the position of blocker 140 as described herein including with respect to interchangeable electro-mechanical lock core 200 and interchangeable electro-mechanical lock core 700. In one embodiment, electronic controller 142 moves blocker 140 to a release position in response to both (a) a received at least one wireless input signal from an operator device 902 indicating an authorized operator and (b) an indication that privacy button 1520 has not been actuated. In one example, interchangeable electro-mechanical lock core 100 receives a wireless signal 1528 from privacy controller 1552 associated with privacy button 1520 providing an indication that privacy button 1520 has been actuated. This is an indication that would prevent interchangeable electro-mechanical lock core 100 from moving blocker 140 to a release position for an authorized operator. In another example, interchangeable electro-mechanical lock core 100 receives a wireless signal 1528 from privacy controller 1552 associated with privacy button 1520 when privacy button 1520 has not been actuated. The absence of a signal from privacy button 1520, in this example, is an indication that would prevent interchangeable electro-mechanical lock core 100 from moving blocker 140 to a release position for an authorized operator. The wireless signals 1528 may be BLUETOOTH advertising packets.

In one embodiment, a first antenna 1530 is positioned on an exterior side of door 1500 and a second antenna 1532 is positioned on an interior side of door 1500. In one example, second antenna 1532 is antenna 1555 of privacy unit 1550. Both first antenna 1530 and second antenna 1532 are operatively coupled to electronic controller 142, either as part of wireless communication system 904 of interchangeable electro-mechanical lock core 100 or in wireless communication with wireless communication system 904 of interchangeable electro-mechanical lock core 100. Electronic controller 142 determines which one of first antenna 1530 and second antenna 1532 receives a wireless input signal from an operator device 902 (or which one received a stronger signal) and discards the wireless input signal if received by the second antenna 1532 positioned on the interior side of door 1500. An advantage, among others, of utilizing first antenna 1530 and second antenna 1532 in the decision process of whether to ignore an authorized operator device 902, if the authorized operator device 902 is on the interior side of the door 1500, is the prevention of unintended actuation of blocker 140 of interchangeable electro-mechanical lock core 100 by a person answering the door 1500 with their operator device 902 in their pocket.

Additional details of exemplary systems for use with interchangeable elector-mechanical lock cores 100 and details on exemplary interchangeable elector-mechanical lock cores 100 are provided in the disclosure of U.S. Provisional Patent Application Ser. No. 62/410,186, filed Oct. 19, 2016, titled ELECTRO-MECHANICAL CORE APPARATUS, SYSTEM, AND METHODS OF OPERATING AN ELECTRO-MECHANICAL CORE APPARATUS, the entire disclosure of which is expressly incorporated by reference herein.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

We claim:

1. An interchangeable lock core for use with a lock device having a locked state and an unlocked state, the lock device including an opening sized to receive the interchangeable lock core, the interchangeable lock core comprising:

a lock core body having an interior, the lock core body including an upper portion having a first maximum lateral extent, a lower portion having a second maximum lateral extent, and a waist portion having a third maximum lateral extent, the third maximum lateral extent being less than the first maximum lateral extent and being less than the second maximum lateral extent, the lower portion, the upper portion, and the waist portion forming an envelope of the lock core body;

a moveable plug positioned within a first portion of the interior of the lock core body proximate a first end of the lock core body, the moveable plug having a first position relative to the lock core body which corresponds to the lock device being in a locked state and a second position relative to the lock core body which corresponds to the lock device being in the unlocked state, the moveable plug being rotatable between the first position and the second position about a moveable plug axis;

a core keeper moveably coupled to the lock core body, the core keeper being positionable in a retain position wherein the core keeper extends beyond the envelope of the lock core body to hold the lock core body in the opening of the lock device and a remove position wherein the core keeper is within the envelope of the lock core body to permit removal of the lock core body from the opening of the lock device;

an electronically controlled blocker positioned in the interior of the lock core body, the electronically controlled blocker being moveable between a blocking position and a release position; and an operator actuatable assembly including an operator actuatable input device extending beyond a second end of the lock core body, wherein the operator actuatable input device blocks access to the interior of the lock core body, the moveable plug is movable from the first position to the second position with the operator actuatable input device being assembled to the lock core body, and the operator actuatable input device must be removed from a remainder of the interchangeable lock core prior to moving the core keeper from the retain position to the release position.

2. The interchangeable core of claim 1, further comprising a control sleeve rotatable about the moveable plug axis, the control sleeve supporting the core keeper.

3. The interchangeable core of claim 2, wherein the moveable plug is received within an interior of the control sleeve.

4. The interchangeable core of claim 3, wherein the control sleeve is positioned in the interior of the lock core body.

5. The interchangeable core of claim 3, wherein the lower portion of the lock core body includes an opening and the control sleeve is positioned in the opening of the lower portion of the lock core body.

6. The interchangeable core of claim 3, further comprising at least a first coupler received in at least a first opening of the moveable plug, the first coupler being moveable in a direction angled relative to the moveable plug axis to couple the control sleeve to the moveable plug such that a rotation of the moveable plug about the moveable plug axis causes a rotation of the control sleeve about the moveable axis.

7. The interchangeable core of claim 6, wherein moveable plug includes a central keyway along the moveable plug axis, the first coupler extending into the central keyway, wherein with the operator actuatable input device removed from the remainder of the interchangeable lock core, the keyway is accessible from the second end of the lock core body.

8. An interchangeable lock core for use with a lock device having a locked state and an unlocked state, the lock device including an opening sized to receive the interchangeable lock core, the interchangeable lock core comprising:

a lock core body having an interior, the lock core body including an upper portion having a first maximum lateral extent, a lower portion having a second maximum lateral extent, and a waist portion having a third maximum lateral extent, the third maximum lateral extent being less than the first maximum lateral extent and being less than the second maximum lateral extent, the lower portion, the upper portion, and the waist portion forming an envelope of the lock core body;

a moveable plug positioned within a first portion of the interior of the lock core body proximate a first end of the lock core body, the moveable plug having a first position relative to the lock core body which corresponds to the lock device being in a locked state and a second position relative to the lock core body which corresponds to the lock device being in the unlocked state, the moveable plug being rotatable between the first position and the second position about a moveable plug axis;

a core keeper moveably coupled to the lock core body, the core keeper being positionable in a retain position wherein the core keeper extends beyond the envelope of the lock core body to hold the lock core body in the opening of the lock device and a remove position wherein the core keeper is within the envelope of the lock core body to permit removal of the lock core body from the opening of the lock device;

a control element positionable within the waist portion, an end of the control element having a first vertical position when the core keeper is in the retain position and a second vertical position when the core keeper is in the remove position; and an operator actuatable assembly including an operator actuatable input device extending beyond a second end of the lock core body, the second end being opposite the first end.

9. The interchangeable lock core of claim 8, wherein the operator actuatable input device blocks access to the interior of the lock core body, the moveable plug is movable from the first position to the second position with the operator actuatable input device being assembled to the lock core body, and the operator actuatable input device must be removed from a remainder of the interchangeable lock core prior to moving the core keeper from the retain position to the release position.

10. The interchangeable lock core of claim 8, further comprising a control sleeve rotatable about the moveable plug axis, the control sleeve supporting the core keeper.

11. The interchangeable core of claim 10, wherein the moveable plug is received within an interior of the control sleeve.

12. The interchangeable core of claim 11, wherein the lower portion of the lock core body includes an opening between the first end of the lock core body and the second end of the lock core body and the control sleeve is positioned in the opening of the lower portion of the lock core body.

13. The interchangeable lock core of claim 11, wherein the operator actuatable input device blocks access to the interior of the lock core body, the moveable plug is movable from the first position to the second position with the operator actuatable input device being assembled to the lock core body, and the operator actuatable input device must be removed from a remainder of the interchangeable lock core to expose an opening into the interior of the lock core body.

14. The interchangeable lock core of claim 13, further comprising an elongated tool receivable by the opening into the interior of the lock core body and operatively coupled to the control sleeve when inserted into the interior to a first depth, wherein a rotation of the elongated tool at the first depth results in a corresponding rotation of the control sleeve.

15. The interchangeable lock core of claim 8, further comprising a clutch having a plurality of engagement features which in a first position of the clutch engage a plurality of engagement features provided on a front end of the moveable plug and in a second position of the clutch are disengaged from the plurality of engagement features provided on the front end of the moveable plug; and an electric motor positioned forward of the front end of the moveable plug, the electric motor being actuatable to allow the clutch to transition from the second position to the first position.

* * * * *